United States Patent
Bossen et al.

(10) Patent No.: US 12,108,057 B2
(45) Date of Patent: Oct. 1, 2024

(54) PREDICTION IMAGE GENERATION DEVICE, MOVING IMAGE DECODING DEVICE, MOVING IMAGE ENCODING DEVICE, AND PREDICTION IMAGE GENERATION METHOD

(71) Applicants: SHARP KABUSHIKI KAISHA, Sakai (JP); FG Innovation Company Limited, Tuen Mun (HK)

(72) Inventors: Frank Bossen, Vancouver, WA (US); Eiichi Sasaki, Sakai (JP); Yukinobu Yasugi, Sakai (JP); Tomohiro Ikai, Sakai (JP)

(73) Assignees: SHARP KABUSHIKI KAISHA, Osaka (JP); FG Innovation Company Limited, Tuen Mun (HK)

(*) Notice: Subject to any disclaimer, the term of this patent is extended or adjusted under 35 U.S.C. 154(b) by 356 days.

(21) Appl. No.: 17/419,416

(22) PCT Filed: Dec. 26, 2019

(86) PCT No.: PCT/JP2019/051080
§ 371 (c)(1),
(2) Date: Jun. 29, 2021

(87) PCT Pub. No.: WO2020/141599
PCT Pub. Date: Jul. 9, 2020

(65) Prior Publication Data
US 2021/0392344 A1   Dec. 16, 2021

Related U.S. Application Data

(60) Provisional application No. 62/787,646, filed on Jan. 2, 2019.

(51) Int. Cl.
*H04N 19/186* (2014.01)
*H04N 19/105* (2014.01)
(Continued)

(52) U.S. Cl.
CPC ......... *H04N 19/186* (2014.11); *H04N 19/105* (2014.11); *H04N 19/174* (2014.11); *H04N 19/96* (2014.11)

(58) Field of Classification Search
CPC .. H04N 19/105; H04N 19/174; H04N 19/176; H04N 19/186; H04N 19/42;
(Continued)

(56) References Cited

U.S. PATENT DOCUMENTS

| | | | |
|---|---|---|---|
| 11,438,615 B2* | 9/2022 | Kawamura | .......... H04N 19/176 |
| 2018/0302641 A1 | 10/2018 | Ikai et al. | |
| 2022/0078405 A1* | 3/2022 | Francois | .............. H04N 19/503 |

FOREIGN PATENT DOCUMENTS

| | | |
|---|---|---|
| JP | 2018056685 A | 4/2018 |
| RU | 2556396 C2 | 7/2015 |

(Continued)

OTHER PUBLICATIONS

ITU-T, Telecommunication Standardization Sector of ITU, Series H: Audiovisual and Multimedia Systems Infrastructure of audiovisual services-Coding of moving video, Advanced video coding for generic audiovisual services, H.264 (Apr. 2017).
(Continued)

*Primary Examiner* — Maria E Vazquez Colon
(74) *Attorney, Agent, or Firm* — ScienBiziP, P.C.

(57) ABSTRACT

A prediction image generation is provided. First and second luminance values corresponding, respectively, to first and second positions on a luminance image are derived. First and second chrominance values corresponding, respectively, to first and second positions on a chrominance image are derived. First and second difference values indicate, respectively, a first difference between the first and second luminance values and a second difference between the first and second chrominance values. A shift value is derived for a
(Continued)

shift operation and a first parameter is derived by using the first and second difference values, and a second parameter is derived by using the second luminance value, the second chrominance value, the first parameter, and the shift value according to a formula. The shift value is set to a first threshold if a value derived by using the first and second difference values is less than the first threshold.

7 Claims, 22 Drawing Sheets

(51) Int. Cl.
  *H04N 19/174* (2014.01)
  *H04N 19/96* (2014.01)
(58) Field of Classification Search
  CPC ...... H04N 19/593; H04N 19/70; H04N 19/96; H04N 19/196; H04N 19/146; H04N 19/103
  See application file for complete search history.

(56) References Cited

FOREIGN PATENT DOCUMENTS

| RU | 2604669 C2 | 12/2016 |
|---|---|---|
| WO | 2017/061189 A1 | 4/2017 |
| WO | 2018/116802 A1 | 6/2018 |
| WO | 2018/119740 A1 | 7/2018 |
| WO | 2018/199001 A1 | 11/2018 |
| WO | 2018/236028 A1 | 12/2018 |

OTHER PUBLICATIONS

ITU-T, Telecommunication Standardization Sector of ITU, Series H: Audiovisual and Multimedia Systems Infrastructure of audiovisual services-Coding of moving video, High efficiency video coding, H.265 (Dec. 2016).

Chen Jet al: "Algorithm description for Versatile Video Coding and Test Model 3 (VTM 3)", 12. JVET Meeting; Oct. 3, 2018-Oct. 12, 2018; MACAO; (The Joint Video Exploration Team of ISO/IEC JTC1/SC29/WG11 and ITU-T SG.16 ), No. JVET-LI002,Dec. 24, 2018(Dec. 24, 2018), XP030251962, Retrieved from the Internet : URL: http://phenix.int-evry.fr/jvet/doc_end_user/documents/12_Macao/wg11/JVET-L1002-v2.zip JVET-L1002-v2.docx [retrieved on Dec. 24, 2018]* paragraph[3.3.1.4]*.

Yasugi Y et al.: "Non-CE3: CCLM table reduction and bit range control", 13. JVET Meeting; Jan. 9, 2019-Jan. 18, 2019; MARRAKECH; (The Joint Video Exploration Team of ISO/IEC JTC1/SC29/WG11 and ITU-T SG.16), No. JVET-M0064 Jan. 3, 2019 (Jan. 3, 2019), XP030200340,Retrieved from the Internet : URL:http://phenix.int-evry.fr/jvet / doc_end _user/documents/13_Marrakech/wg11/JVET-M0064-vl.zip JVET-M0064.docx [retrieved on Jan. 3, 2019]* paragraph [03.3]*.

Bross, Benjamin et al., "Versatile Video Coding (Draft 3)", JVET-L1001-v2, (version 2—date Nov. 8,2018) Joint Video Experts Team (JVET) of ITU-T SG 16 WP 3 and ISO/IEC JTC 1/SC 29/WG 11, 12th Meeting: Macao, CN, Oct. 3-12, 2018.

Guillaume Laroche et al., "CE3-5.1: On cross-component linear model simplification", JVET-L0191, Joint Video Experts Team (JVET) of ITU-T SG 16 WP 3 and ISO/IEC JTC 1/SC 29/WG 11 12th Meeting: Macao, CN, Oct. 3-12, 2018.

Bross, Benjamin et al., "Versatile Video Coding (Draft 3)", JVET-L1001-v6, (version 10—date Dec. 14, 2018) Joint Video Experts Team (JVET) of ITU-T SG 16 WP 3 and ISO/IEC JTC 1/SC 29/WG 11, 12th Meeting: Macao, CN, Oct. 3-12, 2018.

* cited by examiner (a)

(b) QT (c) BT (VERTICAL SPLITTING)

(d) BT (HORIZONTAL SPLITTING)

(e) TT (VERTICAL SPLITTING)

(f) TT (HORIZONTAL SPLITTING)

(g)

| qt_split_cu_flag | mtt_split_cu_flag | mtt_split_cu_vertical_flag | mtt_split_cu_binary_flag | |
|---|---|---|---|---|
| 1 | -- | -- | -- | (b) |
| 0 | 1 | 1 | 1 | (c) |
|   |   |   | 0 | (e) |
|   |   | 0 | 1 | (d) |
|   |   |   | 0 | (f) |
| 0 | 0 | -- | -- | (a) |

(a)

(b)

|  | Gr0 | Gr1 | Gr2 | | Gr3 | | | | Gr4 | | | | | | | |
|---|---|---|---|---|---|---|---|---|---|---|---|---|---|---|---|---|
| diff | 0 | 1 | 2 | 3 | 4 | 5 | 6 | 7 | 8 | 9 | 10 | 11 | 12 | 13 | 14 | 15 |
| sc=FLOOR(log2(diff)) | - | 0 | 1 | 1 | 2 | 2 | 2 | 2 | 3 | 3 | 3 | 3 | 3 | 3 | 3 | 3 |
| diff<<4 | - | 16 | 32 | 48 | 64 | 80 | 96 | 112 | 128 | 144 | 160 | 176 | 192 | 208 | 224 | 240 |
| normDiff=diff<<4>>sc | - | 16 | 16 | 24 | 16 | 20 | 24 | 28 | 16 | 18 | 20 | 22 | 24 | 26 | 28 | 30 |
| idx = normDiff-16 | - | 0 | 0 | 8 | 0 | 4 | 8 | 12 | 0 | 2 | 4 | 6 | 8 | 10 | 12 | 14 |
| idx = normDiff&15 | - | 0 | 0 | 8 | 0 | 4 | 8 | 12 | 0 | 2 | 4 | 6 | 8 | 10 | 12 | 14 |

|  | Gr5 | | | | | | | | | | | | | | | |
|---|---|---|---|---|---|---|---|---|---|---|---|---|---|---|---|---|
| diff | 16 | 17 | 18 | 19 | 20 | 21 | 22 | 23 | 24 | 25 | 26 | 27 | 28 | 29 | 30 | 31 |
| sc=FLOOR(log2(diff)) | 4 | 4 | 4 | 4 | 4 | 4 | 4 | 4 | 4 | 4 | 4 | 4 | 4 | 4 | 4 | 4 |
| diff<<4 | 256 | 272 | 288 | 304 | 320 | 336 | 352 | 368 | 384 | 400 | 416 | 432 | 448 | 464 | 480 | 496 |
| normDiff=diff<<4>>sc | 16 | 17 | 18 | 19 | 20 | 21 | 22 | 23 | 24 | 25 | 26 | 27 | 28 | 29 | 30 | 31 |
| idx = normDiff-16 | 0 | 1 | 2 | 3 | 4 | 5 | 6 | 7 | 8 | 9 | 10 | 11 | 12 | 13 | 14 | 15 |
| idx = normDiff&15 | 0 | 1 | 2 | 3 | 4 | 5 | 6 | 7 | 8 | 9 | 10 | 11 | 12 | 13 | 14 | 15 |

|  | Gr6 | | | | | | | | | | | | | | | |
|---|---|---|---|---|---|---|---|---|---|---|---|---|---|---|---|---|
| diff | 32 | 33 | 34 | 35 | 36 | 37 | 38 | 39 | 40 | 41 | 42 | 43 | 44 | 45 | 46 | 47 |
| sc=FLOOR(log2(diff)) | 5 | 5 | 5 | 5 | 5 | 5 | 5 | 5 | 5 | 5 | 5 | 5 | 5 | 5 | 5 | 5 |
| diff<<4 | 512 | 528 | 544 | 560 | 576 | 592 | 608 | 624 | 640 | 656 | 672 | 688 | 704 | 720 | 736 | 752 |
| normDiff=diff<<4>>sc | 16 | 16 | 17 | 17 | 18 | 18 | 19 | 19 | 20 | 20 | 21 | 21 | 22 | 22 | 23 | 23 |
| idx = normDiff-16 | 0 | 0 | 1 | 1 | 2 | 2 | 3 | 3 | 4 | 4 | 5 | 5 | 6 | 6 | 7 | 7 |
| idx = normDiff&15 | 0 | 0 | 1 | 1 | 2 | 2 | 3 | 3 | 4 | 4 | 5 | 5 | 6 | 6 | 7 | 7 |

|  | Gr6 | | | | | | | | | | | | | | | |
|---|---|---|---|---|---|---|---|---|---|---|---|---|---|---|---|---|
| diff | 48 | 49 | 50 | 51 | 52 | 53 | 54 | 55 | 56 | 57 | 58 | 59 | 60 | 61 | 62 | 63 |
| sc=FLOOR(log2(diff)) | 5 | 5 | 5 | 5 | 5 | 5 | 5 | 5 | 5 | 5 | 5 | 5 | 5 | 5 | 5 | 5 |
| diff<<4 | 768 | 784 | 800 | 816 | 832 | 848 | 864 | 880 | 896 | 912 | 928 | 944 | 960 | 976 | 992 | 1008 |
| normDiff=diff<<4>>sc | 24 | 24 | 25 | 25 | 26 | 26 | 27 | 27 | 28 | 28 | 29 | 29 | 30 | 30 | 31 | 31 |
| idx = normDiff-16 | 8 | 8 | 9 | 9 | 10 | 10 | 11 | 11 | 12 | 12 | 13 | 13 | 14 | 14 | 15 | 15 |
| idx = normDiff&15 | 8 | 8 | 9 | 9 | 10 | 10 | 11 | 11 | 12 | 12 | 13 | 13 | 14 | 14 | 15 | 15 |

FIG. 20

|  | Gr0 | Gr1 | Gr2 | | Gr3 | | | | Gr4 | | | | | | | |
|---|---|---|---|---|---|---|---|---|---|---|---|---|---|---|---|---|
| diff | 0 | 1 | 2 | 3 | 4 | 5 | 6 | 7 | 8 | 9 | 10 | 11 | 12 | 13 | 14 | 15 |
| idx | - | 0 | 0 | 8 | 0 | 4 | 8 | 12 | 0 | 2 | 4 | 6 | 8 | 10 | 12 | 14 |
| DivTableM_2N[idx] | - | 0 | 0 | 3 | 0 | 5 | 3 | 1 | 0 | 6 | 5 | 4 | 3 | 2 | 1 | 1 |
| DivTableM_2N[idx]\|8 | - | 8 | 8 | 11 | 8 | 13 | 11 | 9 | 8 | 14 | 13 | 12 | 11 | 10 | 9 | 9 |
| sc | - | 0 | 1 | 1 | 2 | 2 | 2 | 2 | 3 | 3 | 3 | 3 | 3 | 3 | 3 | 3 |
| sc1 | - | 0 | 1 | 2 | 2 | 3 | 3 | 3 | 3 | 4 | 4 | 4 | 4 | 4 | 4 | 4 |

|  | Gr5 | | | | | | | | | | | | | | | |
|---|---|---|---|---|---|---|---|---|---|---|---|---|---|---|---|---|
| diff | 16 | 17 | 18 | 19 | 20 | 21 | 22 | 23 | 24 | 25 | 26 | 27 | 28 | 29 | 30 | 31 |
| idx | 0 | 1 | 2 | 3 | 4 | 5 | 6 | 7 | 8 | 9 | 10 | 11 | 12 | 13 | 14 | 15 |
| DivTableM_2N[idx] | 0 | 7 | 6 | 5 | 5 | 4 | 4 | 3 | 3 | 2 | 2 | 1 | 1 | 1 | 1 | 0 |
| DivTableM_2N[idx]\|8 | 8 | 15 | 14 | 13 | 13 | 12 | 12 | 11 | 11 | 10 | 10 | 9 | 9 | 9 | 9 | 8 |
| sc | 4 | 4 | 4 | 4 | 4 | 4 | 4 | 4 | 4 | 4 | 4 | 4 | 4 | 4 | 4 | 4 |
| sc1 | 4 | 5 | 5 | 5 | 5 | 5 | 5 | 5 | 5 | 5 | 5 | 5 | 5 | 5 | 5 | 5 |

|  | Gr6 | | | | | | | | | | | | | | | |
|---|---|---|---|---|---|---|---|---|---|---|---|---|---|---|---|---|
| diff | 32 | 33 | 34 | 35 | 36 | 37 | 38 | 39 | 40 | 41 | 42 | 43 | 44 | 45 | 46 | 47 |
| idx | 0 | 0 | 1 | 1 | 2 | 2 | 3 | 3 | 4 | 4 | 5 | 5 | 6 | 6 | 7 | 7 |
| DivTableM_2N[idx] | 0 | 0 | 7 | 7 | 6 | 6 | 5 | 5 | 5 | 5 | 4 | 4 | 4 | 4 | 3 | 3 |
| DivTableM_2N[idx]\|8 | 8 | 8 | 15 | 15 | 14 | 14 | 13 | 13 | 13 | 13 | 12 | 12 | 12 | 12 | 11 | 11 |
| sc | 5 | 5 | 5 | 5 | 5 | 5 | 5 | 5 | 5 | 5 | 5 | 5 | 5 | 5 | 5 | 5 |
| sc1 | 5 | 5 | 6 | 6 | 6 | 6 | 6 | 6 | 6 | 6 | 6 | 6 | 6 | 6 | 6 | 6 |

|  | Gr6 | | | | | | | | | | | | | | | |
|---|---|---|---|---|---|---|---|---|---|---|---|---|---|---|---|---|
| diff | 48 | 49 | 50 | 51 | 52 | 53 | 54 | 55 | 56 | 57 | 58 | 59 | 60 | 61 | 62 | 63 |
| idx | 8 | 8 | 9 | 9 | 10 | 10 | 11 | 11 | 12 | 12 | 13 | 13 | 14 | 14 | 15 | 15 |
| DivTableM_2N[idx] | 3 | 3 | 2 | 2 | 2 | 2 | 1 | 1 | 1 | 1 | 1 | 1 | 1 | 1 | 0 | 0 |
| DivTableM_2N[idx]\|8 | 11 | 11 | 10 | 10 | 10 | 10 | 9 | 9 | 9 | 9 | 9 | 9 | 9 | 9 | 8 | 8 |
| sc | 5 | 5 | 5 | 5 | 5 | 5 | 5 | 5 | 5 | 5 | 5 | 5 | 5 | 5 | 5 | 5 |
| sc1 | 6 | 6 | 6 | 6 | 6 | 6 | 6 | 6 | 6 | 6 | 6 | 6 | 6 | 6 | 6 | 6 |

FIG. 21

PREDICTION IMAGE GENERATION DEVICE, MOVING IMAGE DECODING DEVICE, MOVING IMAGE ENCODING DEVICE, AND PREDICTION IMAGE GENERATION METHOD

CROSS-REFERENCE TO RELATED APPLICATION(S)

This present disclosure is a national stage application of International Patent Application PCT/JP2019/051080, filed on Dec. 26, 2019, now published as WO2020/141599, which claims the benefit of and priority to U.S. Provisional Patent Application Ser. No. 62/787,646, filed on Jan. 2, 2019, the contents of all of which are hereby incorporated herein fully by reference.

TECHNICAL FIELD

Embodiments of the present invention relate to a prediction image generation device, a moving image decoding device, and a moving image encoding device.

BACKGROUND ART

For the purposes of transmitting or recording moving images efficiently, a moving image encoding device is used to generate encoded data by encoding a moving image, and a moving image decoding device is used to generate a decoded image by decoding the encoded data.

Specific moving image encoding schemes include, for example, H.264/AVC, High-Efficiency Video Coding (HEVC), etc.

In such moving image encoding schemes, images (pictures) forming a moving image are managed by a hierarchical structure, and are encoded/decoded for each coding unit (CU), wherein the hierarchical structure includes slices acquired by splitting the images, coding tree units (CTUs) acquired by splitting the slices, CUs acquired by splitting the coding.

In addition, in such moving image encoding schemes, sometimes, a prediction image is generated on the basis of local decoded images acquired by encoding/decoding input images, and prediction errors (sometimes also referred to as "difference images" or "residual images") acquired by subtracting the prediction image from the input images (original images) are encoded. Prediction image generation methods include inter-picture prediction (inter-frame prediction) and intra-picture prediction (intra-frame prediction). Moving image encoding and decoding technologies of recent years include non-patent document 1.

Moreover, moving image encoding and decoding technologies of recent years include cross-component linear model (CCLM) prediction for generating a prediction image of a chrominance image according to a luminance image. In CCLM prediction, linear prediction parameters are derived by using decoded images contiguous to an object block, and a chrominance of the object block is predicted according to a linear prediction model (CCLM model) (non-patent document 2).

CITATION LIST

Non Patent Literature

Non-patent document 1: "Versatile Video Coding (Draft 3)", JVET-L1001, Joint Video Exploration Team (JVET) of ITU-T SG 16 WP 3 and ISO/IEC JTC 1/SC 29/WG 11, 2018 Nov. 8 17:06:06

Non-patent document 2: "CE3-5.1: On cross-component linear model simplification", JVET-L0191, Joint Video Exploration Team (JVET) of ITU-T SG 16 WP 3 and ISO/IEC JTC 1/SC 29/WG 11, 2018 Oct. 3

SUMMARY OF INVENTION

Technical Problem

As described above, in CCLM processing, linear prediction parameters are derived, and prediction images are generated by using a linear prediction model. Integer operations and table lookups are employed in derivation of linear prediction parameters, but large memory usage by the table is a problem.

Furthermore, when deriving a prediction value by using a product of a gradient term (CCLM prediction parameter a) of the linear prediction parameters and a pixel value, a bit width of the CCLM prediction parameter a increases in the method of non-patent document 1, thereby resulting in a problem of the product being complex. In addition, non-patent document 1 also uses a product in the derivation of the gradient term (CCLM prediction parameter a) of the linear prediction parameters and an offset term (CCLM prediction parameter b) of the linear prediction parameters, but this product also serves as a product of values having large bit widths, and is therefore complex. It should be noted that a product of values having large bit widths increases hardware scale.

Solution to Problem

In order to solve the above problem, a CCLM prediction portion according to a solution of the present invention is a CCLM prediction portion for generating a prediction image by means of CCLM prediction, wherein the CCLM prediction portion has: a CCLM prediction parameter derivation portion, for deriving CCLM prediction parameters (a, b) by using a luminance difference value, a chrominance difference value, and a table; and a CCLM prediction filter portion, for generating a chrominance prediction image by using a luminance reference image and the CCLM prediction parameters (a, b). The CCLM prediction parameter derivation portion derives the CCLM prediction parameter a by using a first shift value shift_a to right-shift a value acquired by multiplying a value of an inverse table referenced in use of the luminance difference value by the chrominance difference value. The CCLM prediction filter portion uses a second specified shift value shiftA to right-shift a product of the parameter a and luminance, thereby deriving the chrominance prediction image.

Advantage Effects of Invention

According to a solution of the present invention, the effect of simplifying multiplication with a linear prediction parameter in CCLM prediction is achieved.

BRIEF DESCRIPTION OF DRAWINGS

FIG. 20 is an example showing values of normDiff, idx, etc., with diff being in a range of 0 to 63.

FIG. 21 is an example showing values of idx, sc, etc., with diff being in a range of 0 to 63.

DESCRIPTION OF EMBODIMENTS

First Embodiment

Embodiments of the present invention are described below with reference to the accompanying drawings.

Figure 1:
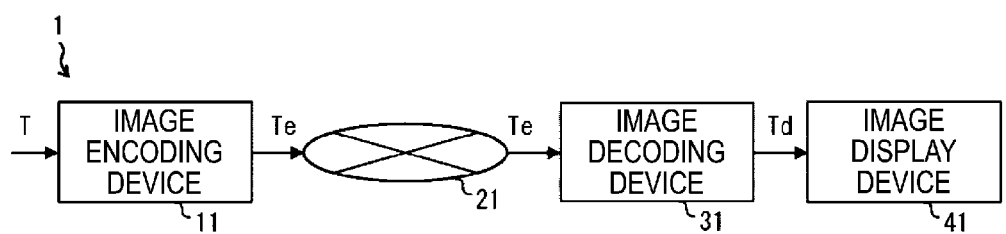
FIG. 1 is a schematic diagram showing components of an image transmission system according to this embodiment.

FIG. 1 is a schematic diagram showing components of an image transmission system 1 according to this embodiment.

The image transmission system 1 is a system for transmitting an encoded stream acquired by encoding an encoding object image, decoding the transmitted encoded stream, and displaying an image. Components of the image transmission system 1 include: a moving image encoding device (image encoding device) 11, a network 21, a moving image decoding device (image decoding device) 31, and a moving image display device (image display device) 41.

An image T is input to the moving image encoding device 11.

The network 21 transmits encoded streams Te generated by the moving image encoding device 11 to the moving image decoding device 31. The network 21 is the Internet, a Wide Area Network (WAN), a Local Area Network (LAN), or a combination thereof. The network 21 is not necessarily limited to a bidirectional communication network, and may be a unidirectional communication network for transmitting broadcast waves such as terrestrial digital broadcasting and satellite broadcasting. In addition, the network 21 may also be replaced with a storage medium in which the encoded streams Te are recorded, such as Digital Versatile Disc (DVD, registered trademark), Blue-ray Disc (BD, registered trademark), etc.

The moving image decoding device 31 decodes the encoded streams Te transmitted by the network 21 respectively to generate one or a plurality of decoded images Td.

The moving image display device 41 displays all of or part of the one or the plurality of decoded images Td generated by the moving image decoding device 31. The moving image display device 41 includes, for example, display apparatuses such as a liquid crystal display, an organic Electro-Luminescence (EL) display, etc. The display may be in the form of, for example, a stationary display, a mobile display, an HMD, etc. In addition, when the moving image decoding device 31 has high processing capabilities, an image having high image quality is displayed, and when the moving image decoding device 31 has only relatively low processing capabilities, an image not requiring high processing capabilities and high display capabilities is displayed.

<Operator>

The operators used in this specification are described below.

>> denotes right-shift; << denotes left-shift; & denotes bitwise AND; | denotes bitwise OR; |= denotes an OR assignment operator; || denotes logical sum.

x?y:z is a ternary operator in which y is taken when x is true (other than 0) and z is taken when x is false (0).

Clip3(a, b, c) is a function for clipping c to a value equal to or greater than a and equal to or less than b, and is a function for returning a if c<a, returning b if c>b, and returning c otherwise (where a<=b).

abs(a) is a function for returning the absolute value of a.

Int(a) is a function for returning the integer value of a.

floor(a) is a function for returning the greatest integer equal to or less than a.

ceil(a) is a function for returning the least integer equal to or greater than a.

a/d denotes division of a by d (chop off decimal).

a^b denotes a to the power of b.

sign (a) is a function for returning a sign, and returning 1 if a>0, returning 0 if a==0, and returning −1 if a<0.

<Structure of the Encoded Stream Te>

Prior to detailed description of the moving image encoding device 11 and the moving image decoding device 31 according to this embodiment, a data structure of the encoded stream Te generated by the moving image encoding device 11 and decoded by the moving image decoding device 31 is described.

Figure 4:
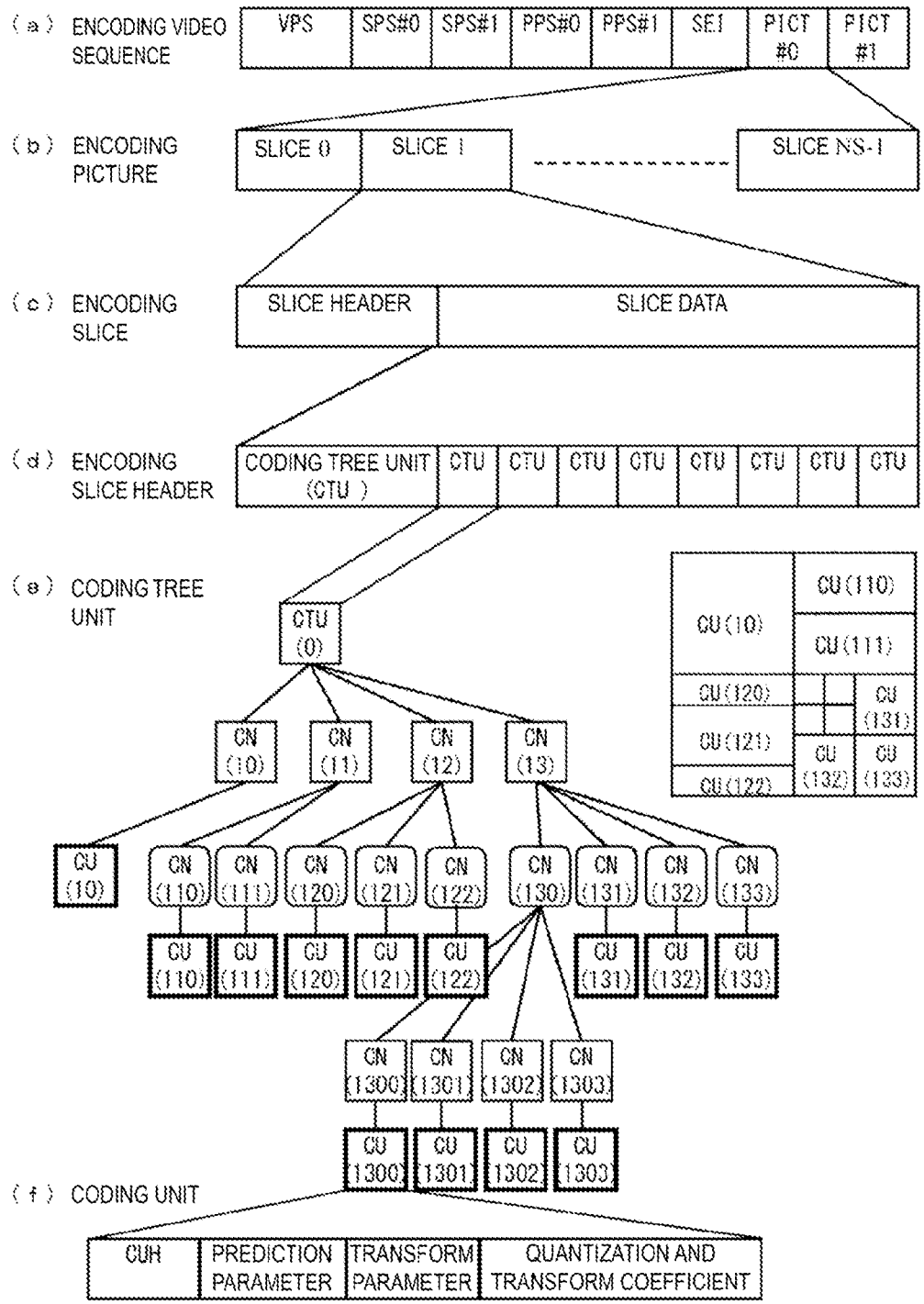
FIG. 4 is a diagram showing a hierarchical structure of data in an encoded stream.

FIG. 4 is a diagram showing a hierarchical structure of data in the encoded stream Te. The encoded stream Te exemplarily includes a sequence and a plurality of pictures forming the sequence. FIGS. 4(a)-(f) are diagrams respectively illustrating an encoding video sequence of a default sequence SEQ, an encoding picture defining a picture PICT, an encoding slice defining a slice S, encoding slice data defining slice data, a coding tree unit included in the encoding slice data, and a coding unit included in the coding tree unit.

(Encoding Video Sequence)

In the encoding video sequence, a set of data to be referred to by the moving image decoding device 31 in order to decode the sequence SEQ of a processing object is defined. The encoding video of the sequence SEQ is shown in FIG. 4(a), and includes a video parameter set (VPS), multiple sequence parameter sets (SPSs), multiple picture parameter sets (PPSs), multiple pictures (PICTs), and supplemental enhancement information (SEI).

In the VPS, in a moving image formed by a plurality of layers, a set of encoding parameters common to a plurality of moving images, a plurality of layers included in the moving image, and a set of encoding parameters related to each of the layers are defined.

In the SPS, a set of encoding parameters referred to by the moving image decoding device 31 in order to decode an object sequence are defined. For example, the width and the height of a picture are defined. It should be noted that there may be a plurality of SPSs. In this case, any one of the plurality of SPSs is selected from the PPS.

In the PPS, a set of encoding parameters referred to by the moving image decoding device 31 in order to decode each picture in the object sequence are defined. For example, a reference value (pic_init_qp_minus26) of a quantization width for decoding of the picture and a flag (weighted_pred_flag) for indicating application of weighted prediction are included. It should be noted that there may be a plurality of PPSs. In this case, any one of the plurality of PPSs is selected from each picture in the object sequence.

(Encoding Picture)

In the encoding picture, a set of data referred to by the moving image decoding device 31 in order to decode the picture PICT of the processing object is defined. The picture PICT is shown in FIG. 4(b), and includes slice 0 to slice NS-1 (NS is the total number of slices included in the picture PICT).

It should be noted that, in the following description, when there is no need to distinguish between slice 0 to slice NS-1, subscripts of the reference numerals may be omitted. In addition, other pieces of data included in the encoded stream Te and having a subscript to be described below follow the same rules.

(Encoding Slice)

In the encoding slice, a set of data referred to by the moving image decoding device 31 in order to decode a slice S of the processing object is defined. The slice is shown in FIG. 4(c), and includes a slice header and slice data.

The slice header includes an encoding parameter group referred to by the moving image decoding device 31 in order to determine a decoding method of an object slice. Slice type designation information (slice type) for designating a slice type is an example of an encoding parameter included in the slice header.

Examples of slice types that can be designated by the slice type designation information include (1) I slice using only intra-frame prediction during encoding, (2) P slice using unidirectional prediction or intra-frame prediction during encoding, (3) B slice using unidirectional prediction, bidirectional prediction, or intra-frame prediction during encoding, and the like. It should be noted that the inter-frame prediction is not limited to unidirectional prediction and bidirectional prediction, and more reference pictures can be used to generate a prediction image. P slice and B slice used hereinafter refer to a slice including a block on which inter-frame prediction can be used.

It should be noted that the slice header may also include a reference (pic_parameter_set_id) to the picture parameter set PPS.

(Encoding Slice Data)

In the encoding slice data, a set of data referred to by the moving image decoding device 31 in order to decode slice data of the processing object is defined. The slice data is shown in FIG. 4(d), and includes multiple CTUs. The CTU is a block of a fixed size (for example, 64×64) forming a slice, and is also referred to as a Largest Coding Unit (LCU).

(Coding Tree Unit)

In FIG. 4(e), a set of data referred to by the moving image decoding device 31 in order to decode the CTU of the processing object is defined. The CTU is split by recursive Quad Tree (QT) split, Binary Tree (BT) split, or Ternary Tree (TT) split into coding units CU serving as a basic unit of encoding processing. The BT split and the TT split are collectively referred to as Multi Tree (MT) split. Nodes of a tree structure acquired by means of recursive quad tree split are referred to as coding nodes. Intermediate nodes of a quad tree, a binary tree, and a ternary tree are coding nodes, and the CTU itself is also defined as a highest coding node.

A CT includes the following information used as CT information: a QT split flag (qt_split_cu_flag) for indicating whether to perform QT split, an MT split flag (mtt_split_cu_flag) for indicating whether MT split exists, an MT split direction (mtt_split_cu_vertical_flag) for indicating a split direction of the MT split, and an MT split type (mtt_split_cu_binary_flag) for indicating a split type of the MT split. qt_split_cu_flag, mtt_split_cu_flag, mtt_split_cu_vertical_flag, and mtt_split_cu_binary_flag are transmitted on the basis of each coding node.

Figure 5:
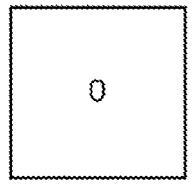
FIG. 5 is a diagram showing an example of CTU splitting.
Figure 5:
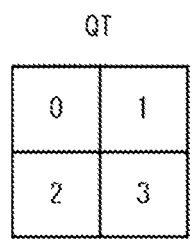
Figure 5:
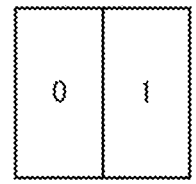
Figure 5:
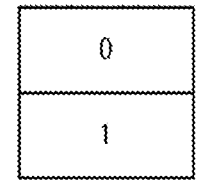
Figure 5:
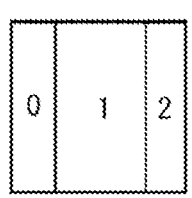
Figure 5:
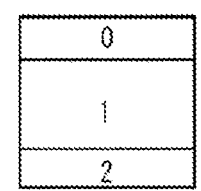

FIG. 5 is a diagram showing an example of CTU splitting. When qt_split_cu_flag is 1, the coding node is split into four coding nodes (FIG. 5(b)).

When qt_split_cu_flag is 0, and mtt_split_cu_flag is 0, the coding node is not split, and one CU is maintained as a node (FIG. 5(a)). The CU is an end node of the coding nodes, and is not subjected to further splitting. The CU is a basic unit of the encoding processing.

When mtt_split_cu_flag is 1, MT split is performed on the coding node as follows. When mtt_split_cu_vertical_flag is 0, and mtt_split_cu_binary_flag is 1, the coding node is horizontally split into two coding nodes (FIG. 5(d)); when mtt_split_cu_vertical_flag is 1, and mtt_split_cu_binary_flag is 1, the coding node is vertically split into two coding nodes (FIG. 5(c)). Furthermore, when mtt_split_cu_vertical_flag is 0, and mtt_split_cu_binary_flag is 0, the coding node is horizontally split into three coding nodes (FIG. 5(f)); when mtt_split_cu_vertical_flag is 1, and mtt_split_cu_binary_flag is 0, the coding node is vertically split into three coding nodes (FIG. 5(e)). These splits are illustrated in FIG. 5(g).

In addition, when the size of the CTU is 64×64 pixels, the size of the CU may be any one of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

(Coding Unit)

As shown in FIG. 4(f), a set of data referred to by the moving image decoding device 31 in order to decode the coding unit of the processing object is defined. Specifically, the CU consists of a CU header CUH, prediction parameters, transform parameters, quantization and transform coefficients, etc. In the CU header, a prediction mode and the like are defined.

Prediction processing may be performed for each CU, and may be performed for each sub-CU acquired by further splitting the CU. When the CU and the sub-CU have the same size, one sub-CU is included in the CU. When the CU has a size larger than the size of the sub-CU, the CU is split into sub-CUs. For example, when the CU is 8×8 and the sub-CU is 4×4, the CU is split into four sub-CUs, including two horizontal splits and two vertical splits.

Prediction types (prediction modes) include intra-frame prediction and inter-frame prediction. The intra-frame prediction is prediction in the same picture, and the inter-frame prediction refers to prediction processing performed between mutually different pictures (for example, between display time points).

Processing in a transform/quantization portion is performed for each CU, but the quantization and transform coefficient may also be subjected to entropy coding for each sub-block of 4×4 and the like.

(Prediction Parameters)

The prediction image is derived by prediction parameters associated with the block. The prediction parameters include prediction parameters for the intra-frame prediction and the inter-frame prediction.

Figure 6:
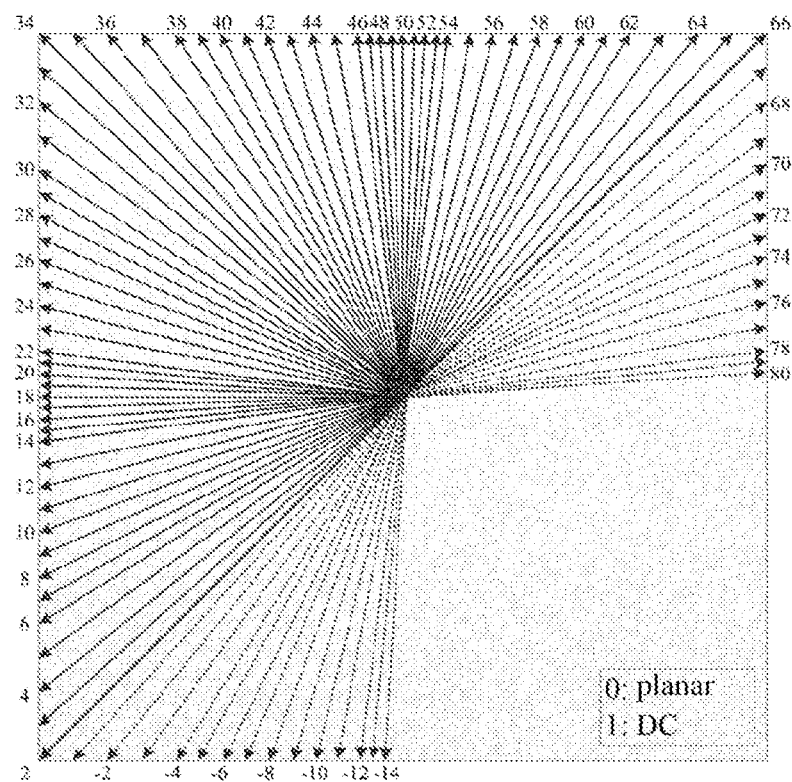
FIG. 6 is a schematic diagram showing types (mode numbers) of intra-frame prediction modes.

The prediction parameters for the intra-frame prediction are described below. Intra-frame prediction parameters consist of a luminance prediction mode IntraPredModeY and a chrominance prediction mode IntraPredModeC. FIG. 6 is a schematic diagram showing types (mode numbers) of intra-frame prediction modes. As shown in FIG. 6, there are, for example, 67 intra-frame prediction modes (0 to 66) and 28 wide-angle prediction modes (−14 to −1 and 67 to 80). For example, planar prediction (0), DC prediction (1), and Angular (angular) prediction (2 to 66). Also, CCLM modes (81 to 83) may be added for chrominance.

Syntax elements used to derive intra-frame prediction parameters include, for example, intra_luma_mpm_flag, mpm_idx, mpm_remainder, etc.

(MPM)

intra_luma_mpm_flag is a flag indicating whether the luminance prediction mode Intra Pred ModeY of an object block is consistent with the most probable mode (MPM). The MPM is a prediction mode included in a MPM candidate list mpmCandList[ ]. The MPM candidate list is a list in which candidates are stored, where according to estimates based on an intra-frame prediction mode of a contiguous block and a specified intra-frame prediction mode, probabilities of the candidates being applied to an object block are high. If intra_luma_mpm_flag is 1, then the luminance prediction mode IntraPredModeY for the object block is derived by using the MPM candidate list and an index mpm_idx.

IntraPredModeY=mpmCandList[mpm_idx]

(REM)

If intra_luma_mpm_flag is 0, then a luminance prediction mode IntraPredModeY is derived by using mpm_remainder. Specifically, the intra-frame prediction mode is selected from the modes RemIntraPredMode remaining after removing the intra-frame prediction modes included in the MPM candidate list from all intra-frame prediction modes.

(Components of the Moving Image Decoding Device)

Figure 7:
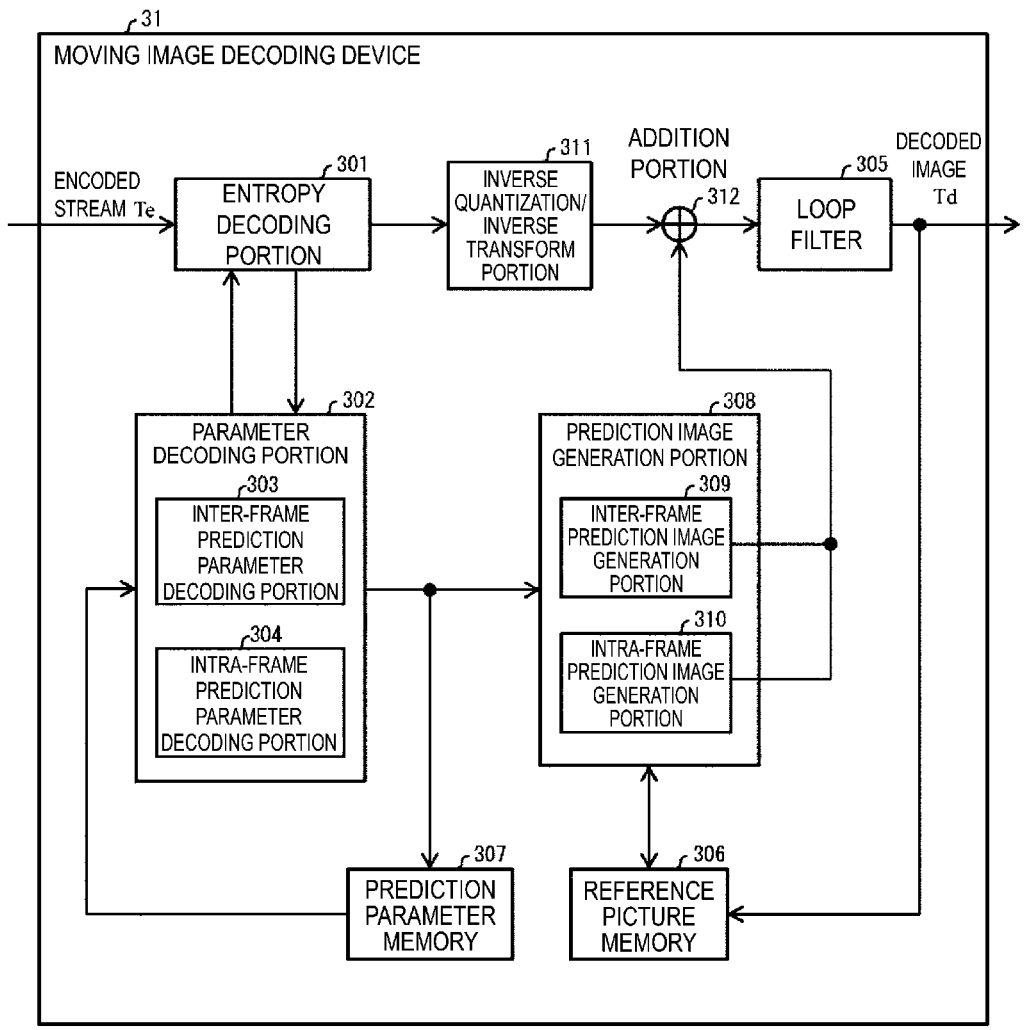
FIG. 7 is a schematic diagram showing components of a moving image decoding device.

FIG. 7 is a schematic diagram showing components of a moving image decoding device. Components of the moving image decoding device 31 (FIG. 7) according to this embodiment are described.

The components of the moving image decoding device 31 include: an entropy decoding portion 301, a parameter decoding portion (prediction image decoding device) 302, a loop filter 305, a reference picture memory 306, a prediction parameter memory 307, a prediction image generation portion 308, an inverse quantization/inverse transform portion 311, and an addition portion 312. It should be noted that according to the moving image encoding device 11 described below, the moving image decoding device 31 may not include the loop filter 305.

The parameter decoding portion 302 further includes a header decoding portion, a CT information decoding portion, and a CU decoding portion (prediction mode decoding portion) all of which are not shown in FIG. 7. The CU decoding portion further includes a TU decoding portion. The above components can also be collectively referred to as a decoding module. The header decoding portion decodes parameter set information such as the VPS, the SPS, and the PPS and the slice header (slice information) from the encoded data. The CT information decoding portion decodes the CT from the encoded data. The CU decoding portion decodes the CU from the encoded data. When the TU includes the prediction error, the TU decoding portion decodes QP update information (quantization correction value) and a quantization prediction error (residual coding) from the encoded data.

In addition, the parameter decoding portion 302 is configured to include an inter-frame prediction parameter decoding portion 303 and an intra-frame prediction parameter decoding portion 304. The prediction image generation portion 308 is configured to include an inter-frame prediction image generation portion 309 and an intra-frame prediction image generation portion 310.

In addition, an example in which the CTU and the CU are used as processing units is described below; however, the processing is not limited thereto, and processing may also be performed in units of sub-CUs. Alternatively, the CTU and the CU may be replaced with blocks, and the sub-CU may be replaced with a sub-block; processing may be performed in units of blocks or sub-blocks.

The entropy decoding portion 301 performs entropy decoding on an encoded stream Te input from the external, separates each code (syntax element), and performs decoding. The separated code includes prediction information for generating prediction images, prediction errors for generating difference images, and the like. The entropy decoding portion 301 outputs the separated code to the parameter decoding portion 302.

(Functions of the Intra-Frame Prediction Parameter Decoding Portion 304)

The intra-frame prediction parameter decoding portion 304 decodes the intra-frame prediction parameter such as the intra-frame prediction mode IntraPredMode by referring to the prediction parameter stored in the prediction parameter memory 307 and on the basis of the code input from the entropy decoding portion 301. The intra-frame prediction parameter decoding portion 304 outputs the decoded intra-frame prediction parameter to the prediction image generation portion 308, and then the decoded intra-frame prediction parameter is stored in the prediction parameter memory 307. The intra-frame prediction parameter decoding portion 304 may also derive intra-frame prediction modes that differ in luminance and chrominance.

Figure 8:
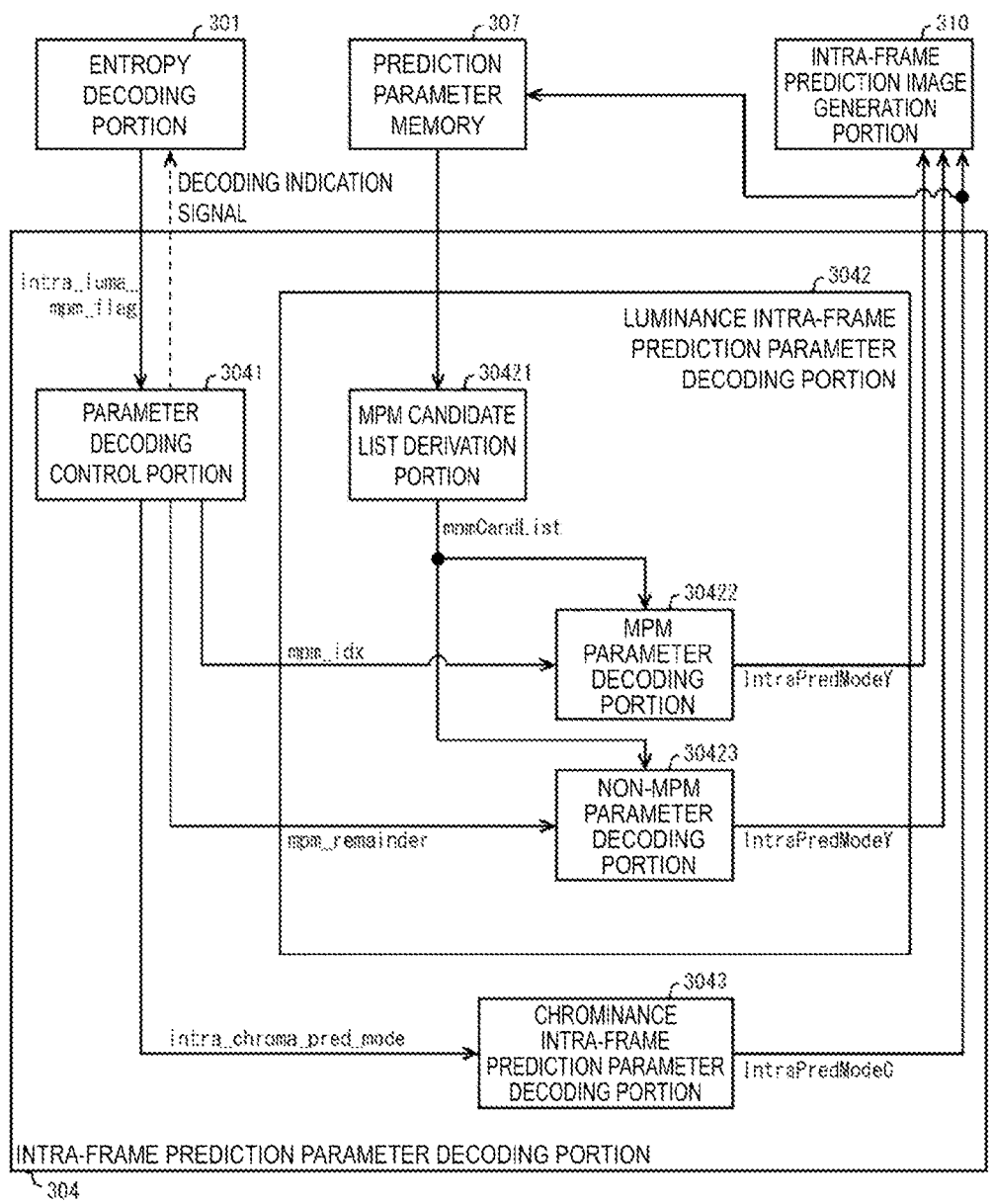
FIG. 8 is a schematic diagram showing components of an intra-frame prediction parameter decoding portion.

FIG. 8 is a schematic diagram showing the components of the intra-frame prediction parameter decoding portion 304 of the parameter decoding portion 302. As shown in FIG. 8, the intra-frame prediction parameter decoding portion 304 is configured to include: a parameter decoding control portion 3041, a luminance intra-frame prediction parameter decoding portion 3042, and a chrominance intra-frame prediction parameter decoding portion 3043.

The parameter decoding control portion 3041 indicates decoding of a syntax element to the entropy decoding portion 301, and receives the syntax element from the entropy decoding portion 301. If intra_luma_mpm_flag is 1, then the parameter decoding control portion 3041 outputs mpm_idx to an MPM parameter decoding portion 30422 in the luminance intra-frame prediction parameter decoding portion 3042. In addition, if intra_luma_mpm_flag is 0, then the parameter decoding control portion 3041 outputs mpm_remainder to a non-MPM parameter decoding portion 30423 of the luminance intra-frame prediction parameter decoding portion 3042. In addition, the parameter decoding control portion 3041 outputs a chrominance intra-frame prediction parameter intra_chroma_pred_mode to the chrominance intra-frame prediction parameter decoding portion 3043.

The luminance intra-frame prediction parameter decoding portion 3042 is configured to include: an MPM candidate list derivation portion 30421, the MPM parameter decoding portion 30422, and the non-MPM parameter decoding portion 30423 (a decoding portion and a derivation portion).

The MPM parameter decoding portion 30422 derives the luminance prediction mode IntraPredModeY with reference to the MPM candidate list mpmCandList[ ] derived by the MPM candidate list derivation portion 30421 and mpm_idx, and outputs the same to the intra-frame prediction image generation portion 310.

The non-MPM parameter decoding portion 30423 derives IntraPredModeY from the MPM candidate list mpmCandList[ ] and mpm_remainder, and outputs the same to the intra-frame prediction image generation portion 310.

The chrominance intra-frame prediction parameter decoding portion 3043 derives the chrominance prediction mode IntraPredModeC from intra_chroma_pred_mode, and outputs the same to the intra-frame prediction image generation portion 310.

The loop filter 305 is a filter provided in an encoding loop, and is a filter for eliminating block distortion and ringing distortion to improve image quality. The loop filter 305 performs filtering such as de-blocking filtering, Sampling Adaptive Offset (SAO), and Adaptive Loop Filtering (ALF) on the decoded image of the CU generated by the addition portion 312.

The reference picture memory 306 stores the decoded image of the CU generated by the addition portion 312 in a predefined position for each object picture and each object CU.

The prediction parameter memory 307 stores the prediction parameters in a predefined position for the CTU or the CU of each decoded object. Specifically, the prediction parameter memory 307 stores a parameter decoded by the parameter decoding portion 302, a prediction mode predMode separated by the entropy decoding portion 301, etc.

The prediction mode predMode, the prediction parameters, etc., are input into the prediction image generation portion 308. In addition, the prediction image generation portion 308 reads the reference picture from the reference picture memory 306. The prediction image generation portion 308 uses, in a prediction mode indicated by the prediction mode predMode, the prediction parameters and the read reference picture (reference picture block) to generate a prediction image of the block or the sub-block. Here, the reference picture block refers to a collection (generally a rectangle, and therefore it is referred to as a block) of pixels on the reference picture, and is a region referenced for prediction image generation.

(Intra-Frame Prediction Image Generation Portion 310)

If the prediction model predMode indicates the intra-frame prediction mode, then the intra-frame prediction image generation portion 310 performs intra-frame prediction by using the intra-frame prediction parameter input from the intra-frame prediction parameter decoding portion 304 and reference pixels read from the reference picture memory 306.

Specifically, the intra-frame prediction image generation portion 310 reads, from the reference picture memory 306, contiguous blocks on an object picture and within a predetermined range of distance to the object block. The contiguous blocks within the predetermined range are contiguous blocks on the left, top left, top, and top right of the object block, and vary with the regions referred to in the intra-frame prediction mode.

The intra-frame prediction image generation portion 310 generates a prediction image of an object block with reference to the read decoded pixel values and the prediction mode indicated by IntraPredMode. The intra-frame prediction image generation portion 310 outputs the generated prediction image of the block to the addition portion 312.

In the following, the generation of prediction images on the basis of intra-frame prediction modes is illustrated. In planar prediction, DC prediction, and angular prediction, a decoded peripheral region contiguous (close) to a prediction object block is set to a reference region R. Then, the prediction image is generated by extrapolating the pixels in the reference region R in a particular direction. For example, the reference region R may be configured to be an L-shaped region (e.g., the region represented by pixels marked by circles filled with diagonal lines) including the left and upper (or further, top-left, top-right, bottom-left) of the prediction object block.

(Details Regarding the Prediction Image Generation Portion)

Figure 10:
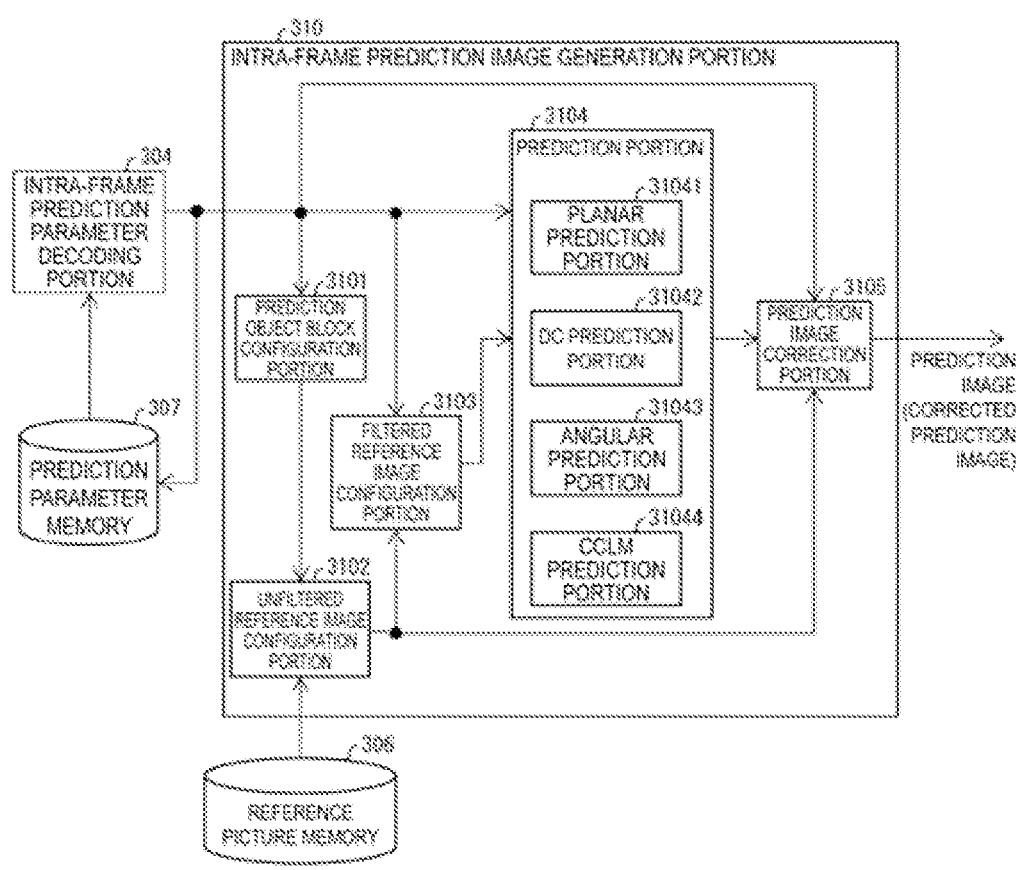
FIG. 10 is a diagram showing components of an intra-frame prediction image generation portion.

Next, details regarding the components of the intra-frame prediction image generation portion 310 are described by using FIG. 10. FIG. 10 is a diagram showing components of an intra-frame prediction image generation portion. The intra-frame prediction image generation portion 310 has: a prediction object block configuration portion 3101, an unfiltered reference image configuration portion 3102 (a first reference image configuration portion), a filtered reference image configuration portion 3103 (a second reference image configuration portion), a prediction portion 3104, and a prediction image correction portion 3105 (a prediction image correction portion, a filter switching portion, and a weighting coefficient change portion).

The prediction portion 3104 generates a temporary prediction image (a prediction image before correction) of the prediction object block on the basis of respective reference pixels (an unfiltered reference image) in the reference region R, a filtered reference image generated by a reference pixel filter (a first filter), and the intra-frame prediction mode, and outputs the same to the prediction image correction portion 3105. The prediction image correction portion 3105 corrects the temporary prediction image according to the intra-frame prediction mode, generates a prediction image (a corrected prediction image), and outputs the same.

In the following, the functions of the intra-frame prediction image generation portion 310 are described.
(Prediction Object Block Configuration Portion 3101)

The prediction object block configuration portion 3101 configures an object CU to be a prediction object block, and outputs information related to the prediction object block (prediction object block information). The prediction object block information includes at least a size, a position, and an index indicating luminance or chrominance of the prediction object block.

(Unfiltered Reference Image Configuration Portion 3102)

Figure 9:
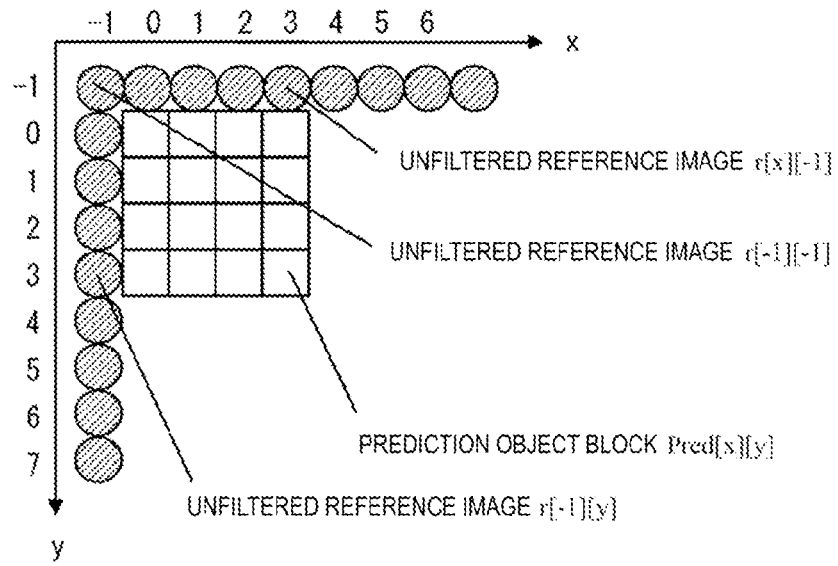
FIG. 9 is a diagram showing reference regions for intra-frame prediction.
Figure 9:
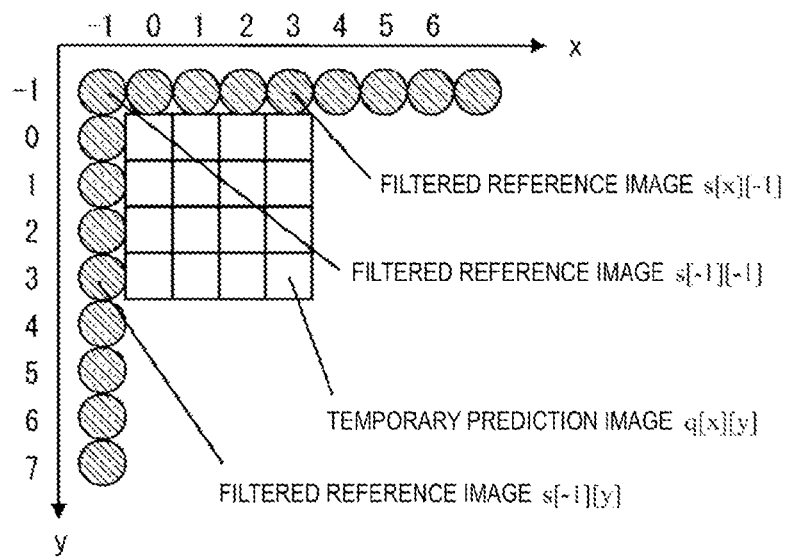

The unfiltered reference image configuration portion 3102 configures a contiguous peripheral region of the prediction object block to be the reference region R on the basis of the size and position of the prediction object block. Next, for each pixel value within the reference region R (unfiltered reference image, boundary pixels), each decoded pixel value at a corresponding position on the reference picture memory 306 is configured. FIG. 9 is a diagram showing reference regions for intra-frame prediction. The row r[x][−1] of decoded pixels contiguous to the upper side of the prediction object block and the column r[−1][y] of decoded pixels contiguous to the left side of the prediction object block shown in FIG. 9(a) are unfiltered reference images.

(Filtered Reference Image Configuration Portion 3103)

The filtered reference image configuration portion 3103 applies the reference pixel filter (the first filter) to the unfiltered reference image according to the intra-frame prediction mode, and derives the filtered reference image s[x][y] for each position (x, y) in the reference region R. Specifically, the filtered reference image (FIG. 9(b)) is derived by applying a low-pass filter to the unfiltered reference image of the position (x, y) and that surrounding the position (x, y). It should be noted that the low-pass filter does not necessarily need to be applied to all intra-frame prediction modes, and the low-pass filter may also be applied to part of the intra-frame prediction modes. It should be noted that the filter applied to the unfiltered reference image in the reference region R in the filtered reference pixel configuration portion 3103 is referred to as the "reference pixel filter (first filter)," and correspondingly, the filter for correcting the temporary prediction image in the prediction image correction portion 3105 described later is referred to as the "boundary filter (second filter)."

(Functions of the Intra-Frame Prediction Portion 3104)

The intra-frame prediction portion 3104 generates the temporary prediction image (the temporary prediction pixel values, the prediction image before correction) of the prediction object block on the basis of the intra-frame prediction mode, the unfiltered reference image, and the filtered reference pixel values, and outputs the same to the prediction image correction portion 3105. The prediction portion 3104 is provided internally with: a planar prediction portion 31041, a DC prediction portion 31042, an angular prediction portion 31043, and a CCLM prediction portion (the prediction image generation device) 31044. The prediction portion 3104 selects a specific prediction portion according to the intra-frame prediction mode, and inputs an unfiltered reference image and a filtered reference image. The relationship between the intra-frame prediction mode and a corresponding prediction portion is shown below.

Planar prediction . . . Planar prediction portion 31041
DC prediction . . . DC prediction portion 31042
Angular prediction . . . Angular prediction portion 31043
CCLM prediction . . . CCLM prediction portion 31044

(Planar Prediction)

The planar prediction portion 31041 generates a temporary prediction image by linearly adding a plurality of filtered reference images according to a distance between a prediction object pixel position and a reference pixel position, and outputs the same to the prediction image correction portion 3105.

(DC Prediction)

The DC prediction portion 31042 derives a DC prediction value equivalent to an average of the filtered reference image s[x][y], and outputs a temporary prediction image q[x][y] regarding DC prediction values as pixel values.

(Angular Prediction)

The angular prediction portion 31043 generates a temporary prediction image q[x][y] by using the filtered reference image s[x][y] in a prediction direction (reference direction) shown in the intra-frame prediction mode, and outputs the same to the prediction image correction portion 3105.

(Cross-Component Linear Model (CCLM) Prediction)

The CCLM prediction portion 31044 predicts chrominance pixel values on the basis of luminance pixel values. Specifically, a prediction image of the chrominance image (Cb, Cr) is generated by using a linear model on the basis of a decoded luminance image.

(Functions of the Prediction Image Correction Portion 3105)

The prediction image correction portion 3105 corrects, according to the intra-frame prediction mode, a temporary prediction image outputted from prediction portion 3104. Specifically, for each pixel of the temporary prediction image, the prediction image correction portion 3105 performs weighted adding (weighted averaging) on ab unfiltered reference image and a temporary prediction image according to a distance between a reference region R and an object prediction pixel, so as to derive a prediction image (corrected prediction image) Pred acquired by correcting the temporary prediction image. It should be noted that in some intra-frame prediction modes (e.g., planar prediction, DC prediction, etc.), the temporary prediction image may not necessarily be corrected by the prediction image correction portion 3105, and an output of the prediction portion 3104 is directly regarded as the prediction image.

The inverse quantization/inverse transform portion 311 inversely quantizes the quantization and transform coefficient input from the entropy decoding portion 301 to acquire a transform coefficient. The quantization and transform coefficient is a coefficient acquired by performing frequency transform and quantization such as Discrete Cosine Transform (DCT), Discrete Sine Transform (DST), etc., on the prediction error in the encoding processing. The inverse quantization/inverse transform portion 311 performs inverse frequency transform such as inverse DCT, inverse DST, etc., on the acquired transform coefficient to calculate the prediction error. The inverse quantization/inverse transform portion 311 outputs the prediction error to the addition portion 312.

The addition portion 312 adds the prediction image of the block input from the prediction image generation portion 308 to the prediction error input from the inverse quantization/inverse transform portion 311 for each pixel to generate a decoded image of the block. The addition portion 312 stores the decoded image of the block in the reference picture memory 306, and outputs the same to the loop filter 305.

(Functions of the Moving Image Encoding Device)

Figure 15:
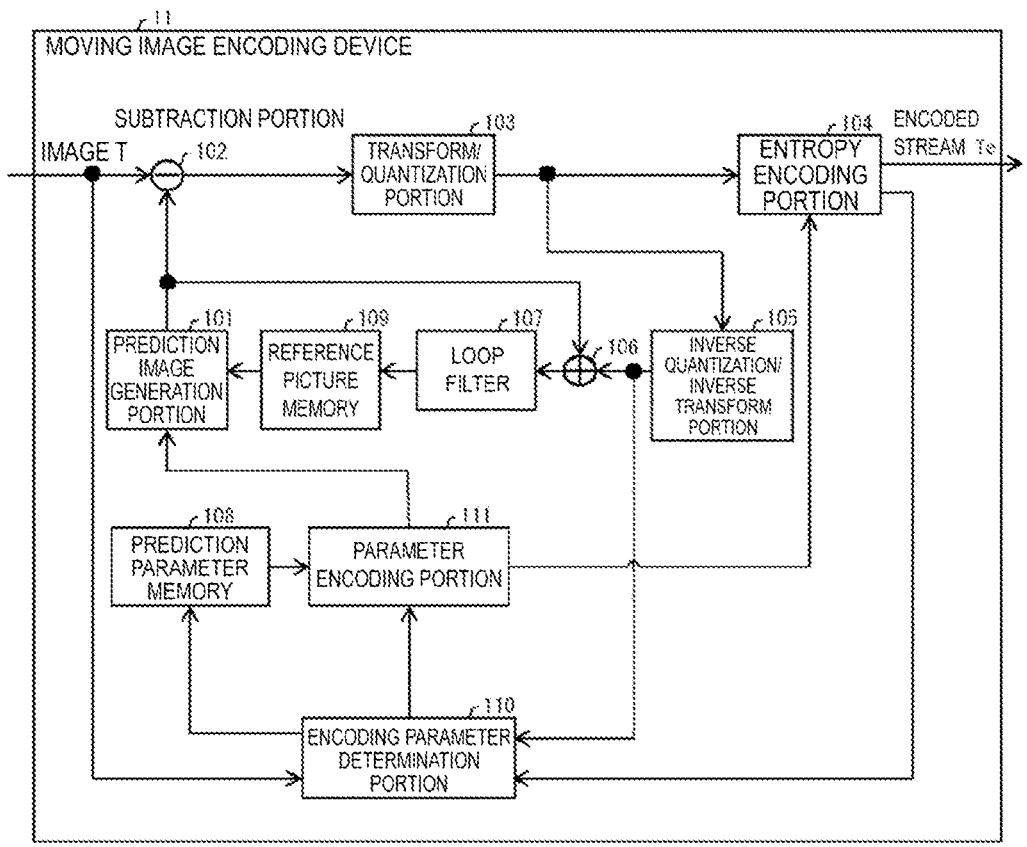
FIG. 15 is a block diagram showing components of a moving image encoding device.

Next, components of the moving image encoding device 11 according to this embodiment are described. FIG. 15 is a block diagram showing components of the moving image encoding device 11 according to this embodiment. The moving image encoding device 11 is configured to include: a prediction image generation portion 101, a subtraction portion 102, a transform/quantization portion 103, an inverse quantization/inverse transform portion 105, an addition portion 106, a loop filter 107, a prediction parameter memory (prediction parameter storage portion, frame memory) 108, a reference picture memory (reference image storage portion, frame memory) 109, an encoding parameter determination portion 110, a parameter encoding portion 111, and an entropy encoding portion 104.

The prediction image generation portion 101 generates a prediction image according to regions formed by splitting each picture of each image T, namely, according to the CU. The prediction image generation portion 101 performs the same action as the prediction image generation portion 308 described above, and the description therefor is omitted here.

The subtraction portion 102 subtracts a pixel value of the prediction image of the block input from the prediction image generation portion 101 from a pixel value of the image T to generate a prediction error. The subtraction portion 102 outputs the prediction error to the transform/quantization portion 103.

The transform/quantization portion 103 calculates a transform coefficient by performing frequency transform on the prediction error input from the subtraction portion 102, and derives a quantization and transform coefficient by means of quantization. The transform/quantization portion 103 outputs the quantization and transform coefficient to the entropy encoding portion 104 and the inverse quantization/inverse transform portion 105.

The inverse quantization/inverse transform portion 105 is the same as the inverse quantization/inverse transform portion 311 (FIG. 7) in the moving image decoding device 31, and therefore the description therefor is omitted here. The calculated prediction error is input to the addition portion 106.

In the entropy encoding portion 104, the quantization and transform coefficient is input from the transform/quantization portion 103, and encoding parameters are input from the parameter encoding portion 111. The encoding parameters include, for example, codes such as a reference picture index refIdxLX, a prediction vector index mvp_LX_idx, a difference vector mvdLX, a motion vector accuracy mode amvr_mode, a prediction mode predMode, and a merge index merge_idx.

The entropy encoding portion 104 performs entropy encoding on splitting information, the prediction parameters, the quantization and transform coefficient, etc., to generate an encoded stream Te, and outputs the same.

Figure 14:
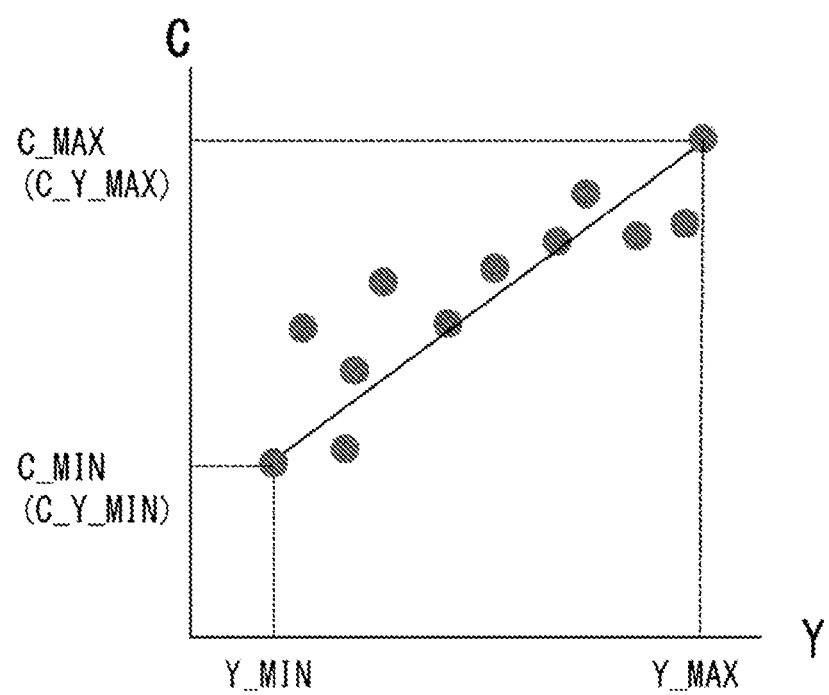
FIG. 14 is a diagram showing an example of a combination (of luminance and chrominance) used in CCLM prediction according to this embodiment.

The parameter encoding portion 111 includes a header encoding portion, a CT information encoding portion, a CU encoding portion (prediction mode encoding portion), an inter-frame prediction parameter encoding portion, and an intra-frame prediction parameter encoding portion all of which are not shown in FIG. 14. The CU encoding portion further includes a TU encoding portion.

(Functions of the Intra-Frame Prediction Parameter Encoding Portion 113)

The intra-frame prediction parameter encoding portion 113 derives an encoding form (e.g., mpm_idx, mpm_remainder, etc.) according to an intra-frame prediction mode IntraPredMode input from the encoding parameter determination portion 110. The intra-frame prediction parameter encoding portion 113 includes the components same as part of the components causing the intra-frame prediction parameter decoding portion 304 to derive an intra-frame prediction parameter.

Figure 16:
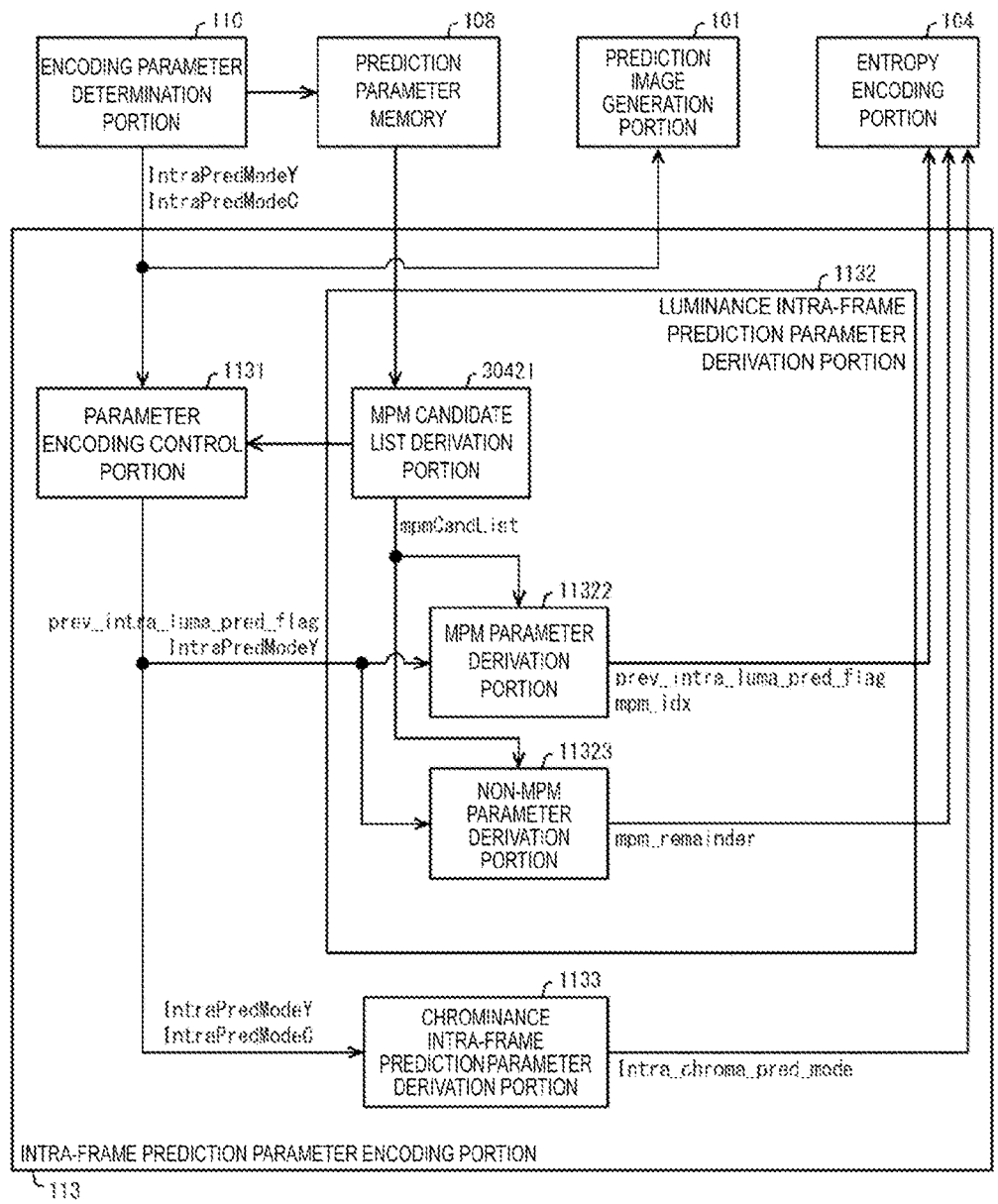
FIG. 16 is a schematic diagram showing components of an intra-frame prediction parameter encoding portion.

FIG. 16 is a schematic diagram showing components of an intra-frame prediction parameter encoding portion. FIG. 16 shows the components of the intra-frame prediction parameter encoding portion 113 of the parameter encoding portion 111. The intra-frame prediction parameter encoding portion 113 is configured to include: a parameter encoding control portion 1131, a luminance intra-frame prediction parameter derivation portion 1132, and a chrominance intra-frame prediction parameter derivation portion 1133.

The luminance prediction mode IntraPredModeY and the chrominance prediction mode IntraPredModeC are input to the parameter encoding control portion 1131 from the encoding parameter determination portion 110. The parameter encoding control portion 1131 determines intra_luma_mpm_flag with reference to the MPM candidate list mpmCandList[ ] of the candidate list derivation portion 30421. Then, intra_luma_mpm_flag and IntraPredModeY are outputted to the luminance intra-frame prediction parameter derivation portion 1132. Further, IntraPredModeC is outputted to the chrominance intra-frame prediction parameter derivation portion 1133.

The luminance intra-frame prediction parameter derivation portion 1132 is configured to include: an MPM candidate list derivation portion 30421 (a candidate list derivation portion), an MPM parameter derivation portion 11322, and a non-MPM parameter derivation portion 11323 (an encoding portion and a derivation portion).

The MPM candidate list derivation portion 30421 derives the MPM candidate list mpmCandList[ ] with reference to the intra-frame prediction mode of contiguous blocks stored in the prediction parameter memory 108. The MPM parameter derivation portion 11322 derives mpm_idx from IntraPredModeY and mpmCandList[ ] if intra_luma_mpm_flag is 1, and outputs the same to the entropy encoding portion 104. The non-MPM parameter derivation portion 11323 derives mpm_remainder from IntraPredModeY and mpmCandList[ ] if intra_luma_mpm_flag is 0, and outputs the same to the entropy encoding portion 104.

The chrominance intra-frame prediction parameter derivation portion 1133 derives intra_chroma_pred_mode from IntraPredModeY and IntraPredModeC, and outputs the same.

The addition portion 106 adds the pixel value of the prediction image of the block input from the prediction image generation portion 101 to the prediction error input from the inverse quantization/inverse transform portion 105 for each pixel so as to generate a decoded image. The addition portion 106 stores the generated decoded image in the reference picture memory 109.

The loop filter 107 performs de-blocking filtering, SAO, and ALF on the decoded image generated by the addition portion 106. It should be noted that the loop filter 107 does not necessarily include the above three filters, for example, the loop filter 107 may include only a de-blocking filter.

The prediction parameter memory 108 stores the prediction parameters generated by the encoding parameter determination portion 110 in a predefined position for each object picture and each CU.

The reference picture memory 109 stores the decoded image generated by the loop filter 107 in a predefined position for each object picture and each CU.

The encoding parameter determination portion 110 selects one of a plurality of sets of encoding parameters. The encoding parameters refer to the aforementioned QT, BT, or TT splitting information, prediction parameters, or parameters generated in association with the same and serving as encoding objects. The prediction image generation portion 101 uses these encoding parameters to generate the prediction image.

The encoding parameter determination portion 110 calculates an RD cost value denoting an information size and the encoding error for each of the plurality of sets. The RD cost value is, for example, the sum of a code quantity and a value acquired by multiplying a square error by a coefficient $\lambda$. The encoding parameter determination portion 110 selects a set of encoding parameters having a lowest calculated cost value. Therefore, the entropy encoding portion 104 uses the selected set of encoding parameters as the encoded stream Te, and outputs the same. The encoding parameter determination portion 110 stores the determined encoding parameters in the prediction parameter memory 108.

It should be noted that a part of the moving image encoding device 11 and the moving image decoding device 31 in the above embodiment, for example, the entropy decoding portion 301, the parameter decoding portion 302, the loop filter 305, the prediction image generation portion 308, the inverse quantization/inverse transform portion 311, the addition portion 312, the prediction image generation portion 101, the subtraction portion 102, the transform/quantization portion 103, the entropy encoding portion 104, the inverse quantization/inverse transform portion 105, the loop filter 107, the encoding parameter determination portion 110, and the parameter encoding portion 111 can be implemented by means of a computer. In this case, it can be implemented by recording a program for implementing the control function in a computer-readable recording medium and causing a computer system to read and execute the program recorded in the recording medium. It should be noted that the described "computer system" refers to a computer system built in any one of the moving image encoding device 11 and the moving image decoding device 31 and including an operation system (OS) and hardware such as a peripheral apparatus. In addition, the "computer-readable recording medium" refers to a removable medium such as a floppy disk, a magneto-optical disk, an ROM, and a CD-ROM and a storage device such as a hard disk built in the computer system. Moreover, the "computer-readable recording medium" may also include a recording medium for dynamically storing a program for a short time period such as a communication line used to transmit a program over a network such as the Internet or over a telecommunication line such as a telephone line, and may also include a recording medium for storing a program for a fixed time period such as a volatile memory in the computer system for functioning as a server or a client in such a case. In addition, the program described above may be a program for implementing a part of the functions described above, and may also be a program capable of implementing the functions described above in combination with a program already recorded in the computer system.

In addition, the moving image encoding device 11 and the moving image decoding device 31 in the above embodiment may be partially or completely implemented as integrated circuits such as Large Scale Integration (LSI) circuits. The functional blocks of the moving image encoding device 11 and the moving image decoding device 31 may be individually implemented as processors, or may be partially or completely integrated into a processor. In addition, the circuit integration method is not limited to LSI, and the integrated circuits may be implemented as dedicated circuits or a general-purpose processor. In addition, with advances in semiconductor technology, a circuit integration technology with which LSI is replaced appears, and therefore an integrated circuit based on the technology may also be used.

An embodiment of the present invention has been described in detail above with reference to the accompanying drawings; however, the specific configuration is not limited to the above embodiment, and various amendments can be made to a design without departing from the scope of the gist of the present invention.

APPLICATION EXAMPLES

The moving image encoding device 11 and the moving image decoding device 31 described above can be used in a state of being mounted on various devices for transmitting, receiving, recording, and reproducing a moving image. It should be noted that the moving image may be a natural moving image captured by a video camera or the like, or may be an artificial moving image (including CG and GUI) generated by means of a computer or the like.

Figure 2:
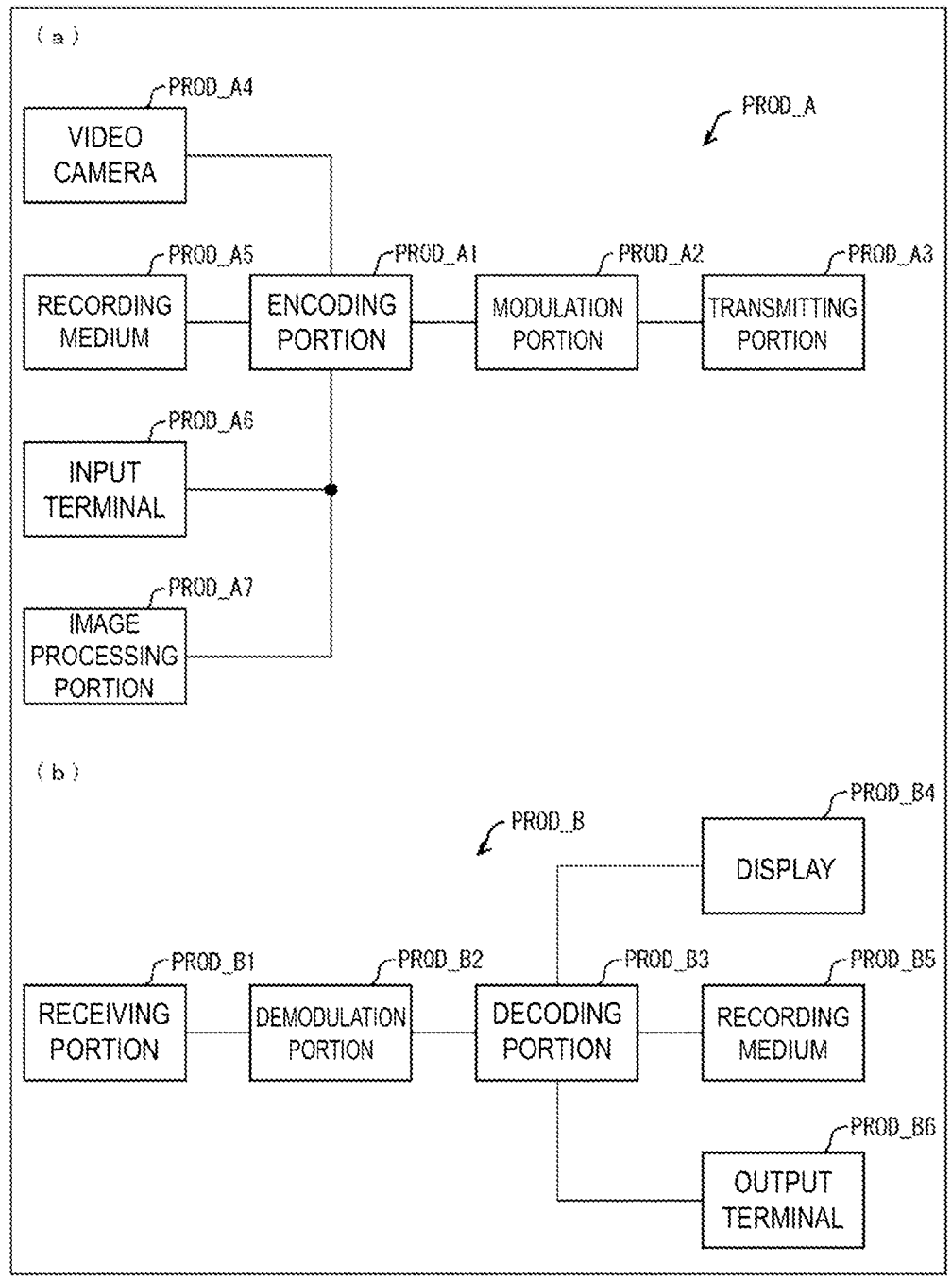
FIG. 2 is a diagram showing components of a transmitting device equipped with a moving image encoding device according to this embodiment and components of a receiving device equipped with a moving image decoding device according to this embodiment.

FIG. 2 is a diagram showing components of a transmitting device equipped with a moving image encoding device according to this embodiment and components of a receiving device equipped with a motion image decoding device according to this embodiment. Firstly, with reference to FIG. 2, a description of that the moving image encoding device 11 and the moving image decoding device 31 described above can be used to transmit and receive the moving image is provided.

FIG. 2(*a*) is a block diagram showing components of a transmitting device PROD_A equipped with the moving image encoding device 11. As shown in FIG. 2(*a*), the transmitting device PROD_A includes: an encoding portion PROD_A1 for acquiring encoded data by encoding the moving image, a modulation portion PROD_A2 for acquiring a modulation signal by using the encoded data acquired by the encoding portion PROD_A1 to modulate a carrier, and a transmitting portion PROD_A3 for transmitting the modulation signal acquired by the modulation portion PROD_A2. The moving image encoding device 11 described above is used as the encoding portion PROD_A1.

As a source for providing the moving image input to the encoding portion PROD_A1, the transmitting device PROD_A may further include: a video camera PROD_A4 for capturing a moving image, a recording medium PROD_A5 on which the moving image is recorded, an input terminal PROD_A6 for inputting a moving image from the external, and an image processing portion A7 for generating or processing an image. FIG. 2(*a*) exemplarily shows that the transmitting device PROD_A includes all of these components, but a part of these components can be omitted.

It should be noted that the recording medium PROD_A5 may be a medium on which a moving image not encoded is recorded, or may be a medium on which a moving image encoded by using an encoding method for recording different from the encoding method for transmission is recorded. In the latter case, a decoding portion (not shown) for decoding, according to the encoding method for recording, the encoded data read from the recording medium PROD_A5 may be provided between the recording medium PROD_A5 and the encoding portion PROD_A1.

FIG. 2(*b*) is a block diagram showing components of a receiving device PROD_B equipped with the moving image decoding device 31. As shown in FIG. 2(*b*), the receiving device PROD_B includes: a receiving portion PROD_B1 for receiving the modulation signal, a demodulation portion PROD_B2 for acquiring the encoded data by demodulating the modulation signal received by the receiving portion PROD_B1, and a decoding portion PROD_B3 for acquiring the moving image by decoding the encoded data acquired by the demodulation portion PROD_B2. The moving image decoding device 31 described above is used as the decoding portion PROD_B3.

The receiving device PROD_B serves as a destination of provision of the moving image outputted by the decoding portion PROD_B3, and may further include a display PROD_B4 for displaying the moving image, a recording medium PROD_B5 for recording the moving image, and an output terminal PROD_B6 for outputting the moving image to the external. FIG. 2(b) exemplarily shows that the receiving device PROD_B includes all of these components, but a part of these components can be omitted.

It should be noted that the recording medium PROD_B5 may be a medium on which a moving image not encoded is recorded, or may be a medium on which a moving image encoded by using an encoding method for recording different from the encoding method for transmission is recorded. In the latter case, an encoding portion (not shown) for encoding, according to the encoding method for recording, the moving image acquired from the decoding portion PROD_B3 may be provided between the decoding portion PROD_B3 and the recording medium PROD_B5.

It should be noted that a transmission medium for transmitting the modulation signal may be wireless or wired. In addition, a transmission scheme for transmitting the modulation signal may be broadcasting (here, referred to a transmission scheme of which the transmission destination is not determined in advance) or communication (here, referred to a transmission scheme of which the transmission destination is determined in advance). That is, transmission of the modulation signal may be implemented by means of any one of wireless broadcasting, wired broadcasting, wireless communication, and wired communication.

For example, a broadcast station (broadcast apparatus and the like)/receiving station (television receiver and the like) of digital terrestrial broadcasting is an example of the transmitting device PROD_A/receiving device PROD_B transmitting or receiving the modulation signal by means of wireless broadcasting. In addition, a broadcast station (broadcast apparatus and the like)/receiving station (television receiver and the like) of cable television broadcasting is an example of the transmitting device PROD_A/receiving device PROD_B transmitting or receiving the modulation signal by means of wired broadcasting.

In addition, a server (workstation and the like)/client (television receiver, personal computer, smart phone, and the like) using a Video On Demand (VOD) service and a moving image sharing service on the Internet is an example of the transmitting device PROD_A/receiving device PROD_B transmitting or receiving the modulation signal by means of communication (generally, a wireless or wired transmission medium is used in LAN, and a wired transmission medium is used in WAN). Here, the personal computer includes a desktop PC, a laptop PC, and a tablet PC. In addition, the smart phone also includes a multifunctional mobile phone terminal.

It should be noted that the client using the moving image sharing service has a function for decoding encoded data downloaded from the server and displaying the same on a display and a function for encoding a moving image captured by a video camera and uploading the same to the server. That is, the client using the moving image sharing service functions as both the transmitting device PROD_A and the receiving device PROD_B.

Figure 3:
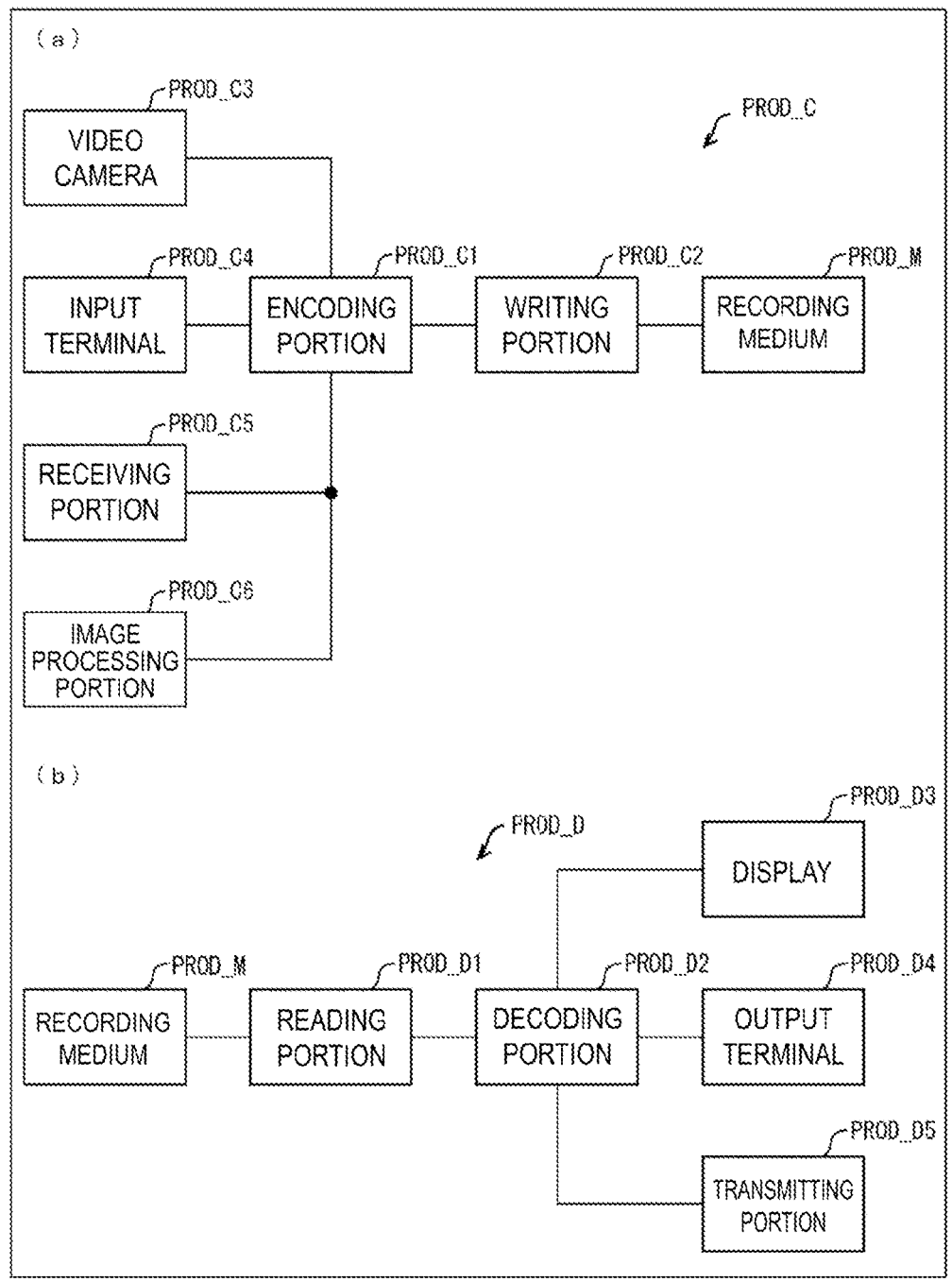
FIG. 3 is a diagram showing components of a recording device equipped with a moving image encoding device according to this embodiment and a reproducing device equipped with a moving image decoding device according to this embodiment.

Next, with reference to FIG. 3, a description of that the moving image encoding device 11 and the moving image decoding device 31 described above can be used to record and reproduce the moving image is provided. FIG. 3 is a diagram showing components of a recording device equipped with a moving image encoding device according to this embodiment and a reproducing device equipped with a moving image decoding device according to this embodiment.

FIG. 3(a) is a block diagram showing components of a recording device PROD_C equipped with the moving image encoding device 11 described above. As shown in FIG. 3(a), the recording device PROD_C includes: an encoding portion PROD_C1 for acquiring encoded data by encoding the moving image and a writing portion PROD_C2 for writing the encoded data acquired by the encoding portion PROD_C1 in a recording medium PROD M. The moving image encoding device 11 described above is used as the encoding portion PROD_C1.

It should be noted that the recording medium PROD M may be (1) a recording medium built in the recording device PROD_C such as a Hard Disk Drive (HDD) and a Solid State Drive (SSD), may also be (2) a recording medium connected to the recording device PROD_C such as an SD memory card and a Universal Serial Bus (USB) flash memory, and may also be (3) a recording medium loaded into a drive device (not shown) built in the recording device PROD_C such as a Digital Versatile Disc (DVD, registered trademark) and a Blu-ray Disc (BD, registered trademark).

In addition, as a source for providing the moving image input to the encoding portion PROD_C1, the recording device PROD_C may further include: a video camera PROD_C3 for capturing a moving image, an input terminal PROD_C4 for inputting a moving image from the external, a receiving portion PROD_C5 for receiving a moving image, and an image processing portion PROD_C6 for generating or processing an image. FIG. 3(a) exemplarily shows that the recording device PROD_C includes all of these components, but a part of these components can be omitted.

It should be noted that the receiving portion PROD_C5 can receive an un-encoded moving image, and can also receive encoded data encoded by using an encoding method for transmission different from the encoding method for recording. In the latter case, a decoding portion for transmission (not shown) for decoding the encoded data encoded by using the encoding method for transmission may be provided between the receiving portion PROD_C5 and the encoding portion PROD_C1.

Examples of such recording device PROD_C include: a DVD recorder, a BD recorder, a Hard Disk Drive (HDD) recorder, etc. (in this case, the input terminal PROD_C4 or the receiving portion PROD_C5 is a main source for providing the moving image). In addition, a portable video camera (in this case, the video camera PROD_C3 is the main source for providing the moving image), a personal computer (in this case, the receiving portion PROD_C5 or the image processing portion C6 is the main source for providing the moving image), and a smart phone (in this case, the video camera PROD_C3 or the receiving portion PROD_C5 is the main source for providing the moving image) are also included in the examples of such recording device PROD_C.

FIG. 3(b) is a block diagram showing components of a reproducing device PROD_D equipped with the moving image decoding device 31 described above. As shown in FIG. 3(b), the reproducing device PROD_D includes: a reading portion PROD_D1 for reading the encoded data having been written in the recording medium PROD M and a decoding portion PROD_D2 for acquiring the moving image by decoding the encoded data read by the reading portion PROD_D1. The moving image decoding device 31 described above is used as the decoding portion PROD_D2.

It should be noted that the recording medium PROD M may be (1) a recording medium built in the reproducing device PROD_D such as an HDD and an SSD, may also be (2) a recording medium connected to the reproducing device PROD_D such as an SD memory card and a USB flash memory, and may also be (3) a recording medium loaded into a drive device (not shown) built in the reproducing device PROD_D such as a DVD and a BD.

In addition, as a destination of provision of the moving image outputted by the decoding portion PROD_D2, the reproducing device PROD_D may further include: a display PROD_D3 for displaying the moving image, an output terminal PROD_D4 for outputting the moving image to the external, and a transmitting portion PROD_D5 for transmitting the moving image. FIG. 3(b) exemplarily shows that the reproducing device PROD_D includes all of these components, but a part of these components can be omitted.

It should be noted that the transmitting portion PROD_D5 can transmit an un-encoded moving image, and can also transmit encoded data encoded by using an encoding method for transmission different from the encoding method for recording. In the latter case, an encoding portion (not shown) for encoding the moving image by using the encoding method for transmission may be provided between the decoding portion PROD_D2 and the transmitting portion PROD_D5.

Examples of such reproducing device PROD_D include a DVD player, a BD player, an HDD player, and the like (in this case, the output terminal PROD_D4 connected to a television receiver and the like is a main destination of provision of the moving image). In addition, a television receiver (in this case, the display PROD_D3 is the main destination of provision of the moving image), a digital signage (also referred to as an electronic signage or an electronic bulletin board, and the display PROD_D3 or the transmitting portion PROD_D5 is the main destination of provision of the moving image), a desktop PC (in this case, the output terminal PROD_D4 or the transmitting portion PROD_D5 is the main destination of provision of the moving image), a laptop or tablet PC (in this case, the display PROD_D3 or the transmitting portion PROD_D5 is the main destination of provision of the moving image), a smart phone (in this case, the display PROD_D3 or the transmitting portion PROD_D5 is the main destination of provision of the moving image), and the like are also examples of such reproducing device PROD_D.

(Chrominance Intra-Frame Prediction Mode)

Next, the CCLM prediction is described with reference to FIGS. 11 to 14.

The intra-frame prediction parameter decoding portion 304 refers to the luminance prediction mode IntraPredModeY, intra_chroma_pred_mode, and the table of FIG. 11(b) when deriving the chrominance prediction mode IntraPredModeC described above. FIG. 11(b) illustrates the derivation method for IntraPredModeC. If intra_chroma_pred_mode is 0 to 3 and 7, then IntraPredModeC is derived depending on the value of IntraPredModeY. For example, if intra_chroma_pred_mode is 0 and IntraPredModeY is 0, then IntraPredModeC is 66. Furthermore, if intra_chroma_pred_mode is 3 and IntraPredModeY is 50, then IntraPredModeC is 1. It should be noted that the values of IntraPredModeY and IntraPredModeC represent the intra-frame prediction mode of FIG. 6. If intra_chroma_pred_mode is 4 to 6, then IntraPredModeC is derived without depending on the value of IntraPredModeY. intra_chroma_pred_mode=81 (INTRA_LT_CCLM), 82 (INTRA_L_CCLM), and 83 (INTRA_T_CCLM) are respectively a mode in which a prediction image of a chrominance image is generated on the basis of the luminance image of the upper and left contiguous blocks, a mode in which a prediction image of a chrominance image is generated on the basis of the luminance image of the left contiguous block, and a mode in which a prediction image of a chrominance image is generated on the basis of the luminance image of the upper contiguous block.

The following describes CCLM prediction. In the drawings, object blocks and contiguous blocks of the luminance image are represented by pY[ ][ ] and pRefY[ ][ ]. The object block has a width of bW and a height of bH.

The CCLM prediction portion 31044 (the unfiltered reference image configuration portion 3102) derives CCLM prediction parameters by using the luminance contiguous image pRefY[ ][ ] of FIGS. 13(a)-(c) and the chrominance contiguous image pRefC[ ][ ] of FIG. 13(e) as reference regions. The CCLM prediction portion 31044 derives a chrominance prediction image by using the luminance object image pRef[ ].

Figure 13:
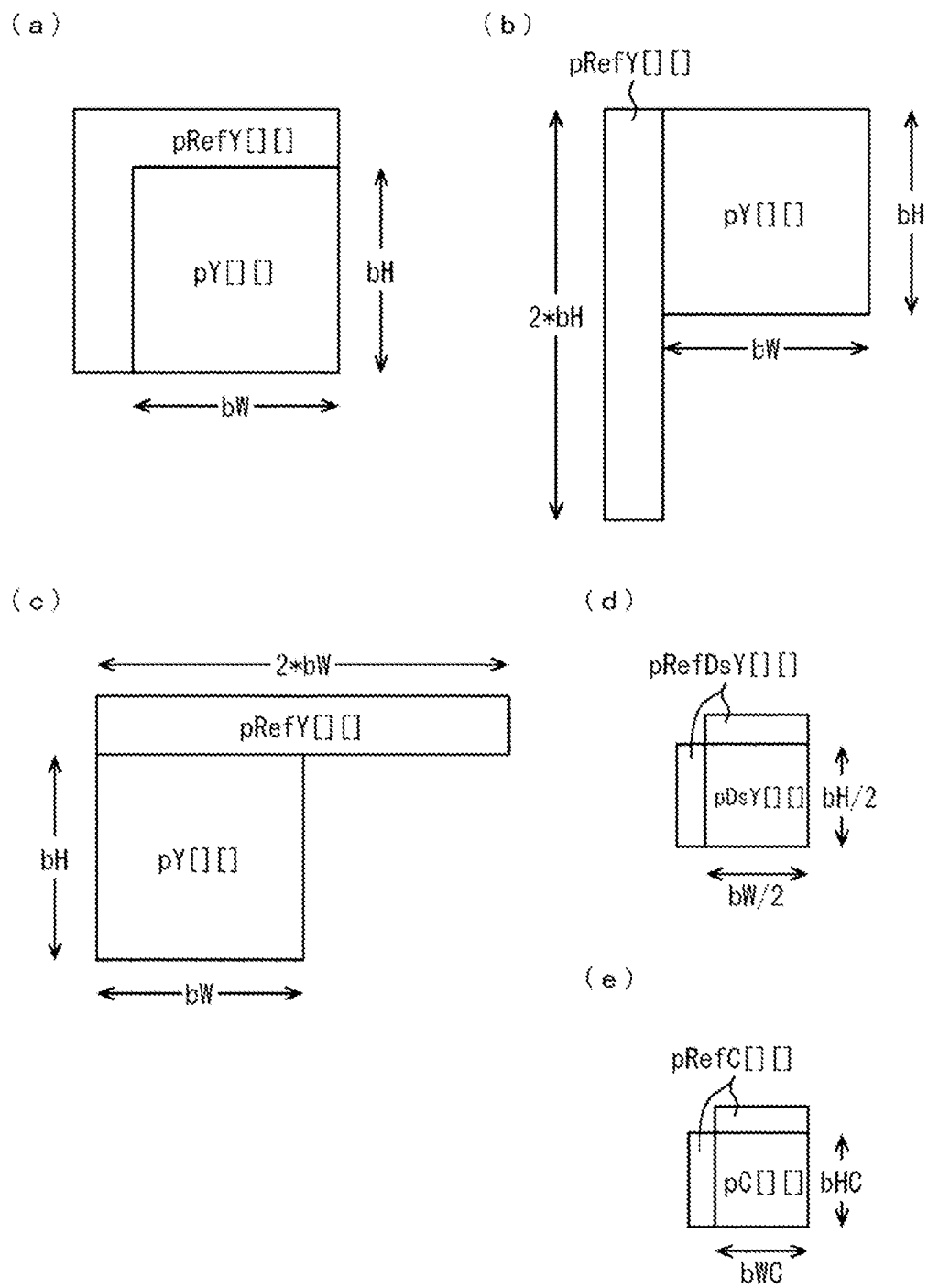
FIG. 13 is a diagram illustrating pixels referred to in derivation of CCLM prediction parameters according to an embodiment of the present invention.

FIG. 13 is a diagram illustrating pixels referred to in derivation of CCLM prediction parameters according to an embodiment of the present invention. The CCLM prediction portion 31044 derives CCLM prediction parameters by using pixel values of the upper and left contiguous blocks of the object block if intra_chroma_pred_mode is 81 (INTRA_LT_CCLM), as shown in FIG. 13(a), derives CCLM prediction parameters by using pixel values of the left contiguous block if intra_chroma_pred_mode is 82 (INTRA_L_CCLM), as shown in FIG. 13(b), and derives CCLM prediction parameters by using pixel values of the upper contiguous block if intra_chroma_pred_mode is 83 (INTRA_T_CCLM), as shown in FIG. 13(c). The size of the regions can be as follows. In FIG. 13(a), the upper side of the object block has a width of bW and a height of refH (refH>1), and the left side of the object block has a height of bH and a width of refW (refW>1). In FIG. 13(b), the height is 2*bH, and the width is refW. In FIG. 13(c), the width is 2*bW, and the height is refH. In order to implement downsampling processing, refW and refH may be set to a value greater than 1 by matching the number of taps of a downsampling filter. Furthermore, in FIG. 13(e), the object block and the contiguous block of the chrominance image (Cb, Cr) are represented by pC[ ][ ] and pRefC[ ][ ]. The object block has a width of bWC and a height of bHC.

(CCLM Prediction Portion)

Figure 11:
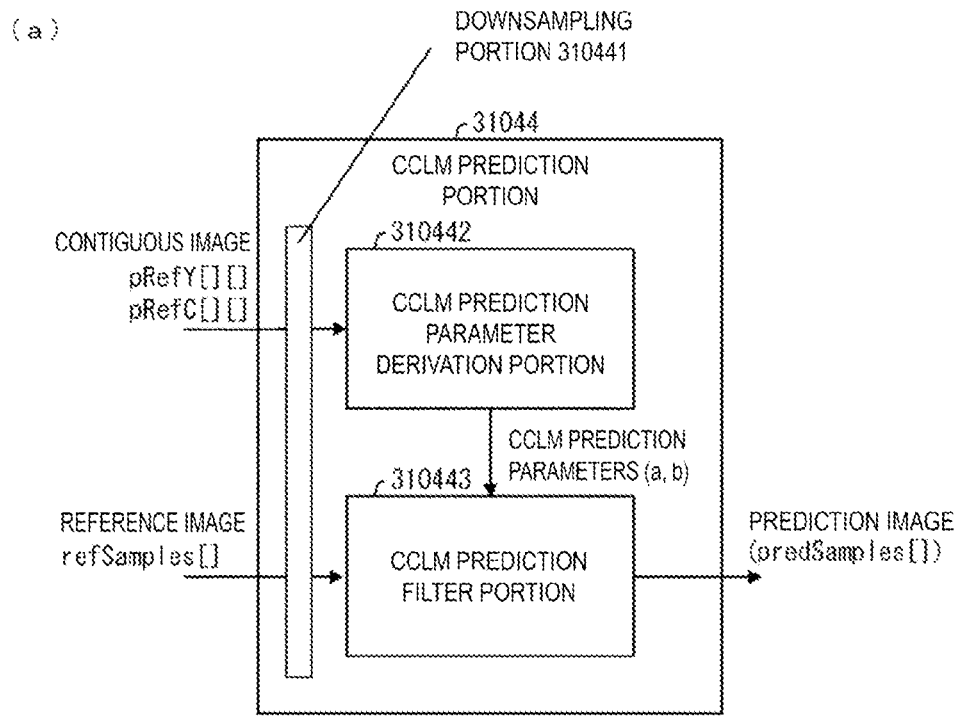
FIG. 11 is a block diagram showing an example of the components of the CCLM prediction portion.

The CCLM prediction portion 31044 is described on the basis of FIG. 11. FIG. 11 is a block diagram showing an example of the components of the CCLM prediction portion 31044. FIG. 11(a) is a block diagram showing an example of components of a CCLM prediction portion according to an embodiment of the present invention, and FIG. 11(b) is a diagram showing a derivation method of IntraPredModeC. The CCLM prediction portion 31044 includes: a downsampling portion 310441, a CCLM prediction parameter derivation portion (parameter derivation portion) 310442, and a CCLM prediction filter portion 310443.

The downsampling portion 310441 downsamples pRefY[ ][ ] and pY[ ][ ], to match the size of the chrominance image. If a chrominance format is 4:2:0, then the horizontal and vertical pixel numbers of pRefY[ ][ ] and pY[ ][ ] are sampled as 2:1, and results are stored at pRefDsY[ ][ ] and pDsY[ ][ ] of FIG. 13(d). It should be noted that, bW/2 and bH/2 are respectively equal to bWC and bHC. If a chrominance format is 4:2:2, then the horizontal pixel numbers of pRefY[ ][ ] and pY[ ][ ] are sampled as 2:1, and results are stored at pRefDsY[ ] and pDsY[ ][ ]. If a chrominance format is 4:4:4, then no sampling is implemented, and pRefY[ ][ ] and pY[ ][ ] are stored at pRefDsY[ ][ ] and pDsY[ ][ ]. An example of sampling is represented by the following formulas.

$$pDsY[x][y]=(pY[2*x-1][2*y]+pY[2*x-1][2*y+1]+$$
$$2*pY[2*x][2*y]+2*pY[2*x][2*y+1]+pY[2*x+1]$$
$$[2*y]+pY[2*x+1][2*y+1]+4)>>3pRefDsY[x][y]=$$
$$(pRefY[2*x-1][2*y]+pRefY[2*x-1][2*y+1]+$$
$$2*pRefY[2*x][2*y]+2*pRefY[2*x][2*y+1]+$$
$$pRefY[2*x+1][2*y]+pRefY[2*x+1][2*y+1]+$$
$$4)>>3$$

The CCLM prediction filter portion 310443 regards a reference image refSamples[ ][ ] as an input signal, and outputs a prediction image predSamples[ ][ ] by using the CCLM prediction parameters (a, b).

$$predSamples[\ ][\ ]=((a*refSamples[\ ][\ ])>>shiftA)+b$$
(CCLM-1)

Here, refSamples is pDsY of FIG. 13(d); (a, b) is the CCLM prediction parameters derived by means of the CCLM prediction parameter derivation portion 310442; predSamples[ ][ ] is the chrominance prediction image (pC of FIG. 13(e)). It should be noted that (a, b) is respectively derived for Cb and Cr. Further, shiftA is a normalized shift number representing the precision of the value of a, and when the slope of decimal precision is set to af, a=af<<shiftA. For example shiftA=16.

Figure 12:
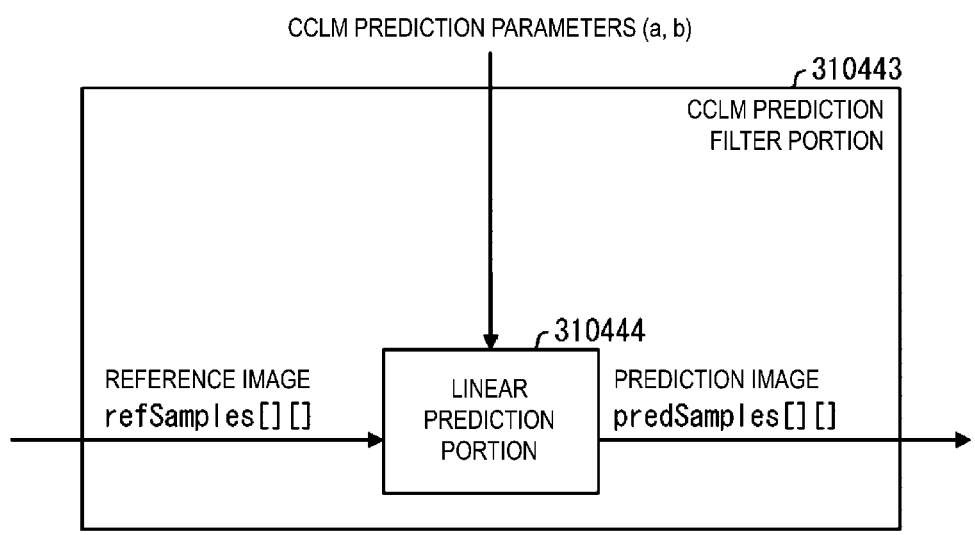
FIG. 12 is a block diagram showing an example of components of a CCLM prediction filter portion according to an embodiment of the present invention.

FIG. 12 is a block diagram showing an example of components of a CCLM prediction filter portion according to an embodiment of the present invention. FIG. 12 shows the components of the CCLM prediction filter portion 310443 that predicts the chrominance according to the luminance. As shown in FIG. 12, the CCLM prediction filter portion 310443 has a linear prediction portion 310444. The linear prediction portion 310444 regards refSamples[ ][ ] as an input signal, and outputs predSamples[ ][ ] by using the CCLM prediction parameters (a, b).

More specifically, the linear prediction portion 310444 derives the chrominance Cb or Cr according to the luminance Y by means of the following formula in which the CCLM prediction parameters (a, b) are used, and outputs predSamples[ ][ ] by using this chrominance Cb or Cr.

$$Cb(\text{or }Cr)=aY+b$$

The CCLM prediction parameter derivation portion 310442 derives the CCLM prediction parameters by using the downsampled contiguous block pRefY (pRefDsY[ ][ ] of FIG. 13(d)) of the luminance and the contiguous block pRefC[ ][ ] (pRefC[ ][ ] of FIG. 13(e)) of the chrominance as input signals. The CCLM prediction parameter derivation portion 310442 outputs the derived CCLM prediction parameters (a, b) to the CCLM prediction filter portion 310443.

(CCLM Prediction Parameter Derivation Portion)

The CCLM prediction parameter derivation portion 310442 derives the CCLM prediction parameters (a, b) in the case where a prediction block predSamples[ ][ ] of the object block is linearly predicted according to the reference block refSamples[ ][ ].

In the derivation of the CCLM prediction parameters (a, b), the CCLM prediction parameter derivation portion 310442 derives a point (x1, y1) where the luminance value Y is maximum (Y_MAX) and a point (x2, y2) where the luminance value Y is minimum (Y_MIN) from a group of a contiguous block (the luminance value Y, the chrominance value C). Next, pixel values of (x1, y1) and (x2, y2) on pRefC corresponding to (x1, y1) and (x2, y2) on pRefDsY are respectively set to C MAX (or C Y_MAX) and C MIN (or C Y_MIN). Then, as shown in FIG. 14, a straight line connecting (Y_MAX, C MAX) and (Y_MIN, C MIN) on a graph using Y and C as the x and y axes respectively is acquired. The CCLM prediction parameters (a, b) for this straight line can be derived by using the following formula.

$$a=(C\_MAX-C\_MIN)/(Y\_MAX-Y\_MIN)$$

$$b=C\_MIN-(a*Y\_MIN)$$

If the (a, b) is used, then shiftA of the formula (CCLM-1)=0.

It should be noted that the luminance difference value (diff) and the chrominance difference value (diffC) in the case of calculating the parameter a use a difference value between a maximum value Y_MAX of the luminance and a minimum value Y_MIN of the luminance and a difference value between a maximum value C_MAX of the chrominance and a minimum value C_MIN of the chrominance, but is not limited thereto. It should be noted that in the case of calculating the parameter b, Y_MIN and C_MIN are used as representative values of the required luminance and chrominance, but the representative values are not limited thereto. These are common in all embodiments of the present specification. For example, it may also be as shown below.

$$b=C\_MAX-(a*Y\_MAX)$$

In addition, the formula may also be as follows.

$$b=C\_AVE-(a*Y\_AVE)$$

Here, C_AVE and Y_AVE are respectively the average of the chrominance and the average of the luminance.

Here, if the chrominance is Cb, then (C_MAX, C_MIN) is the pixel values of (x1, y1) and (x2, y2) of the contiguous block pRefCb[ ][ ] of Cb, and if the chrominance is Cr, then (C_MAX, C_MIN) is the pixel values of (x1, y1) and (x2, y2) of the contiguous block pRefCr[ ][ ] of Cr.

It should be noted that the calculation cost of the division is high; therefore, the CCLM prediction parameters (a, b) are derived by using integer operations and table lookups instead of division. Specifically, calculation is performed by using the following formula. It should be noted that, in the following embodiment, a table excluding d=0 in an inverse table required by division of 1/d is used (a table in which d=diff−1 is set as an independent variable), but certainly a table in which d=diff is set as an independent variable may also be used.

$$ChromaDelta=C\_MAX-C\_MIN$$

$$low=(ChrmaDelta*LMDivTableLow[diff-1]+2^{15})>>16$$

$$a=(ChromaDelta*LMDivTable[diff-1]+low+add)>>shiftB$$

$$b=C\_MIN-((a*Y\_MIN)>>shiftA)$$

$$diff=(Y\_MAX-Y\_MIN+add)>>shiftB$$

$$shiftB=(BitDepthC>8)?(BitDepthC-9):0$$

$$add=(shiftB>0)?1<<(shiftB-1):0$$

If diff=0, then a=0. Here, LMDivTableLow[ ] and LMDivTable[ ] are tables (inverse, inverse table) used to perform division by referring to tables, and derivation is performed in advance by using the following formula. In other words, the value maintained in the table is a derived value (a value corresponding to the inverse of a divisor). That is, a difference value and a derived value are maintained in the table by establishing a correspondence. Furthermore, shiftB is a shift value used to quantize the value domain of diff that differs depending on a bit depth to be $2^9=512$ or lower. It should be noted that, if the bit depth BitDepthC of the chrominance image is equal to or greater than 10 bits, quantization is performed in advance, so that diff is within a range of 0 to 512. shiftB is not limited to the above. For example, a specified constant Q (e.g., 2, 6, or the like) may be used as follows. The same is also true in other embodiments.

shift$B$=BitDepth$C$-$Q$

LMDivTable[diff−1]=floor($2^16$/diff)

LMDivTableLow[diff−1]=floor(($2^16$*$2^16$)/diff)−
    floor($2^16$/diff)*$2^16$ LMDivTable[diff−1] represents an integer part of (1/diff*$2^16$). LMDivTableLow[diff−1] represents $2^16$ times the decimal part of (1/diff*$2^16$). Furthermore, a and b are $2^16$ (2 to the power of 16) times the value of the formula (C=a*Y+b) described above.

For example, if diff=7, then it is as follows.

LMDivTable[7−1]=floor($2^16$/7)=9362

LMDivTableLow[7−1]=floor(($2^16$*$2^16$)/7)−floor
    ($2^16$/7)*$2^16$=18724

If (a, b) derived from the above formula is used, then shiftA of the formula (CCLM-1) is 16.

(Specific Processing in CCLM Prediction Portion)

Processing Example 1

In the embodiment described above, the CCLM prediction parameter derivation portion 310442 derives the CCLM prediction parameter by using Table LMDivTable representing the integer part of 1/diff and Table LMDivTableLow representing the decimal part of 1/diff. Here, Table LMDivTable has a maximum value of 65536 (17 bits), and Table LMDivTableLow has a maximum value of 65140 (16 bits). The number of elements of each table is 512. Therefore, a very large memory having the size of 17*512+16*512=16896 (bits) is required for storing Table LMDivTable and Table LMDivTableLow.

In this processing example, the CCLM prediction parameter derivation portion 310442 does not derive the CCLM prediction parameters by using Table LMDivTableLow of the two tables that represents the decimal part of 1/diff. That is, the CCLM prediction parameter derivation portion 310442 derives the CCLM prediction parameters (a, b) by using the following formula.

$a$=(ChromaDelta*LMDivTable[diff−1]+add)>>shiftB $b$=C_MIN−(($a$*$Y$_MIN)>>shift$A$)

add=(shift$B$>0)?1<<(shift$B$−1):0

The inventors have experimentally confirmed that CCLM prediction achieves sufficient performance by means of only Table LMDivTable.

As a result, since Table LMDivTableLow does not need to be stored, the amount of storage required for table storage can be roughly halved. In addition, processing load can also be mitigated since there is no need for operations to derive div.

As described above, the CCLM prediction portion 31044 for this processing generates a prediction image by means of CCLM prediction, and has the CCLM prediction parameter derivation portion 310442. The CCLM prediction parameters are derived by generating Table LMDivTable corresponding to the difference values of a plurality of luminance reference pixels and the derived values used to derive the CCLM prediction parameters according to the difference values. The aforementioned Table LMDivTable maintains an integer part of the values acquired by multiplying the inverse of the difference values by a constant.

Thereby, the amount of storage required for a table for the derivation of CCLM prediction parameters can be reduced.

Processing Example 2

In this processing example, the number of bits (bit width) of Table LMDivTable used by the CCLM prediction parameter derivation portion 310442 is reduced.

In the embodiment described above, the values of Table LMDivTable are an integer part of (1/diff)*65536, and are therefore as follows.
65536, 32768, 21845, 16384, 13107, 10922, 9362, 8192, 7281, 6553, 5957, 5461, 5041, 4681, 4369, 4096, 3855, 3640, 3449, 3276, 3120, 2978, 2849, 2730, 2621, 2520, 2427, 2340, 2259, 2184, 2114, 2048 . . . .

In this processing example, the mantissa (m) part of each value described above is approximated in an exponential representation (m*$2^exp$) represented by P bits, and only the mantissa part is maintained in Table DivTableM. For example, if it is assumed that P=5, then the values of the inverse table are as follows.
16*$2^12$, 16*$2^11$, 21*$2^10$, 16*$2^10$, 26*$2^9$, 21*$2^9$, 18*$2^9$, 16*$2^9$, 28*$2^8$, 26*$2^8$, 23*$2^8$, 21*$2^8$, 20*$2^8$, 18*$2^8$, 17*$2^8$, 16*$2^8$, 30*$2^7$, 28*$2^7$, 27*$2^7$, 26*$2^7$, 24*$2^7$, 23*$2^7$, 22*$2^7$, 21*$2^7$, 20*$2^7$, 20*$2^7$, 19*$2^7$, 18*$2^7$, 18*$2^7$, 17*$2^7$, 17*$2^7$, 16*$2^7$ In Table DivTableM, only the mantissa parts of these values are maintained. That is, DivTable$M$[ ]={16,16,21,16,26,21,18,16,28,26,23,21,
    20,18,17,16,30,28,27,26,24,23,22,21,20,20,19,
    18,18,17,17,16 . . . }

Therefore, in the aforementioned embodiment, the maximum value requiring 17 bits can be represented by 5 bits, and the amount of storage required for storing Table DivTableM can be reduced.

It should be noted that when the number of the maintained is configured to be $2^N$ starting from the beginning of the table, the minimum value of Table DivTableM is $2^{(P-1)}$, and therefore, the value acquired by subtracting $2^{(P-1)}$ from each value may be maintained in Table DivTableM. The aforementioned value is derived by adding $2^{(P-1)}$ to the value acquired from the table. In this case, the memory required for 1 bit can be further reduced for each value. In the following, an offset value of Table DivTableM in a case where the number of the maintained is set to $2^N$ starting from the beginning of the table is referred to as offsetM. If the table from which the offset has been subtracted is used, then offsetM=$2^{(P-1)}$. Otherwise, offsetM=0.

Furthermore, if only the mantissa part of the inverse table is maintained by means of the integer part of the exponential representation (1/diff)*($2^16$), then the value of the exponent part needs to be derived. In this processing example, the CCLM prediction parameter derivation portion 310442 derives the value of the exponent part according to the following formula.

$$exp=clz(d,N)+(16-N-(P-1))$$

Here, d=diff−1 (luminance difference), exp represents the exponent part (exponent), and N represents the number of elements maintained as a table. For example, if N=9, then 512 elements are maintained, and if N=5, then 32 elements are maintained. Furthermore, "16" is the precision of 1/diff, i. e., the number of bits of a multiplier for converting 1/diff into an integer representation. In the embodiment described above, calculation is performed by multiplying 65536 (=2^16) to derive the value of 1/diff with integer precision. It should be noted that the precision of 1/diff is arbitrary, and if another value is used, the precision also needs to be changed to "16" correspondingly.

A clz(count leading zeros) function is a function composed of two independent variables (d, mw), and returns the number of consecutive 0s in most significant bits (MSBs) of a first independent variable d represented by a binary number. A second independent variable mw represents the maximum number of bits (number of bits). For example, if P=5, then in the case of d=1 (0b00001, diff=2) (0b is a prefix indicating a binary number), clz(1, mw)=4, and in the case of d=2 (0b00010, diff=3), clz(2, mw)=3. Furthermore, in the case of d=16 (0b10000, diff=17), clz(16, mw)=0. It should be noted that when the first independent variable d is 0, the second independent variable mw is returned. That is, in the case of d=0 (0b00000, diff=1), clz(0, mw)=mw.

It should be noted that the clz function has a dedicated command on a plurality of CPUs. In the dedicated command, sometimes the designation of the maximum number of bits is limited to values of 8, 16, 32, etc. However, for example, in the case of mw<=8, clz(d, mw)=clz(d, 8)−(8−mw). Furthermore, the dedicated command is not necessary. For example, in the case of clz(d, 4), the dedicated command may be replaced with the following formula.

$$clz(d,4)=(d\&0x08)?1:(d\&0x04)?2:(d\&0x02)?3:(d\&0x01)?4:5$$

It should be noted that the value of the clz function of d and the logarithmic value of d with the base being 2 (i.e., log 2 (d)) have the following relationship therebetween.

$$clz(x,N)+floor(log\ 2(x))=N$$

Therefore, exp can be derived by means of the following formula.

$$exp=N-floor(log\ 2(diff))+(16-N-(P-1))=16-(P-1)-floor(log\ 2(diff))$$

In addition, derivation can also be performed by using the following formula.

$$exp=N-ceil(log\ 2(d))+(16-N-(P-1))=16-(P-1)-ceil(log\ 2(d))$$

The CCLM prediction portion 31044 uses exp derived according to d to shift a value acquired by multiplying DivTableM[d] (which is referred to by a luminance difference d (=diff−1)) by a chrominance difference ChromaDelta, thereby deriving the CCLM prediction parameter a.

$$a=(ChromaDelta*DivTableM[d]<<exp)+add)>>shiftB$$

$$b=C\_MIN-((a*Y\_MIN)>>shiftA)$$

Here, exp=clz(d, N)+(16−N−(P−1))=16−(P−1)−(N−clz (d, N))

For LMDivTable[d], DivTableM[d], and exp of (processing example 1), the following relationship is established.

$$LMDivTable[d]=DivTableM[d]<<exp$$

It should be noted that the CCLM prediction parameter a may be derived after deriving the shift number (shiftB−exp) by using the exponent part exp, as described below. However, in the following, for simplicity, the sign of a shift value and a shift direction are reversed if the shift values of the right bit shift operation and the left bit shift operation are negative. This is the same for other examples.

$$a=(ChromaDelta*DivTableM[d]+add)>>(shiftB-exp)$$

Here, add=(shiftB−exp>0)?1<<(shiftB−exp−1):0

Alternatively, the CCLM prediction parameter derivation portion 310442 may derive the value of the exponent part according to the following formula.

$$exp=16-(P-1)-ceil(log\ 2(diff))$$

In addition, the formula may also be as follows.

$$exp=16-(P-1)-floor(log\ 2(diff))$$

Furthermore, it is also possible to maintain only the exponent part as Table ShiftTableE. For example, if P=5, then Table ShiftTableE[ ] is as follows:
ShiftTableE[ ]={12, 11, 10, 10, 9, 9, 9, 9, 8, 8, 8, 8, 8, 8, 8, 8, 7, 7, 7, 7, 7, 7, 7, 7, 7, 7, 7, 7, 7, 7, 7, 7 . . . }.
Alternatively, Table ShiftTableE'[ ] shown below may be used.

ShiftTableE'[ ]={0,1,2,2,3,3,3,3,4,4,4,4,4,4,4,4,5,5,5, 5,5,5,5,5,5,5,5,5,5,5,5,5 . . . }

The exponent part is calculated as follows:

$$exp=16-(P-1)-ShiftTableE'[d].$$

If the maximum number of bits mw is equal to or less than N, then Tables ShiftTableE and ShiftTableE' can also be used instead of the clz function.

$$clz(d,mw)=mw-ShiftTableE'[d]=mw-(16-(P-1)-ShiftTableE[d]))$$

The CCLM prediction portion 31044 uses Table DivTableM and Shift Table ShiftTableE to derive the CCLM parameters by means of the following formula.

$$a=(ChromaDelta*DivTableM[d]<<ShiftTableE[d])+add)>>shiftB$$

$$b=C\_MIN-((a*Y\_MIN)>>shiftA)$$

It should be noted that the exponent part exp can be used, as described below, to derive the shift number (shiftB−exp) and then the CCLM prediction parameter a.

$$a=(ChromaDelta*DivTableM[d]+add)>>(shiftB-exp)$$

Here, add=(shiftB−exp>0)?1<<(shiftB−exp−1):0, exp= ShiftTableE[d]

As described above, the CCLM prediction portion 31044 of this processing example generates a prediction image by means of CCLM prediction, is provided with the CCLM prediction parameter derivation portion 310442, and derives the CCLM prediction parameter a by using the luminance difference value (d), the chrominance difference value (ChromaDelta), and Inverse Table DivTableM. The CCLM prediction parameter derivation portion 310442 derives an exponent part exp corresponding to the inverse of the luminance difference value (d), multiplies the elements of Table DivTableM by the chrominance difference value, and derives the CCLM prediction parameters by performing shifting according to the shift number derived from the exponent part exp.

The aforementioned configuration reduces the number of bits of the value maintained in the inverse table required for deriving the CCLM prediction parameters, thereby reducing the required amount of storage. It should be noted that, as illustrated in processing example 1, Table LMDivTableLow may also not be used, but when Table LMDivTableLow is maintained, a table having elements of LMDivTableLow divided into a mantissa part and an exponent part may also be generated.

(Supplementation of Number of Bits for a Product)

As described above, in a CCLM, the products of ChromaDelta*LMDivTable[diff−1], a*Y_MIN, and a*refSamples[ ][ ] are needed in the derivation of CCLM prediction parameters a and b and generation of prediction images using a and b.

$a=(ChromaDelta*LMDivTable[diff-1]+low+add)>>shiftB//11\ bit*17\ bit=28$ $b=C\_MIN-((a*Y\_MIN)>>shiftA)//27\ bit*10\ bit=37$ $predSamples[\ ][\ ]=((a*refSamples[\ ][\ ])>>shiftA)+b//27\ bit*10\ bit=37$ (Bit Width of the Parameter a)

For example, in the calculation before the aforementioned processing example 1, the bit widths of ChromaDelta, a, Y_MIN, and refSamples[ ][ ] in the 10-bit image are respectively 11 bits, 10 bits, 10 bits, and 10 bits, and when shiftA=16, the bit widths of LMDivTable[diff−1] and a are respectively 16 bits and 27 bits (=11 bits*16 bits). The result is that the products in the derivation of a, the derivation of b, and a prediction using a are respectively 11 bits*17 bits, 27 bits*10 bits, and the product of 27 bits*10 bits and a larger bit width, and hardware is complex.

In processing example 2, the product of ChromaDelta*DivTableM[d] in the derivation of a is reduced to a bit width that is less than that in processing example 1 by exp (=ShiftTableE[d]), thereby simplifying the product.

Processing Example 3

In the embodiment described above, the values of 512 elements used as the desired range of 1 to 512 of a luminance difference value diff are stored in Tables LMDivTable (and LMDivTableLow) required for CCLM prediction. In this processing example, the number of elements stored in the table is reduced, and unmaintained elements are derived by means of calculation, thereby reducing the required memory.

For example, the CCLM prediction parameter derivation portion 310442 derives the CCLM prediction parameters (a, b) by using Table LMDivTable 2N including 2^N elements. Then, the CCLM prediction parameter derivation portion 310442 calculates, according to 1/k of a stored value, the value of an element not stored in Table LMDivTable_2N. LMDivTable_2N[ ] is a table storing the first 2^N elements of LMDivTable[ ].

Figure 17:
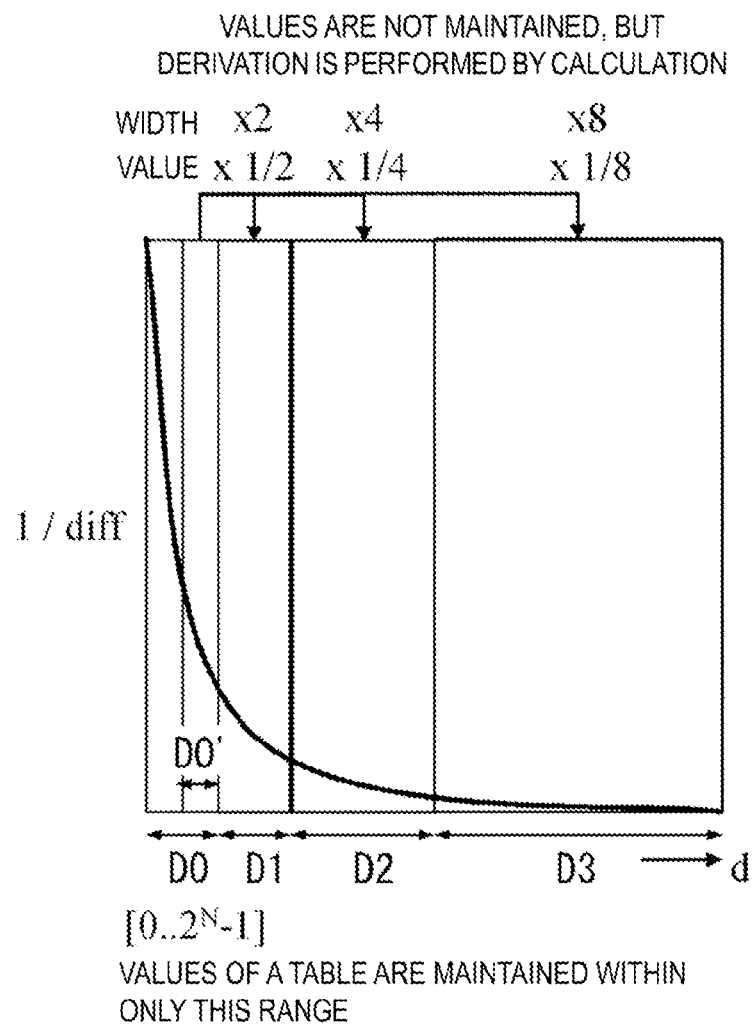
FIG. 17 is a diagram illustrating an example of calculating the value of an element not maintained in a table.

Specifically, a description is provided with reference to FIG. 17. FIG. 17 is a diagram illustrating an example of calculating the value of an element not maintained in a table. In this example, N=3. As shown in FIG. 17, the CCLM prediction parameter derivation portion 310442 directly uses the values of Table LMDivTable_2N for an interval D0[0 . . . 2^N−1] (e.g., 0 . . . 7) of d maintained by the values of Table LMDivTable_2N, uses the value of ½ of the value of the interval D0'[2^N/2 . . . 2^(N+1)−1] (e.g., 4 . . . 7) of the second half of D0 of Table LMDivTable_2N for the next interval D1[2^N . . . 2^(N+1)−1] (e.g., 8 . . . 15), uses the value of ¼ of the value of the interval D0'(e.g. 4 . . . 7) of Table LMDivTable_2N for the next interval D2[2^(N+1) . . . 2^(N+2)−1] (e.g., 16 . . . 31), and uses the value of ⅛ of the value of the interval D0'(e.g. 4 . . . 7) of Table LMDivTable_2N for the next interval D3[2^(N+2) . . . 2^(N+3)−1] (e.g., 32 . . . 63). Furthermore, the interval D1 has a width twice the width of the interval D0'; the interval D2 has a width 4 times the width of the interval D0'; the interval D3 has a width 8 times the width of the interval D0'. That is, the values of the interval Dsc[2^(N+sc−1) . . . 2^(N+sc)−1] are the values acquired by multiplying the values of the interval D0'[2^N/2 . . . 2^(N+1)−1] by 1/k (here K=2^sc), and starting from the beginning of the interval Dsc, the same values are stored for every k. Here, 1<=sc<=6. 6 is derived from 9−3; 9 is the precision of diff; and 3 is determined according to D1 by starting at 8 (=2^3).

For example, if N=3, then the value following d(=diff−1)=8 is calculated by multiplying the value of the interval D0'[4 . . . 7] by 1/k as described below.

Interval [8 . . . 15]→½
Interval [16 . . . 31]→¼
Interval [32 . . . 63]→⅛
Interval [64 . . . 127]→1/16
Interval [128 . . . 255]→1/32
Interval [256 . . . 511]→1/64

TABLE 1

| Interval | Range of d | k | sc |
|---|---|---|---|
| D1 | [8 . . . 15] | ½ | 1 |
| D2 | [16 . . . 31] | ¼ | 2 |
| D3 | [32 . . . 63] | ⅛ | 3 |
| D4 | [64 . . . 127] | 1/16 | 4 |
| D5 | [128 . . . 255] | 1/32 | 5 |
| D6 | [256 . . . 511] | 1/64 | 6 |

Figure 18:
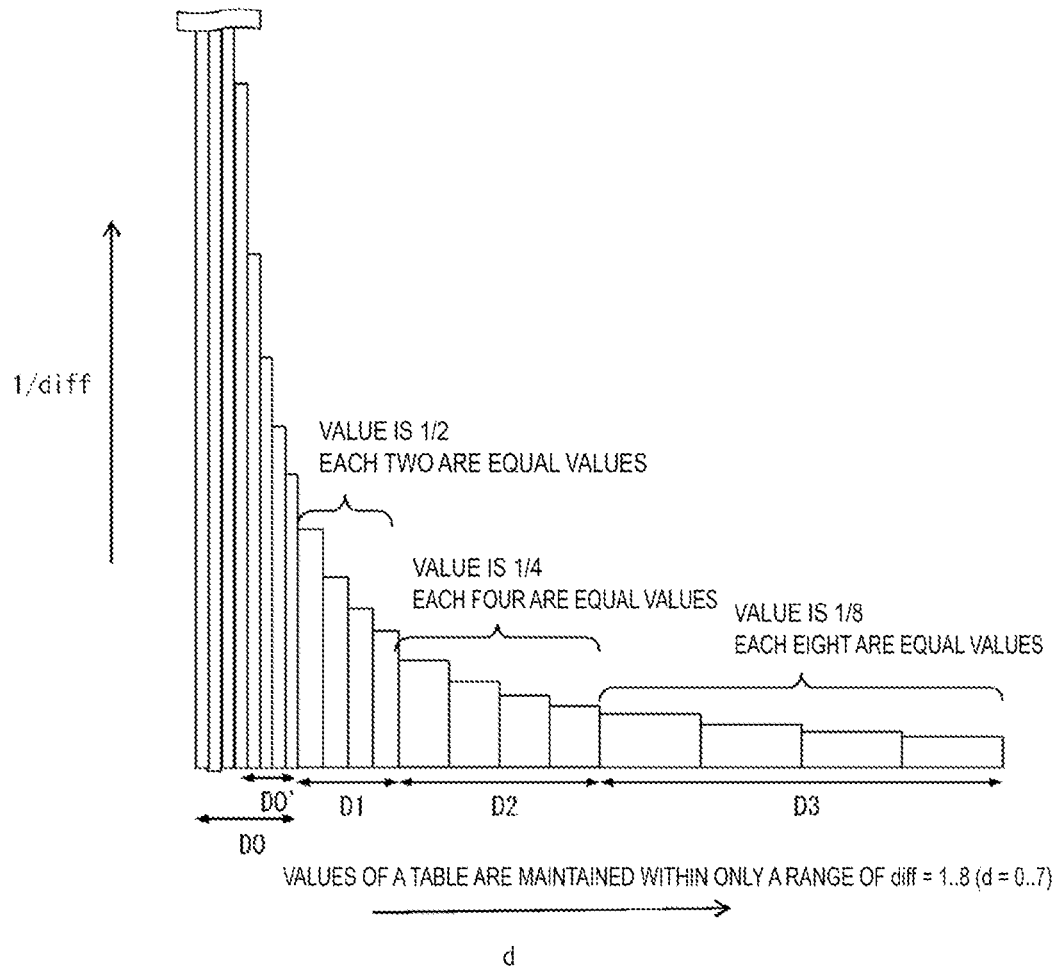
FIG. 18 is a diagram illustrating an example of calculating the value of an element not maintained in a table.

FIG. 18 is a diagram for illustrating an example of calculating the value of an element not maintained in a table. More specifically, as shown in FIG. 18, for instance, d=8, 9 is ½ of d=4; d=10, 11 is ½ of d=5; d=12, 13 is ½ of d=6; d=14, 15 is ½ of d=7; d=16, 17, 18, 19 is ¼ of d=4; and d=20, 21, 22, 23 is ¼ of d=5 (the list goes on), and calculation is performed with reference to LMDivTable_2N in the manner of k consecutive same values within a range of 1/k of the values. That is, d/k referencing LMDivTable_2N is used. In the following, k is referred to as scale, and sc=log 2 (k) is referred to as a scale shift value. It should be noted that, a value (d>>sc or diff>>sc) acquired by performing normalization according to the scale shift value sc is referred to as normDiff.

Specifically, if a formula is used for representation, then Inverse Table LMDivTable_2 is referred to in LMDivTable_2N[d/k]/k (=LMDivTable_2N[d>>sc]>>sc) by using the derived k by means of the following formula.

$sc=(9-N)-clz(d>>N, 9-N)$ $k=2^{(sc)}$

It should be noted that, "9" is due to the precision (number of bits) of diff being 512 elements (9 bits), and if the precision is different, a different value is allocated.

For example, sc can also be derived by means of the following formula.

$sc=(9-N)-(9-N-(floor(log\ 2(d))-N))=floor(log\ 2(d))-N$

The CCLM prediction portion 31044 derives the CCLM prediction parameter a by using a value acquired by further shifting the value of Table DivTableM by sc and the chrominance difference ChromaDelta, where the value of Table DivTableM is referred to by a value (d>>sc) acquired by shifting the luminance difference d (=diff−1) by a specified scale shift value sc that is dependent on d.

$$a=(\text{ChromaDelta}*(\text{LMDivTable\_2}N[d>>sc])>>sc)+\text{add})>>\text{shiftB}$$

$$b=C\_\text{MIN}-((a*Y\_\text{MIN})>>\text{shift}A)$$

Here, add=(shiftB>0)?1<<(shiftB−1):0

Alternatively, when the configuration of always performing 1-bit right-shifting in derivation of a recycling correction term add is used as shown below, a simplification effect of eliminating divergence of whether the shift number is positive is achieved.

$$\text{add}=(1<<\text{shift}B)>>1$$

It should be noted that the application position of the shift implemented by using sc does not depend on the aforementioned situation. The CCLM prediction parameter a may also be derived as shown below.

$$a=(\text{ChromaDelta}*(\text{LMDivTable\_2}N[d>>sc]+\text{add})>>(\text{shift}B+sc)$$

$$b=C\_\text{MIN}-((a*Y\_\text{MIN})>>\text{shift}A)$$

Here, add=(shiftB+sc>0)?1<<(shiftB+sc−1):0 or $$\text{add}=(1<<(\text{shift}B+sc))>>1$$

It should be noted that, in the above process, the case in which d=0 is excluded is considered in the division of 1/d, and only the table above d>=1 is used. That is, a table of d=diff−1 instead of d=diff is utilized, although the table of d=diff may also be used.

In other words, as shown in the aforementioned LMDivTable_2N[d>>sc], the Inverse Table LMDivTable_2N is referenced according to an index (d>>sc) acquired by reducing a value by performing shifting, so that the number of elements of LMDivTable_2N is reduced, thereby achieving the effect of reducing the size of the table. Furthermore, adjusting the size by further right-shifting a value of the Inverse Table LMDivTable_2N as shown by LMDivTable_2N[d>>sc]>>sc and (LMDivTable_2N[d>>sc]+add)>>(shiftB+sc) does not degrade performance, but rather achieves the effect of reducing the size of the table.

(Variation of Processing Example 3)

In the aforementioned embodiment, a table for d=diff−1 is configured; the number of elements stored in the table is reduced; unmaintained elements are derived by means of calculation, thereby reducing the required memory. In this variation, an example of configuring a table for diff (0<=diff<=511) to reduce the required memory is described. The following describes the difference for processing example 3.

For example, if the number of elements of the table is 2^N, N=5, then a correspondence is established with Table 1 as shown in Table 2.

TABLE 2

| Interval | diff | k | sc | range (diff/32) | idx | exp | iShift (16 − exp) |
|---|---|---|---|---|---|---|---|
| D0 | 0...31 | 1 | 0 | 0 | 0...31 | 13...18 | 3...8 |
| D1 | 32...63 | ½ | 1 | 1 | 16...31 | 9, 8 | 7, 8 |
| D2 | 64...127 | ¼ | 2 | 2...3 | 16...31 | 9, 8 | 7, 8 |
| D3 | 128...255 | ⅛ | 3 | 4...7 | 16...31 | 9, 8 | 7, 8 |

TABLE 2-continued

| Interval | diff | k | sc | range (diff/32) | idx | exp | iShift (16 − exp) |
|---|---|---|---|---|---|---|---|
| D4 | 256...511 | 1/16 | 4 | 8...15 | 16...31 | 9, 8 | 7, 8 |
| D5 | 512 | 1/32 | 5 | 16 | 16 | 9 | 7 |

Specifically, if a formula is used for representation, then Inverse Table LMDivTable_2' is referred to in LMDivTable_2N'[d/k]/k (=LMDivTable_2N[d>>sc]>>sc) by using the derived k by means of the following formula. LMDivTable_2N'[ ] is a table acquired by inserting "0" at the beginning of LMDivTable_2N[ ] and deleting elements at the end.

$$\text{range}=\text{diff}>>N$$

$$sc=\text{ShiftTable}E''\_2N[\text{range}+1]$$

$$k=2^{\wedge}(sc)$$

ShiftTableE"_2N[ ] is a table acquired by inserting "0" at the beginning of ShiftTableE'_2N[ ].

ShiftTableE"_2N[ ]={0,0,1,2,2,3,3,3,3,4,4,4,4,4,4,4, 5,5,5,5,5,5,5,5,5,5,5,5,5,5,5 ... }

The CCLM prediction portion 31044 derives the CCLM prediction parameter a by using a value acquired by further shifting the value of Table LMDivTable_2N' by sc and the chrominance difference ChromaDelta, where the value of Table LMDivTable_2N' is referred to by a value (diff>>sc) acquired by shifting the luminance difference diff by a specified scale shift value sc that is dependent on diff.

$$a=(\text{ChromaDelta}*(\text{LMDivTable\_2}N'[\text{diff}>>sc])>>sc)+\text{add})>>\text{shift}B$$

$$b=C\_\text{MIN}-((a*Y\_\text{MIN})>>\text{shift}A)$$

Here, $$\text{add}=(\text{shift}B>0)?1<<(\text{shift}B-1):0$$

or $$\text{add}=(1<<\text{shift}B)>>1$$

LMDivTable_2N'[ ] is a table acquired by inserting "0" at the beginning of LMDivTable_2N'[ ] and deleting elements at the end.

The effect of processing example 3 is the same as that of this variation.

Processing Example 4

The CCLM prediction parameter derivation portion 310442 may perform processing by combining the aforementioned processing examples 1 to 3. In this case, the CCLM prediction parameter derivation portion 310442 derives a scale shift value sc corresponding to the luminance difference value (d), derives the value (DivTableM_2N [d>>sc]) of Table DivTableM_2N referring to the value d>>sc as the index (element position), the value d>>sc being acquired by right-shifting the luminance difference value (d) by sc, and then multiplies the chrominance difference value by the value r acquired by performing shifting by using an exp value corresponding to an exponent part corresponding to d>>sc and a shift value sc, thereby deriving the CCLM prediction parameters.

The CCLM prediction parameters (a, b) are derived according to the following formula.

$a=(\text{ChromaDelta}*r+\text{add})\!>\!>\text{shift}B$ $b=\text{MinChromaValue}-((a*\text{MinLumaValue})\!>\!>\text{shift}A)$ $d=\text{diff}-1$ $sc=(D-N)-\text{clz}(d\!>\!>N,D-N)$ $\exp=\text{clz}(d\!>\!>sc,N)+(16-N-P-1))$ $r=(\text{DivTable}M\_2N[d\!>\!>sc]+\text{offset}M)\!<\!<\exp\!>\!>sc$ $\text{add}=(\text{shift}B\!>\!0)?$ $1\!<\!<(\text{shift}B-1)\!:\!0$ For example, sc can also be derived by means of the following formula. The same is as follows.

$c=(D-N)-(D-N-(\text{floor}(\log 2(d))-N))=\text{floor}(\log 2(d))-N$

If an offset is used (the number of the maintained is configured to be 2^N starting from the beginning of the table), then offsetM=2^(P−1). If no offset is used, then offsetM=0.

Here,

D: (1 . . . 2^D) representing the range of the value of diff, where D=9 in (processing example 1) to (processing example 3)

N: an integer representing log 2 of the number of elements of DivTable, where 0<N<=D P: the number of bits of the mantissa part in the exponential representation of the value of an integral multiple (2^16) of 1/diff, where 0<=P−1<=16−N It should be noted that the order of application of the scale shift value sc and the exponential shift value exp is not limited to the above. For example, the CCLM prediction parameter derivation portion 310442 derives sc corresponding to the luminance difference value (d), and uses the shift value (shiftB+sc−exp) derived according to exp and sc to shift the value acquired by multiplying DivTableM_2N [d>>sc] with the chrominance difference value, thereby deriving the CCLM prediction parameters. By the table, DivTableM_2N[d>>sc] refers to, as the index (element position), the value d>>sc acquired by right-shifting the luminance difference value (d) by sc.

$a=(\text{ChromaDelta}*r+\text{add})\!>\!>(\text{shift}B+sc-\exp)$ $b=\text{MinChromaValue}-((a*\text{MinLumaValue})\!>\!>\text{shift}A)$ $d=\text{diff}-1$ $sc=(D-N)-\text{clz}(d\!>\!>N,D-N)$ $\exp=\text{clz}(d\!>\!>sc,N)+(16-N-(P-1))$ $r=(\text{DivTable}M\_2N[d\!>\!>sc]+\text{offset}M)$ $\text{add}=(\text{shift}B+sc-\exp\!>\!0)?1\!<\!<(\text{shift}B+sc-\exp-1)\!:\!0$ $\text{offset}M=2^\wedge(P-1)\text{ or }0$ Furthermore, it is also possible to normalize the value of ChromaDelta by first using the shift value shiftB.

$a=((\text{ChromaDelta}+\text{add})\!>\!>\text{shift}B)*r\!>\!>(sc-\exp)$ (Examples of Table Values)

Examples of table values are shown below.

<Example 1> N=6, and P=5, with an offset offsetM of 2^(P−1)

DivTableM_2N[64]={0,0,5,0,10,5,2,0,12,10,7,5,4,2,1,
0,14,12,11,10,8,7,6,5,4,4,3,2,2,1,1,0,15,14,13,12,
12,11,10,10,9,8,8,7,7,6,6,5,5,4,4,4,3,3,3,2,2,2,1,
1,1,1,0,0}

ShiftTableE_2N[64]={12,11,10,10,9,9,9,9,8,8,8,8,8,8,
8,8,7,7,7,7,7,7,7,7,7,7,7,7,7,7,7,7,6,6,6,6,6,6,6,6,
6,6,6,6,6,6,6,6,6,6,6,6,6,6,6,6,6,6,6,6,6,6,6,6}

<Variation of example 1> In the case of a different rounding method, the table may also be as follows.

DivTableM_2N[64]={0,0,5,0,10,5,2,0,12,10,7,5,4,2,1,
0,14,12,11,10,8,7,6,5,4,4,3,2,2,1,1,0,15,14,14,13,
12,11,11,10,9,9,8,8,7,7,6,6,5,5,4,4,4,3,3,3,2,2,2,
1,1,1,1,0}

ShiftTableE_2N is similar to that in <example 1>.

If N=6 and P=5, then the amount of storage required to store the table is (5−1)*2^6=4*64=256 (bits). Compared with the case of the above-described embodiment, 256/16896=1.515%, and the amount of storage can be significantly reduced.

<Example 2> N=5, and P=5 with an offset of 2^(P−1)

DivTableM_2N[32]={0,0,5,0,10,5,2,0,12,10,7,5,4,2,1,
0,14,12,11,10,8,7,6,5,4,4,3,2,2,1,1,0}

ShiftTableE_2N[32]={12,11,10,10,9,9,9,9,8,8,8,8,8,
8,8,7,7,7,7,7,7,7,7,7,7,7,7,7,7,7,7,7}

In this case (N=5, P=5, and D=9 with an offset), the derivation formulas of a and b are summarized as follows:

$d=\text{diff}-1$ $sc=(D-N)-\text{clz}(d\!>\!>N,D-N)=(9-5)-\text{clz}(d\!>\!>5,9-5)=4-\text{clz}(d\!>\!>5,4)$ $\exp=\text{clz}(d\!>\!>sc,N)+(16-N-(P-1))=\text{clz}(d\!>\!>sc,5)+(16-5-(5-1)=\text{clz}(d\!>\!>sc,5)+7$ $\text{offset}M=2^\wedge(P-1)=2^\wedge(5-1)=16$ $r=(\text{DivTable}M\_2N[d\!>\!>sc]+\text{offset}M)=\text{DivTable}M\_2N[d\!>\!>sc]+16$ $\text{add}=(\text{shift}B+sc-\exp\!>\!0)?1\!<\!<(\text{shift}B+sc-\exp-1)\!:\!0$ $a=(\text{ChromaDelta}*r+\text{add})\!>\!>(\text{shift}B+sc-\exp)$ $b=\text{MinChromaValue}-((a*\text{MinLumaValue})\!>\!>\text{shift}A)$ In this case, if ShiftTableE_2N is used instead of clz, then a and b are calculated as shown below.

$d=\text{diff}-1$ $sc=(D-N)-\text{clz}(d\!>\!>N,D-N)=(D-N)-((D-N)-(16-(P-1)-\text{ShiftTable}E\_2N[d\!>\!>5]))=4-(4-(16-4)-\text{ShiftTable}E\_2N[d\!>\!>5]))=12-\text{ShiftTable}E\_2N[d\!>\!>5]$ $\exp=\text{ShiftTable}E\_2N[d\!>\!>5]$ $\text{offset}M=2^\wedge(P-1)=2^\wedge(5-1)=16$ $r=(\text{DivTable}M\_2N[d\!>\!>sc]+\text{offsetM})=\text{DivTable}M\_2N[d\!>\!>sc]+16$ $\text{add}=(\text{shift}B+sc-\exp\!>\!0)?1\!<\!<(\text{shift}B+sc-\exp-1)\!:\!0$ $a=(\text{ChromaDelta}*r+\text{add})\!>\!>(\text{shift}B+sc-\exp)$ $b=\text{MinChromaValue}-((a*\text{MinLumaValue})\!>\!>\text{shift}A)$ <Variation of example 2> In the case of a different rounding method, the table may also be as follows.

DivTable*M*_2*N*[32]={0,0,5,0,10,5,2,0,12,10,7,5,4,2,1,
0,14,13,11,10,9,8,7,6,5,4,3,3,2,1,1,0}

ShiftTableE_2N is similar to that in <example 2>.

It should be noted that in the case of no offset (offsetM=0), values acquired by adding respective elements of the aforementioned offset DivTableM_2N to 2^(P-1) in advance are stored and used.

<Example 3> N=6, and P=4 with an offset of 2^(P-1)

DivTable*M*_2*N*[64]={0,0,3,0,5,3,1,0,6,5,4,3,2,1,1,0,7,
6,5,5,4,4,3,3,2,2,1,1,1,1,0,0,7,7,7,6,6,5,5,5,4,4,4,
4,3,3,3,3,2,2,2,2,2,1,1,1,1,1,1,1,0,0,0,0}

ShiftTable*E*_2*N*[64]={13,12,11,11,10,10,10,10,9,9,9,
9,9,9,9,9,8,8,8,8,8,8,8,8,8,8,8,8,8,8,8,8,7,7,7,7,7,
7,7,7,7,7,7,7,7,7,7,7,7,7,7,7,7,7,7,7,7,7,7,7,7,7,7,
7}

<Variation of example 3> In the case of a different rounding method, the table may also be as follows.

DivTable*M*_2*N*[32]={0,0,3,0,5,3,1,0,6,5,4,3,2,1,1,0,7,
6,6,5,4,4,3,3,2,2,2,1,1,1,1,0}

ShiftTableE_2N is similar to that in <example 3>.

<Example 4> N=5, and P=4 with an offset of 2^(P-1)

DivTable*M*_2*N*[32]={0,0,3,0,5,3,1,0,6,5,4,3,2,1,1,0,7,
6,5,5,4,4,3,3,2,2,1,1,1,1,0,0}

ShiftTable*E*_2*N*[32]={13,12,11,11,10,10,10,10,9,9,9,
9,9,9,9,9,8,8,8,8,8,8,8,8,8,8,8,8,8,8,8,8,}

<Variation of example 4> In the case of a different rounding method, the table may also be as follows.

DivTable*M*_2*N*[32]={0,0,3,0,5,3,1,0,6,5,4,3,2,1,1,0,7,
6,6,5,4,4,3,3,2,2,2,1,1,1,1,0}

ShiftTableE_2N is similar to that in <example 4>.

It should be noted that if N=5 and P=4, then the amount of storage required to store the table is (4−1)*2^5=3*32=96 (bits). Compared with the case described in the above embodiment, 96/16896=0.568%, and the amount of storage can be significantly reduced.

In processing examples 5 and 6 illustrated below, the above table may be used.

Processing Example 5

In processing example 5, an example in which the precision shiftA of the parameter a is set to be variable in formula (CCLM-1) is illustrated. Specifically, the precision shiftA of the parameter a is derived from the shift value exp derived from the luminance difference value diff.

In the following, the CCLM prediction parameter derivation portion 310442 derives the term (diffC/diff) equivalent to the slope of the linear prediction from the luminance difference value diff and the chrominance difference value diffC and regards the term as the parameter a (here, a value of 2^shiftA (=1<<shiftA) times of the parameter a is derived so as to perform integralization.

First, the CCLM prediction parameter derivation portion 310442 derives a value v equivalent to the mantissa part of the inverse of diff by using the method having been described above.

idx=diff>>*sc* exp=16−(*P*−1)−ceil(log 2(idx))−*sc* msb=1(*P*−1)

*v*=DivTable_2*N*'[idx]|msb

Here, P is a specified constant (e.g., P=4) corresponding to the number of bits of the mantissa part of the inverse table (1/diff). Furthermore, exp is a variable that decreases as the luminance difference diff increases (and is a variable that decreases proportionally to the logarithmic value of diff), and can be derived according to a table. It should be noted that if idx=0, then log 2 (idx) is set to 0. Here, subtracting another value from 16 to acquire the value of exp is due to that the inverse table is created on the basis of (2^16)/diff. Below, the bit width used as a reference of the inverse table is denoted as baseA. If the bit width of the parameter a is not limited, then shiftA=baseA. It should be noted that the maximum value of v is (1<<P)−1, and the number of bits of v is P. exp=16−(P−1)−ShiftTableE" 2N[idx]−sc The CCLM prediction parameter derivation portion 310442 adjusts the number of bits of the parameter a by further performing right-shifting by shift_a as described below, if the parameter a is derived by means of a product of diffC and v.

add=(1<<shift_*a*)>>1

*a*=(diffC**v*+add)>>shift_*a*

*b*=C_Y_MIN−((*a**Y_MIN)>>shift_*a*)

Here, shift_a is a value derived from the bit depth bitDepth of an image. expC is a constant that limits the bit width of the parameter a, and for example, ranges from 0 to 3. The bit width of the parameter a is the bit width of diffC+the bit width of v−shift_a, is bitDepth+P−(bitDepth−8−expC)=P+8−expC, and decreases to a small value not dependent on the bit depth of the image. For example, when P=4 and expC=3, a has a bit width of 9 bits.

shift_*a*=bitDepth−8−exp *C*

The CCLM prediction parameter derivation portion 310442 adjusts the value of shiftA by subtracting an exp value and expC from the initial value of shiftA (=baseA, e.g., 16), the exp value being derived by using the luminance difference diff.

shift*A*=16−(exp+exp *C*)

The CCLM prediction filter portion 310443 outputs a prediction image predSamples[ ][ ] by using the formula (CCLM-1) and by using the CCLM prediction parameters (a, b) and the adjusted shiftA described above.

In this way, the bit width of a used for derivation of b or generation of the prediction image predSamples[ ][ ] can be reduced by adaptively deriving the amount of shift of a by means of the luminance difference diff and the bit depth bitDepth. By doing so, the effect of simplifying the product of a and the luminance value refSamples[ ][ ] in the formula (CCLM-1).

In processing example 5, the product of diffC*v in the derivation of a is reduced from 11 bits*16 bits in processing example 1 to 11 bits*P bits, thus achieving the effect of simplifying the product. When P=4, 11 bits*4 bits=15 bits.

In processing example 5, the product of a*Y_MIN in the derivation of b is reduced from 27 bits*10 bits in processing example 1 to P+8−expC bits*10 bits, thus achieving the effect of simplifying the product. When P=4 and expC=3, 9 bits*4 bits=13 bits.

In processing example 5, the product of the formula (CCLM-1) is reduced from 27 bits*10 bits in processing example 1 to P+8−expC bits*10 bits, thus achieving the effect of simplifying the product. When P=4 and expC=3, 9 bits*4 bits=13 bits.

It should be noted that expC in processing example 5 is a constant that is different from processing example 5 and does not depend on a chrominance difference, and therefore may also be referred to as expConst or the like instead of being referred to as expC.

Processing Example 6

In processing example 6, an example in which the precision shiftA of the parameter a for a product with the luminance value is set to be variable in the formula (CCLM-1) is described. Specifically, the upper limit of the number of bits of a (a value domain of a) is set to max a bits, and the precision shiftA of the parameter a is derived on the basis of diffC serving as the chrominance difference (C_Y_MAX−C_Y_MIN). It should be noted that, the above may be interpreted as an example in which a mantissa of a fixed number of bits and a power of 2 represent the parameter a. In the following, the number of bits of the mantissa part of a is represented by max a bits, and the number of bits of the exponent part is represented by expC.

In the following, the CCLM prediction parameter derivation portion 310442 derives (diffC/diff*2^shiftA) equivalent to the slope from the denominator (luminance difference value) diff and the numerator (chrominance difference value) diffC and regards the same as the parameter a. In the following, 2^shiftA (i.e., 1<<shiftA) times of the parameter a is taken, so as to perform integralization.

The CCLM prediction parameter derivation portion 310442 firstly, the CCLM prediction parameter derivation portion 310442 derives idx used for referring to an inverse table acquired by compressing diff, and then derives a value v equivalent to the inverse of diff.

diff=$Y$_MAX−$Y$_MIN range=(diff>>$N$)+1 sc=ceil(log 2(range))

idx=diff>>sc

Here, N is a specified constant, e.g., 5.

msb=1<<($P$−1)

v=DivTable_2$N$[idx]|msb

Here, P is the number of bits of the mantissa part (the part maintained in Table DivTable_2N') of the inverse table (1/diff), and msb is offsetM.

The CCLM prediction parameter derivation portion 310442 derives the shift value exp corresponding to the luminance difference value diff.

exp=16−($P$−1)−ceil(log 2(diff+1))=16−($P$−1)−ceil(log 2(idx))−sc

In addition, exp may be derived with reference to the table.

exp=16−($P$−1)−ShiftTable$E$"_2$N$[idx]−sc

The CCLM prediction parameter derivation portion 310442 derives a shift value expC corresponding to the logarithmic value of the absolute value absDiffC of the chrominance difference value diffC.

diffC=$C$_$Y$_MAX−$C$_$Y$_MIN absDiffC=(diff$C$<0?−diff$C$:diff$C$)

rangeDiffC=(absDiffC>>(max_a_bits−$P$−1))

exp $C$=ceil(log 2(rangeDiffC+1))

Here, the configuration in which the value of max_a_bits is set to P+1 is also preferable, and in this case, rangeDiffC=absDiffC. Therefore, the CCLM prediction parameter derivation portion 310442 derives expC by omitting rangeDiffC, as shown below.

exp $C$=ceil(log 2(absDiffC+1))

If the parameter a is derived by means of the product of diffC and v, then the CCLM prediction parameter derivation portion 310442 further right-shifts diffC*v by expC to derive the parameter a having a limited number of bits, as shown below.

add=(1<<exp $C$)>>1

$a$=(diff$C$*v+add)>>exp $C$,                    formula (a-1)

$b$=$C$_$Y$_MIN−(($a$*$Y$_MIN)>>exp $C$)//shift_$a$=exp $C$,    formula (b-1)

If the formula (a-1) is supplemented, then the formula (a-1) is multiplied by the signed variable diffC, and is right-shifted by the bit width of the variable diffC+max_a_bits−P−1. Therefore, the bit width of a is max a bit of the sum of the bit width P of v, max_a_bits−P−1, and the sign bit 1. In particular, in a configuration in which max_a_bits=P+1, representation can be performed by P+1 bits acquired by adding at most 1 being the sign bit of diffC to the bit width (e.g., P) of v.

The CCLM prediction parameter derivation portion 310442 adjusts the value of shiftA by subtracting exp and expC from the initial value of shiftA (e.g., 16), the exp being derived by using the denominator (luminance difference value diff) and the expC being derived by using the numerator (chrominance difference value diffC). shiftA=16−(exp+expC)

For example, if max_a_bits=5, then a is represented according to a 5-bit precision (−16 to 15). Furthermore, expC is a variable that increases as the absolute value of the chrominance difference diffC increases (and is a variable that increases proportionally to the logarithmic value of absDiffC).

exp $C$=ceil(log 2(rangeDiffC))

It should be noted that if rangeDiffC=0, then expC=0. expC may be derived with reference to the table.

exp $C$=ShiftTable$E$"_2$N$[rangeDiffC+1]

The CCLM prediction filter portion 310443 outputs a prediction image predSamples[ ][ ] by using the formula (CCLM-1) and by using the CCLM prediction parameters (a, b) and the adjusted shiftA described above.

In this way, the bit depth of a can be reduced by adaptively deriving the amount of shift of a from the chrominance difference diffC. Correspondingly, deterioration of the precision is suppressed, and the product of a and the luminance value refSamples[ ][ ] in the formula (CCLM-1) is simplified.

In processing example 6, the product of diffC*v in the derivation of a is reduced from 11 bits*16 bits in processing example 1 to 11 bits*P bits, thus achieving the effect of simplifying the product. When P=4, 11 bits*4 bits=15 bits.

In processing example 6, the product of a*Y_MIN in the derivation of b is reduced from 27 bits*10 bits in processing example 1 to max_a_bits bits*10 bits, thus achieving the effect of simplifying the product. When max_a_bits=5, 5 bits*10 bits=15 bits.

In processing 6, the product of the formula (CCLM-1) is reduced from 27 bits*10 bits in processing example 1 to max_a_bits bits*10 bits, thus achieving the effect of simplifying the product. When max_a_bits=5, 5 bits*10 bits=15 bits.

Processing Example 7

In the following, processing of a combination of processing examples 1 to 3 (processing example 4) placing emphasis on table reduction, processing example 2 placing emphasis on bit width reduction, and processing examples 5 and 6 is described by regarding the processing as processing example 7. What has been described is partly omitted, and a brief description is provided. In addition, shiftB for limiting diff to a specified number of bits is set to 0. A method of deriving CCLM prediction parameters a and b is shown below. If C_Y_MAX=C_Y_MIN, then a=0 and b=C_Y_MIN.

The CCLM prediction parameter derivation portion 310442 derives, from the luminance difference value diff, the index idx used for referring to Inverse Table DivTableM_2N' and the variable exp used for precision adjustment, and derives a value v equivalent to the inverse of diff.

$shiftA=baseA=16$ $diff=Y\_MAX-Y\_MIN$ $range=diff>>N$ $sc=ceil(log\ 2(range+1))$ $idx=diff>>sc$ $exp=baseA-(P-1)-ceil(log\ 2(idx))-sc$ $msb=1<<(P-1)$ $v=(DivTableM\_2N'[idx]|msb)$ Here, baseA is the number of bits (for example 16) used as a reference for deriving Inverse Table DivTableM_2N' [idx]; N is a constant corresponding to the number of elements (2^N) of DivTableM_2N'; P is a constant corresponding to the number of bits of the mantissa part in the exponential representation of (2^16/diff) with a base number of 2; max_a_bits is a constant corresponding to the number of bits of the mantissa part in the exponential representation of a with a base number of 2. Msb is also a constant. One example can be N=5, P=4, max_a_bits=5, and msb=2^(P-1)=8. An example of DivTableM_2N'[ ] in the case of msb=2^(P-1) (an offset is present) is shown below.

DivTableM_2N'[32]={0,0,0,3,0,5,3,1,0,6,5,4,3,2,1,1,0, 7,6,5,5,4,4,3,3,2,2,1,1,1,1,0}

The CCLM prediction parameter derivation portion 310442 derives, from the chrominance difference value diffC, the variable expC for limiting the bit width of the parameter a.

$max\_a\_bits=5$ $diffC=C\_Y\_MAX-C\_Y\_MIN$ $absDiffC=(diffC<0?-diffC:diffC)$ $rangeDiffC=(absDiffC>>(max\_a\_bits-P-1))$ $exp\ C=ceil(log\ 2(rangeDiffC+1))$ $shift\_a=exp\ C$ The CCLM prediction parameter derivation portion 310442 derives the parameter a having a limited number of bits by further right-shifting diffC*v by shift_a, as described below.

$add=1<<shift\_a>>1$ $a=(diffC*v+add)>>shift\_a$

In this configuration, shift_a=expC, so that the formulas for deriving a and b can be replaced with the following formulas.

$add=(1<<exp\ C)>>1$ $a=(diffC*v+add)>>exp\ C$

Thus, the bit width (precision) of a can be maintained fixed independently of the value of diffC.

The CCLM prediction parameter derivation portion 310442 adjusts the value of shiftA by subtracting exp and expC from the initial value of shiftA (e.g., 16), the exp being derived by using diff and the expC derived by using diffC.

$shiftA-=exp+exp\ C$

Also, if the initial value is 16, then shiftA may also be derived as shown below.

$shiftA=16-exp-exp\ C$

In addition, since the initial value baseA of shiftA is also used for the derivation of expC and offsets each other, shiftA can be directly derived by using the constants P, idx, and rangeDiffC.

$shiftA=baseA-(baseA-(P-1)-ceil(log\ 2(idx))-sc)-$
$ceil(log\ 2(rangeDiffC+1))=P-1+ceil(log$
$2(idx))+sc-ceil(log\ 2(rangeDiffC+1))$ The CCLM prediction parameter derivation portion 310442 derives the parameter b by using the parameter a having a limited bit width.

$b=C\_Y\_MIN-((a*Y\_MIN)>>shiftA)$

The CCLM prediction filter portion 310443 outputs a prediction image predSamples[ ][ ] by using the formula (CCLM-1) and by using the CCLM prediction parameters (a, b) and the adjusted shiftA described above.

It should be noted that, as shown in processing example 6, expC may be set to a specified constant independently of diffC. However, expC is less than a value acquired by adding the bit depth bitDepth of the image to P (the number of bits of the mantissa part in the exponential representation of (2^16/diff) with a base number of 2). For example, if bitDepth=10 and P=4, then expC is set to be less than 14.

$exp\ C<bitDepth+P$

Thus, the precision of a is slightly reduced, but processing can be simplified.

According to the above-described configuration, the effects described in processing examples 1 to 3, 5, and 6 are achieved. If the main effects are recorded again, at least the following effects are achieved.

As described in processing example 3, a simplification effect of reduction in the size of the table can be achieved by means of diff>>sc and referring to the table.

The simplification effect of the product achieved by reducing the bit width described in processing examples 5 and 6 can be achieved.

Processing Example 8

In the following, an example of further reducing a table size from processing examples 3, 7 is illustrated. In processing example 3, the table size is reduced by means of diff>>sc based reference (the processing of halving the value of (1/diff) corresponding to the second half D0' of D0 of FIG. 18 is repeated in D1, D2 . . . ). However, if negative values are allowed for sc here, the first half interval (the interval D−1' in D0 other than D0') of the remaining table can also be derived from the second half interval (D0'). This processing can be performed by deriving the index by subtracting the specified value from the difference value having been scaled in the manner of (diff>>sc)−16.

Figure 19:
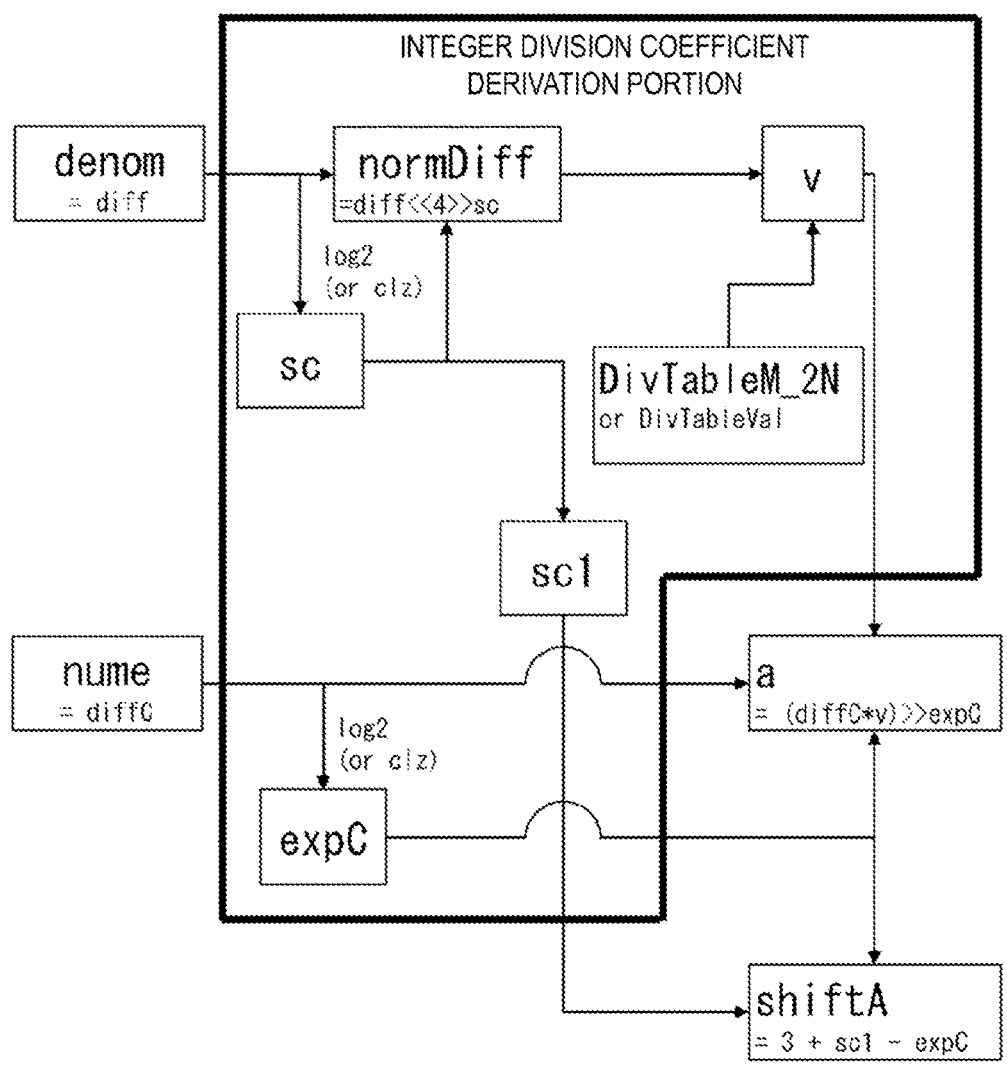
FIG. 19 is a diagram showing an example of data flow of a processing example according to the present invention.

FIG. 19 is a diagram showing an example of data flow of a processing example according to the present invention. FIG. 19 represents actions of an integer division coefficient derivation portion provided in the CCLM prediction parameter derivation portion 310442 of processing example 8 in this embodiment. The integer division coefficient derivation portion regards diff and diffC as inputs, and derives a linear prediction coefficient a corresponding to diffC/diff and a shift value shiftA corresponding to precision of a and used for linear prediction. It should be noted that, each variable satisfies the following relationship.

$a=(\text{diffC}/\text{diff})<<\text{shiftA}$

Here, diffC corresponds to the numerator, and diff corresponds to the denominator, so that diffC may also be referred to as number, and diff may also be referred to as denom.

FIG. 20 is an example showing values of normDiff, idx, etc., with diff being in a range of 0 to 63. Normalization is performed on diff by using a scale shift value sc equivalent to the logarithmic value of 2, whereby, normDiff is changed to a value between 16 and 31. idx is a value acquired by subtracting a specified value from normDiff, and is in a range of 0 to 15. Normalization is performed on diffNorm according to diff, so that normDiff and idx are ranges of values that repeat in each group acquired by splitting diff. Group size is 1, 1, 2, 4, 8, 16, and 32 . . . , and if the group size is greater than the table size, idx repeats, in a group, a value acquired by dividing the table size by the group size.

FIG. 21 is an example showing values of idx, sc, etc., with diff being in a range of 0 to 63. FIG. 21 indicates the value DivTableM_2N[idx] and the shift value sc1, in which the value DivTableM_2N[idx] is a value of an inverse table referred to by idx. Furthermore, sc for derivation of the shift value is also recorded.

The CCLM prediction parameter derivation portion 310442 derives, from the luminance difference value diff, the index idx used for referring to Inverse Table DivTableM_2N, and derives a value v equivalent to the inverse of diff.

$\text{diff}=Y\_MAX-Y\_MIN$ $sc=\text{floor}(\log 2(\text{diff}))$ $\text{normDiff}=(\text{diff}<<4)>>sc$ $\text{idx}=\text{normDiff}-16$ $v=(\text{DivTable}M\_2N[\text{idx}]|8)$ $\text{DivTable}M\_2N[16]=\{0,7,6,5,5,4,4,3,3,2,2,1,1,1,1,0\}$ Here, the index idx of the inverse table is derived by subtracting a specified eigenvalue (2^N, 16 if N=4) from the value normDiff acquired by right-shifting diff by means of the scale shift value sc. Thus, only the inverse of diff (1/diff) shown in the interval D0' of FIG. 18 is stored in the table, and the inverse of diff in the interval D−1' can be derived from the interval D0', thus achieving the effect of further reducing the table size. However, N of processing example 8 is, for example, the number of elements of the interval D0' of FIG. 18, and has a different meaning than the N representing the number of elements of the interval D0 used in processing examples 3 and 7. It should be noted that instead of the inverse table, inverse table values for which elements of the inverse table are set to bits of a (1<<m)-scale number may also be used, as described below. Furthermore, in the case described above, the number of elements of the number of elements (2^N) of Inverse Table DivTableM_2N is set to 16 (N=4), and is set to the precision of the inverse table, P=4. N and P are not limited to the above. If other values of N and P are used, derivation is performed by using the following formulas.

$\text{normDiff}=(\text{diff}<<N)>>sc$ $\text{msb}=1(P-1)$ $v=(\text{DivTable}M\_2N[\text{normDiff}-(1<<N)]|\text{msb})$ $v=(\text{DivTable}M\_2N[\text{idx}]|\text{msb})$ $\text{DivTable}M\_2N[16]=\{0,7,6,5,5,4,4,3,3,2,2,1,1,1,1,0\}$ The CCLM prediction parameter derivation portion 310442 derives, from the chrominance difference value diffC, the variable expC for limiting the bit width of the parameter a.

$\text{diffC}=C\_Y\_MAX-C\_Y\_MIN$ $\exp C=\text{floor}(\log 2(\text{abs}(\text{diffC})))+1$ The CCLM prediction parameter derivation portion 310442 derives, by further right-shifting diffC*v by expC (=shift_a), the parameter a having a limited number of bits as described below.

$\text{add}=(1<<\exp C)>>1$ $a=(\text{diffC}*v+\text{add})>>\exp C$

Thus, the bit width (precision) of a can be maintained fixed independently of the value of diffC.

The CCLM prediction parameter derivation portion 310442 adjusts the value of shiftA by adding sc1 derived by using diff to a fixed value equivalent to baseA and subtracting expC derived by using diffC.

$sc1=sc+((\text{normDiff}!=16)?1:0)$ $\text{shiftA}=3+sc1-\exp C$

Here, shiftA is derived from a specified fixed value (3, namely, P−1), sc1 acquired by correcting the scale shift value sc corresponding to the logarithmic value of diff, and expC being the logarithmic value of diffC, so that the bit width of a does not increase.

The CCLM prediction parameter derivation portion 310442 may derive the index idx of the inverse table by using least significant bits (& 15) of the value normDiff derived by right-shifting diff by means of the scale shift value sc.

diff=Y_MAX−Y_MIN sc=floor(log 2(diff))

normDiff=(diff<<4)>>sc idx=normDiff & 15 v=(DivTableM_2N[idx]|8)

sc1=sc+((normDiff & 15)?1:0)

shiftA=3+sc1−exp C add=(1<<exp C)>>1 a=(diffC*v+add)>>exp C

According to this configuration, the range of the index of the reference inverse table is limited by extracting the least significant bits, thereby achieving the effect of further reducing the table size. Derivation of shiftA is performed by using the specified fixed value (3), sc1 derived by using sc corresponding to the logarithmic value of diff and a least significant bit string of normDiff, and expC being the logarithmic value of diffC, so that the bit width of a does not increase.

The CCLM prediction parameter derivation portion 310442 derives the parameter b by using the parameter a having a limited bit width.

b=C_Y_MIN−((a*Y_MIN)>>shiftA)

The CCLM prediction filter portion 310443 outputs a prediction image predSamples[ ][ ] by using the formula (CCLM−1) and by using the CCLM prediction parameters (a, b) and the adjusted shiftA described above.

It should be noted that, as shown in processing example 6, expC may be set to a specified constant independently of diffC. However, expC is less than a value acquired by adding the bit depth bitDepth of the image to P (the number of bits of the mantissa part in the exponential representation of (2^16/diff) with a base number of 2). For example, if bitDepth=10 and P=4, then expC is set to be less than 14. expC<bitDepth+P It should be noted that, pseudo code for the entire processing described above is shown below.

LMDivTableSig2[1<<4]={0,7,6,5,5,4,4,3,3,2,2,1,1,1,1,0} diff=Y_MAX−Y_MIN diffC=C_Y_MAX−C_Y_MIN sc=my log(diff)

normDiff=diff<<4>>sc v=LMDivTableSig2[normDiff−16]|8 sc1=sc+(normDiff!=16)

exp C=my log(abs(diffC))+1 add=1<<exp C>>1 a=(diffC*v+add)>>exp C shiftA=3+sc1−exp C b=C_Y_MIN−rightShift(a*Y_MIN,shiftA)

Here, rightShift(value,shift)=

(shift>=0)?(value>>shift):(value<<−shift)

my log(x)=(x<=0)?−1:31−clz(x)

The independent variable in the clz function described above has a width of 32 bits.

(Variation of Processing Example 8)

The inverse table lookup in processing example 8 can be replaced with inverse table values for processing. Certainly, in processing example 9 described later, inverse table values may also be used instead of the inverse table.

diff=Y_MAX−Y_MIN sc=floor(log 2(diff))

normDiff=(diff<<4)>>sc idx=normDiff−16 v=(DivTableM_2N[idx]|8)

DivTableM_2N[16]={0,7,6,5,5,4,4,3,3,2,2,1,1,1,1,0}

In addition, deriving idx from normDiff may also be as follows.

idx=normDiff & 15

For example, the table described above is 3 bits*16=48 bits, so that one value DivTblVal (e.g., hexadecimally represented by 0x89999aabbccddef8) may be used even if the table is not used. DivTblVal in this case represents a hexadecimal value v in which each bit corresponds to idx.

In the configuration of using this inverse table value, the CCLM prediction parameter derivation portion 310442 derives v by using the following formula.

v=(0x89999aabbccddef8>>(idx<<2))& 0xf;

In accordance with the above, the inverse table value is right-shifted on the basis of idx derived by using the scale shift value sc, and extraction is performed by means of mask processing using AND (&, bitwise AND), so that a particular entry portion of the inverse table value is extracted. Therefore, v can also be derived without an inverse table. The derivation of a is performed by using v, thereby achieving the effect of removing the inverse table from the derivation of a in addition to the effect of processing example 8 described above.

Furthermore, processing of idx<<2 for configuring the index to be a 4-bit unit may be omitted, and the following processing is performed.

normDiff=(diff<<6>>x)& 60;

v=(0x89999aabbccddef8>>normDiff)& 0xf;

To further summarize the above, the table can be represented as a value of m*n bits by assigning each element i (i=0 . . . n−1, n=2^N) of the inverse table to the (i*m)-th bit counted from the LSB of the inverse table value DivTblVal. Configuration is performed to set m to be equal to or greater than the logarithmic value of the maximum value of the inverse table+1 (equal to or greater than P−1). For example, if the maximum value of the inverse table is 7 (P=4), ceil(log 2 (7+1))=3 to 3 or more bits are used for m.

DivTblVal=DivTableM_2N[0]+DivTableM_2N[1]*m+ DivTableM_2N[2]*m*m* . . . .

It should be noted that, the bit width m of each entry of the inverse table value may be set to 3 bits.

Alternatively, v=((0x49293725bb8>>(idx*3)) & 0x7|8).

It should be noted that, when creating an inverse table value, attention should be paid to whether the order thereof is different from the element order of the inverse table. An example of pseudo code of the derivation method for the inverse table values is shown below.

Generation of an inverse table value sum (=DivTblVal) with 4 bits plus last msb (8) s=[0, 7, 6, 5, 5, 4, 4, 3, 3, 2, 2, 1, 1, 1, 1, 0]
sum=0; (0 . . . 15).each{|i|sum+=((s[i]+8)<<(i*4));}; printf ("%#018x¥n", sum)

inverse table value generation in the case of 3 bits
sum=0; (0 . . . 15).each{|i|sum+=((s[i])<<(i*3));};printf ("%#018x¥n", sum)

It should be noted that, pseudo code for the entire processing described above is shown below.

$$\text{diff}=Y\_MAX-Y\_MIN$$

$$\text{diff}C=C\_Y\_MAX-C\_Y\_MIN$$

$$sc=\text{my log(diff)}$$

$$\text{idx}=(\text{diff}<<4>>sc)\& \ 15$$

$$v=(0x89999aabbccddef8>>(\text{idx}<<2))\& \ 0xf$$

$$sc1=sc+((\text{idx}!=0)?1:0)$$

$$\exp C=\text{my log(abs(diff}C))+1$$

$$\text{add}=(1<<\exp C)>>1$$

$$a=(\text{diff}C*v+\text{add})>>\exp C$$

$$\text{shift}A=3+sc1-\exp C$$

$$b=C\_Y\_MIN-\text{rightShift}(a*Y\_MIN,\text{shift}A)$$

Processing Example 9

In the following, in processing example 9, a processing example that further limits the range of the shift value shiftA is described.

Figure 22:
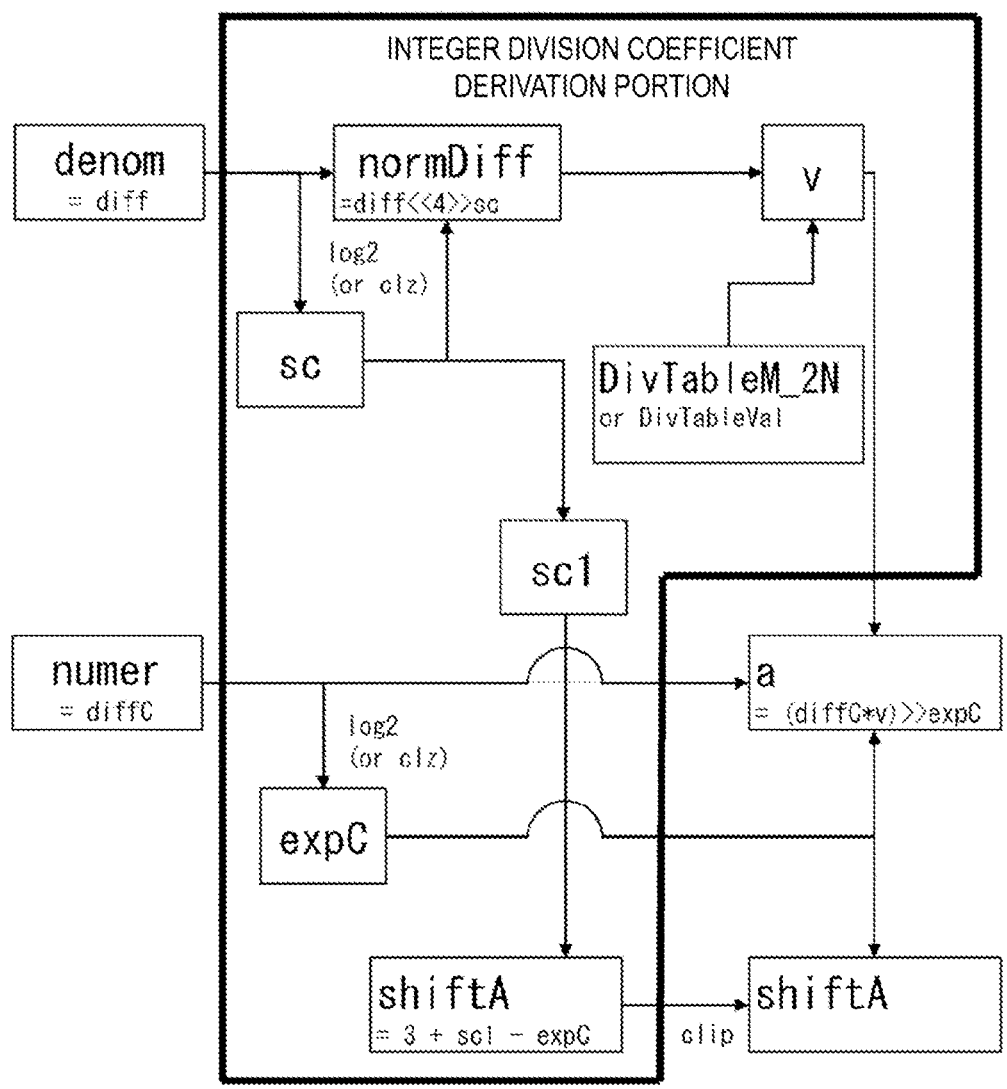
FIG. 22 is a diagram showing another example of data flow of a processing example according to the present invention.

FIG. 22 is a diagram showing another example of data flow of a processing example according to the present invention. FIG. 22 represents actions of an integer division coefficient derivation portion provided in the CCLM prediction parameter derivation portion 310442 of processing example 9 in this embodiment.

The CCLM prediction parameter derivation portion 310442 derives, from the luminance difference value diff, the index idx used for referring to Inverse Table DivTableM_2N, and derives a value v equivalent to the inverse of diff.

$$\text{diff}=Y\_MAX-Y\_MIN$$

$$sc=\text{floor(log 2(diff))}$$

$$\text{normDiff}=(\text{diff}<<4)>>sc$$

$$\text{idx}=\text{normDiff} \ \& \ 15$$

$$v=(\text{DivTable}M\_2N[\text{idx}]|8)$$

$$\text{DivTable}M\_2N[16]=\{0,7,6,5,5,4,4,3,3,2,2,1,1,1,1,0\}$$

Here, the index idx of the inverse table is derived from the least significant bits of the value normDiff of the normalized diff.

The CCLM prediction parameter derivation portion 310442 derives, from the chrominance difference value diffC, the variable expC for limiting the bit width of the parameter a.

$$\text{diff}C=C\_Y\_MAX-C\_Y\_MIN$$

$$\exp C=\text{floor(log 2(abs(diff}C)))+1$$

Further, the CCLM prediction parameter derivation portion 310442 derives the parameter a having a limited number of bits by right-shifting diffC*v by expC(=shift_a) as described below.

$$\text{add}=(1<<\exp C)>>1$$

$$a=(\text{diff}C*v+\text{add})>>\exp C$$

The CCLM prediction parameter derivation portion 310442 adjusts the value of shiftA by adding sc1 derived by using diff to a fixed value equivalent to baseA and subtracting expC derived by using diffC.

$$sc1=sc+((\text{idx}!=0)?1:0)$$

$$\text{shift}A=3+sc1-\exp C$$

Here, shiftA is introduced for adjusting the precision of the value represented by a, but the range of the value of shiftA is large. When the range of shiftA increases, in addition to that the scale of a barrel shifter (variable shift circuit) increases in the case of hardware, the range of the value of b also increases when the value of shiftA is negative. Thus, in processing example 9, the range of the value of shiftA is limited to the specified range. The CCLM prediction parameter derivation portion 310442 may crop the value of shiftA to a specified range.

For example, if the value of shiftA is less than a specified value minTH, then the value of shiftA is limited to minTH. For the value of minTH, for example, 0 to 2 are suitable. The value of shiftA being negative means right-shifting rather than left-shifting, and as a result. the range of the value increases.

```
if (shiftA < minTH)
{
shiftA = minTH
}
```

Also, if the value of shiftA is less than the specified value minTH, then the value of a may be set to the specified maximum value maxA or −maxA or 0 (in the case of a==0) according to the sign of a.

```
if (shiftA < minTH)
{
shiftA = minTH
a = sign (a) * maxA
}
```

Here, for example, minTH=1, and maxA=15. It should be noted that, the value is set by multiplying the maximum value maxA in the absolute values by the sign of a. The value is set to −maxA if the sign of a is negative; the value is set to maxA if the sign of a is positive; a is set to 0 if a is 0. As already additionally described in the formula (a-1), in the configuration of max_a_bits=P+1 (the configuration of shift_a=expC=floor(log 2(diffC))+1), the bit width of a is P bits in the case of the absolute value, and is P+1 bits in the base of a signed value, so that the range of a can be set to −(1<<P) to (1<<P) as shown below.

```
if (shiftA < minTH)
{
shiftA = minTH
a = (a == 0)?0:((a > 0)?(1 << P) − 1:−(1 << P))
}
```

It should be noted that when maxA=(1<<P)−1 is used as a common maximum value among absolute values if a is negative or positive, the following configuration can be performed as described above.

$a = \text{sign}(a) * << P) - 1)$

Furthermore, a==0, that is, the slope being 0 is the case where diffC==0. If diffC==0, then a branch performs other processing after the derivation of diffC. For example, the following configuration can be performed. a and shiftA may be derived by using the aforementioned method only if diffC!=0.

```
if (diffC == 0) {
shiftA = 0
a = 0
}
```

The CCLM prediction parameter derivation portion 310442 derives the parameter b by using shiftA having a limited value and the parameter a having a limited bit width.

$b = C\_Y\_MIN - ((a * Y\_MIN) >> shiftA)$

The CCLM prediction filter portion 310443 outputs a prediction image predSamples[ ][ ] by using the formula (CCLM-1) and by using the CCLM prediction parameters (a, b) and the adjusted shiftA described above.

According to the above-described configuration, further setting the lower limit minTH of the shiftA for a shift operation after multiplying the parameter a in a CCLM prediction achieves the following effect: the effect of reducing the complexity of the shift operation of the shiftA in the prediction using the parameter a and the derivation using the parameter b, and the effect of causing the range of the parameter b to be smaller.

Also, if shiftA is less than the specified value, then in the configuration of setting a specified value based on the sign of a for a, setting the slope a to a value close to an original slope achieves the effect of increasing the precision of the CCLM prediction compared with setting the slope a in another manner.

It should be noted that if the effect of limiting the range of the parameter b is achieved by only preventing the slope a from being close to perpendicular, the following method may also be used.

```
if (shiftA < minTH)
{
shiftA = 0
a = 0
}
```

In this case, if shiftA is a value less than the specified value, then a=0. In this case, it is uniquely determined that the value of b is b=C_Y_MIN.

It should be noted that, as initially described, the luminance difference value (diff) and the chrominance difference value (diffC) in the case of calculating the parameter a use a difference value between a maximum value Y_MAX of each luminance and a minimum value Y_MIN of the luminance and a difference value between a maximum value C_Y_MAX of the chrominance and a minimum value C_Y_MIN of the chrominance, but are not limited thereto. It should be noted that in the case of calculating the parameter b, Y_MIN and C_Y_MIN are used as representative values of the required luminance and chrominance, but the representative values are not limited thereto.

Other Examples

It should be noted that, in the aforementioned processing examples, the example of reducing the amount of storage for storing the table for the CCLM processing is described, but the technical concept of the present invention can also be used for reducing an amount of storage for storing other information and a bit width of multiplication. For example, the technical concept of the present invention is also applicable to a table for derivation of a converted motion vector.

A CCLM prediction portion according to a solution of the present invention is a CCLM prediction portion for generating a prediction image by means of CCLM prediction, wherein the CCLM prediction portion has: a CCLM prediction parameter derivation portion, for deriving CCLM prediction parameters (a, b) by using a luminance difference value, a chrominance difference value, and a table; and a CCLM prediction filter portion, for generating a chrominance prediction image by using a luminance reference image and the CCLM prediction parameters (a, b), wherein the CCLM prediction parameter derivation portion derives the CCLM prediction parameter a by shifting a value acquired by multiplying an element of a table referenced by the luminance difference value by the chrominance difference value.

In the CCLM prediction portion according to a solution of the present invention, the CCLM prediction parameter derivation portion derives a luminance difference value from a first pixel having the greatest luminance value on a contiguous block and a second pixel having the smallest luminance value on the contiguous block, derives a chrominance difference value from chrominance pixel values of the first pixel and the second pixel, derives a scale shift value sc corresponding to the luminance difference value, and multiplies a value in the table by the chrominance difference value, wherein the value of the table is referenced by an index idx resulting from right-shifting the luminance difference value by sc, and the CCLM prediction parameter a is derived by further shifting the value acquired by means of multiplication.

In the CCLM prediction portion according to a solution of the present invention, the CCLM prediction parameter derivation portion multiplies a value acquired by adding an offset to the value of the table referenced by idx by the chrominance difference value.

In the CCLM prediction portion according to a solution of the present invention, the CCLM prediction parameter derivation portion derives a first shift value corresponding to a logarithmic value of an absolute chrominance difference value, multiplies the value of the table referenced by idx by the chrominance difference value, and derives the CCLM prediction parameter a by further shifting the value acquired by means of the multiplication by a shift value expC.

In the CCLM prediction portion according to a solution of the present invention, the CCLM prediction parameter derivation portion derives a second shift value corresponding to the logarithmic value of the luminance difference value diff, and derives the CCLM prediction parameter b by using a chrominance value of the second pixel, the CCLM prediction parameter a, a luminance value of the second pixel, the first shift value, and the second shift value.

In the CCLM prediction portion according to a solution of the present invention, the first shift value and the second shift value are derived with reference to a table.

(Hardware Implementation and Software Implementation)

In addition, the blocks in the moving image decoding device 31 and the moving image encoding device 11 described above may be implemented by hardware by using a logic circuit formed on an integrated circuit (IC chip), or may be implemented by software by using a Central Processing Unit (CPU).

In the latter case, the devices described above include: a CPU for executing commands of a program for implementing the functions, a Read Only Memory (ROM) for storing the program, a Random Access Memory (RAM) for loading the program, and a storage device (storage medium) such as a memory for storing the program and various data. The objective of the embodiments of the present invention can be attained by performing the following: software for implementing the functions described above, namely program code of a control program for the above devices (executable program, intermediate code program, source program), is recoded in a recording medium in a computer-readable manner, the recording medium is provided to the above devices, and the computer (or CPU or MPU) reads the program code recorded in the recording medium and executes the same.

Examples of the recording medium described above include: tapes such as a magnetic tape and a cassette tape, disks or discs including a magnetic disk such as a floppy disk (registered trademark)/hard disk and an optical disc such as a Compact Disc Read-Only Memory (CD-ROM)/Magneto-Optical (MO) disc/Mini Disc (MD)/Digital Versatile Disc (DVD, registered trademark)/CD Recordable (CD-R)/Blu-ray Disc (registered trademark), cards such as an IC card (including a memory card)/optical card, semiconductor memories such as a mask ROM/Erasable Programmable Read-Only Memory (EPROM)/Electrically Erasable and Programmable Read-Only Memory (EEPROM)/flash ROM, or logic circuits such as a Programmable logic device (PLD) and a Field Programmable Gate Array (FPGA).

In addition, the devices described above may also be configured to be connectable to a communication network and to be provided with the above program code by means of the communication network. The communication network is not specifically limited as long as the program code can be transmitted. For example, the Internet, an intranet, an extranet, a Local Area Network (LAN), an Integrated Services Digital Network (ISDN), a Value-Added Network (VAN), a Community Antenna television/Cable Television (CATV) communication network, a virtual private network, a telephone network, a mobile communication network, a satellite communication network, and the like can be used. In addition, transmission media forming the communication network are not limited to a specific configuration or type as long as the program code can be transmitted. For example, a wired medium such as Institute of Electrical and Electronic Engineers (IEEE) 1394, a USB, a power-line carrier, a cable TV line, a telephone line, and an Asymmetric Digital Subscriber Line (ADSL) or a wireless medium such as an infrared-ray including Infrared Data Association (IrDA) and a remote controller, Bluetooth (registered trademark), IEEE 802.11 wireless communication, High Data Rate (HDR), Near Field Communication (NFC), Digital Living Network Alliance (DLNA, registered trademark), a mobile telephone network, a satellite circuit, and a terrestrial digital broadcast network can also be used. It should be noted that the embodiments of the present invention may also be implemented in a form of a computer data signal embedded in a carrier wave in which the above program code is embodied by electronic transmission.

The embodiments of the present invention are not limited to the above embodiments, and can be variously modified within the scope of the claims. That is, embodiments acquired by combining technical solutions which are adequately modified within the scope of the claims are also included in the technical scope of the present invention.

REFERENCE SIGNS LIST

31 Image decoding device
301 Entropy decoding portion
302 Parameter decoding portion
303 Inter-frame prediction parameter decoding portion
304 Intra-frame prediction parameter decoding portion
308 Prediction image generation portion
309 Inter-frame prediction image generation portion
310 Intra-frame prediction image generation portion
3104 Prediction portion
31044 CCLM prediction portion (prediction image generation device)
310441 Downsampling portion
310442 CCLM prediction parameter derivation portion (parameter derivation portion)
310443 CCLM prediction filter portion
311 Inverse quantization/inverse transform portion
312 Addition portion
11 Image encoding device
101 Prediction image generation portion
102 Subtraction portion
103 Transform/quantization portion
104 Entropy encoding portion
105 Inverse quantization/inverse transform portion
107 Loop filter
110 Encoding parameter determination portion
111 Parameter encoding portion
112 Inter-frame prediction parameter encoding portion
113 Intra-frame prediction parameter encoding portion

The invention claimed is:

1. A moving image decoding device for deriving a prediction image of a chrominance image by using a luminance image, the moving image decoding device comprising:
one or more processors; and
one or more computer-readable media coupled to the one or more processors and storing one or more computer-executable instructions that, when executed by at least one of the one or more processors, cause the moving image decoding device to:
derive a first luminance value on the luminance image corresponding to a first position;
derive a first chrominance value on the chrominance image corresponding to the first position;
derive a second luminance value on the luminance image corresponding to a second position;
derive a second chrominance value on the chrominance image corresponding to the second position;

derive a first difference value that indicates a difference between the first luminance value and the second luminance value;
derive a second difference value that indicates a difference between the first chrominance value and the second chrominance value;
derive a shift value for a shift operation, a first parameter, and a second parameter by using the first difference value and the second difference value;
set the shift value to a first threshold based on a comparison between the first threshold and a third value, the third value beingcalculated by adding a first specified value to a first value, derived by using the first difference value, and then subtracting a second value, derived by using the second difference value, from a result of the addition, wherein:
the first parameter is set to a value resulting from multiplying a second specified value by a sign of the first parameter if the third value is less than the first threshold, and
the second specified value is 15;
derive the prediction image by using the first parameter, the second parameter, and the shift value; and
derive the second parameter by using the second luminance value, the second chrominance value, the first parameter, and the shift value, and according to the formula:

$$b = C\_Y\_MIN - ((a*Y\_MIN) >> shiftA)$$

wherein:
C_Y_MIN is the second chrominance value, a is the first parameter, Y_MIN is the second luminance value, and shiftA is the shift value.

2. The moving image decoding device according to claim 1, wherein the one or more computer-executable instructions, when executed by the at least one of the one or more processors, further cause the moving image decoding device to:
decode an image by adding a residual to the prediction image.

3. The moving image decoding device according to claim 1, wherein:
the shift value is set to the third value if the third value is greater than or equal to the first threshold, and
the shift value is set to the first threshold if the third value is less than the first threshold.

4. A prediction image generation method for deriving a prediction image of a chrominance image by using a luminance image, the prediction image generation method comprising:
deriving a first luminance value on the luminance image corresponding to a first position;
deriving a first chrominance value on the chrominance image corresponding to the first position;
deriving a second luminance value on the luminance image corresponding to a second position;
deriving a second chrominance value on the chrominance image corresponding to the second position;
deriving a first difference value that indicates a difference between the first luminance value and the second luminance value;
deriving a second difference value that indicates a difference between the first chrominance value and the second chrominance value;
deriving a shift value for a shift operation and a first parameter by using the first difference value and the second difference value;

setting the shift value to a first threshold based on a comparison between the first threshold and a third value, the third value being calculated by adding a first specified value to a first value, derived by using the first difference value, and then subtracting a second value, derived by using the second difference value, from a result of the addition, wherein:
the first parameter is set to a value resulting from multiplying a second specified value by a sign of the first parameter if the third value is less than the first threshold, and
the second specified value is 15; and
deriving a second parameter by using the second luminance value, the second chrominance value, the first parameter, and the shift value, and according to the following formula:

$$b = C\_Y\_MIN - ((a*Y\_MIN) >> shiftA)$$

wherein:
C_Y_MIN is the second chrominance value, a is the first parameter, Y_MIN is the second luminance value, and shiftA is the shift value.

5. The prediction image generation method according to claim 4, wherein:
the shift value is set to the third value if the third value is greater than or equal to the first threshold, and
the shift value is set to the first threshold if the third value is less than the first threshold.

6. A moving image encoding device for deriving a prediction image of a chrominance image by using a luminance image, the moving image encoding device comprising:
one or more processors; and
one or more computer-readable media coupled to the one or more processors and storing one or more computer-executable instructions that, when executed by at least one of the one or more processors, cause the moving image encoding device to:
derive a first luminance value on the luminance image corresponding to a first position;
derive a first chrominance value on the chrominance image corresponding to the first position;
derive a second luminance value on the luminance image corresponding to a second position;
derive a second chrominance value on the chrominance image corresponding to the second position;
derive a first difference value that indicates a difference between the first luminance value and the second luminance value;
derive a second difference value that indicates a difference between the first chrominance value and the second chrominance value;
derive a shift value for a shift operation, a first parameter, and a second parameter by using the first difference value and the second difference value;
set the shift value to a first threshold based on a comparison between the first threshold and a third value, the third value being calculated by adding a first specified value to a first value, derived by using the first difference value, and then subtracting a second value, derived by using the second difference value, from a result of the addition, wherein:
the first parameter is set to a value resulting from multiplying a second specified value by a sign of the first parameter if the third value is less than the first threshold, and
the second specified value is 15;

derive the prediction image by using the first parameter, the second parameter, and the shift value; and derive the second parameter by using the second luminance value, the second chrominance value, the first parameter, and the shift value, and according to the formula:

$$b = C\_Y\_MIN - ((a * Y\_MIN) >> shiftA)$$

wherein:

C_Y_MIN is the second chrominance value, a is the first parameter, Y_MIN is the second luminance value, and shiftA is the shift value.

7. The moving image encoding device according to claim 6, wherein the one or more computer-executable instructions, when executed by the at least one of the one or more processors, further cause the moving image encoding device to:

perform encoding by deriving a residual from a difference between an input image and the prediction image.

* * * * *